United States Patent
Fujiyoshi et al.

[11] Patent Number: 5,945,599
[45] Date of Patent: Aug. 31, 1999

[54] RESONANCE TYPE ANGULAR VELOCITY SENSOR

[75] Inventors: Motohiro Fujiyoshi, Aichi-ken; Yoshiteru Omura, Seto; Yutaka Nonomura, Nagoya; Norio Fujitsuka, Nisshin, all of Japan

[73] Assignee: Kabushiki Kaisha Toyota Chuo Kenkyusho, Aichi-ken, Japan

[21] Appl. No.: 08/989,911

[22] Filed: Dec. 12, 1997

[30] Foreign Application Priority Data

Dec. 13, 1996 [JP] Japan .................................. 8-334337
Oct. 16, 1997 [JP] Japan .................................. 9-303505

[51] Int. Cl.⁶ ...................................................... G01P 9/04
[52] U.S. Cl. .................................... 73/504.12; 73/504.14
[58] Field of Search .......................... 73/504.12, 504.14, 73/504.15, 504.16

[56] References Cited

U.S. PATENT DOCUMENTS

| | | |
|---|---|---|
| 5,473,945 | 12/1995 | Greiff et al. . |
| 5,515,724 | 5/1996 | Greiff et al. . |
| 5,656,778 | 8/1997 | Roszhart . |
| 5,721,377 | 2/1998 | Kurle et al. ............................ 73/504.12 |
| 5,728,936 | 3/1998 | Lutz ...................................... 73/504.12 |

FOREIGN PATENT DOCUMENTS

| | | |
|---|---|---|
| 195 26 903 A1 | 1/1997 | Germany . |
| 195 39 049 A1 | 4/1997 | Germany . |
| 7-43166 | 2/1995 | Japan . |
| 8-54240 | 2/1996 | Japan . |
| 2 292 609 | 2/1996 | United Kingdom . |

OTHER PUBLICATIONS

J. Bernstein, et al., "A Micromachined Comb–Drive Tuning Fork Rate Gyroscope", 1993 IEEE: pp. 143–148.
K. Tanaka, et al., "A Micromachined Vibrating Gyroscope", 1995 IEEE: pp. 278–281.

Primary Examiner—John E. Chapman
Attorney, Agent, or Firm—Oblon, Spivak, McClelland, Maier & Neustadt, P.C.

[57] ABSTRACT

A resonance type angular velocity sensor is provided with a mass displacement supporting beam (20, 21, 22, 23) for supporting a vibration in a detecting direction due to a Coriolis force of a mass portion (1) and a mass excitation supporting beam for supporting a mass displacement supporting base portion (24, 25) in such a manner as to allow the mass portion (1) to vibrate away from the beam in an excitation direction. When the mass displacement supporting base portion (24) is excited in the excitation direction by an opposing comb exciting electrode (51), the mass portion (1) vibrates. A projecting electrode (31) is provided in a side surface of the Coriolis force detecting direction of the mass portion (1) and capacity detecting electrodes (30, 32) are disposed in such a manner as to oppose this. When the Coriolis force acts on the mass portion (1) vibrating in the excitation direction, the mass portion (1) vibrates also in the detecting direction so that the capacity change is detected by the capacity detecting electrodes (30, 32). In such a case, it is possible to provide a mechanism for applying a stress to the beam members (10, 11, 12, 13, 14, 15, 16, 17) so as to adjust the exciting frequency.

35 Claims, 33 Drawing Sheets

A-A SECTIONAL VIEW

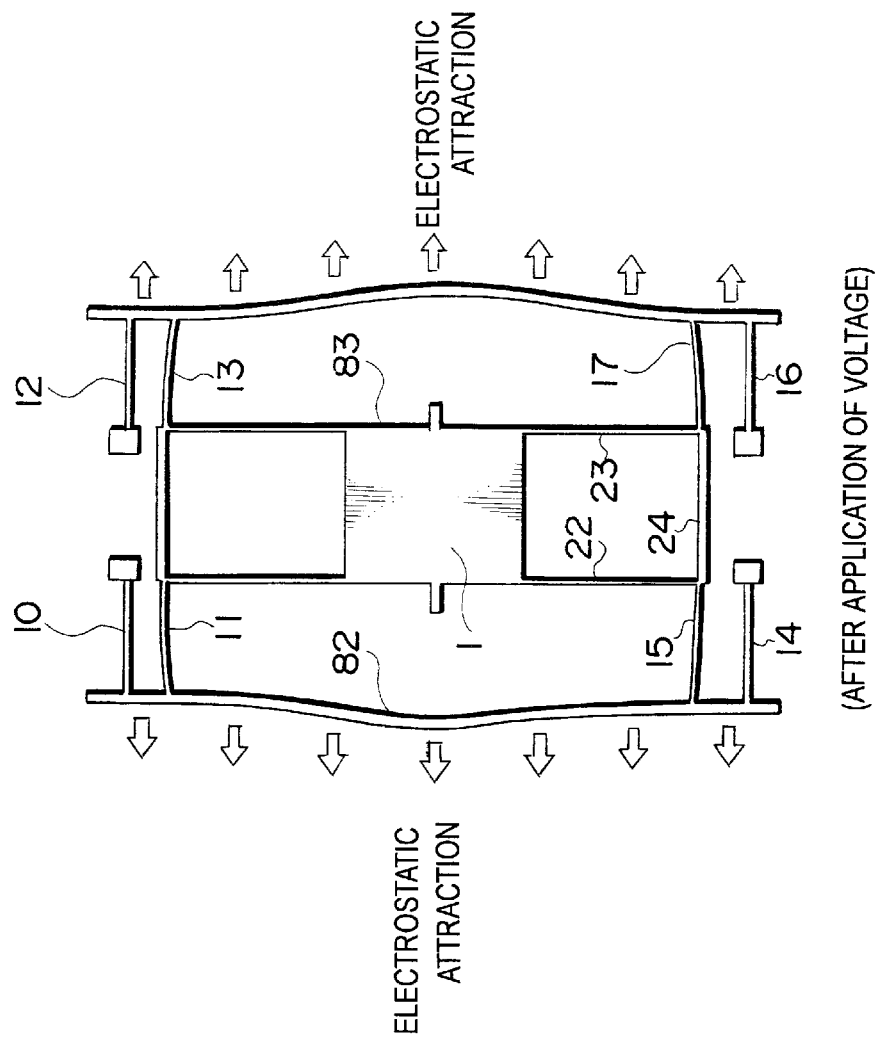
Fig. 11B (AFTER APPLICATION OF VOLTAGE)
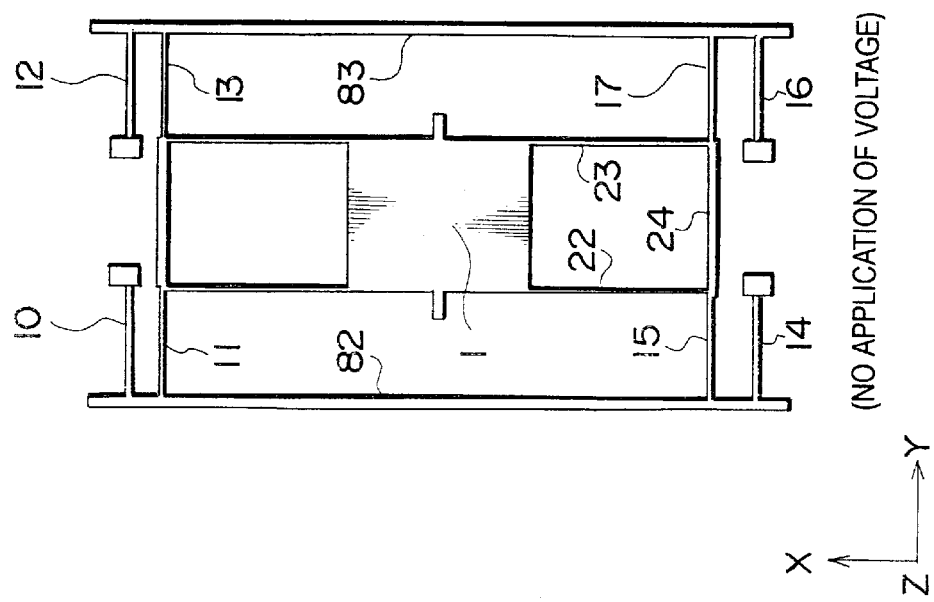
Fig. 11A (NO APPLICATION OF VOLTAGE)

B-B SECTIONAL VIEW

C-C SECTIONAL VIEW

D-D SECTIONAL VIEW

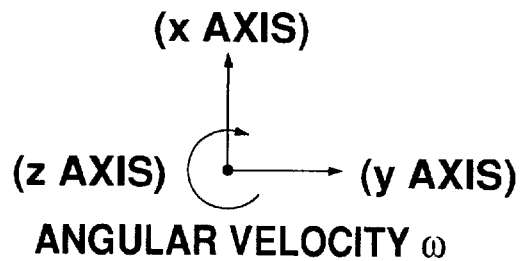
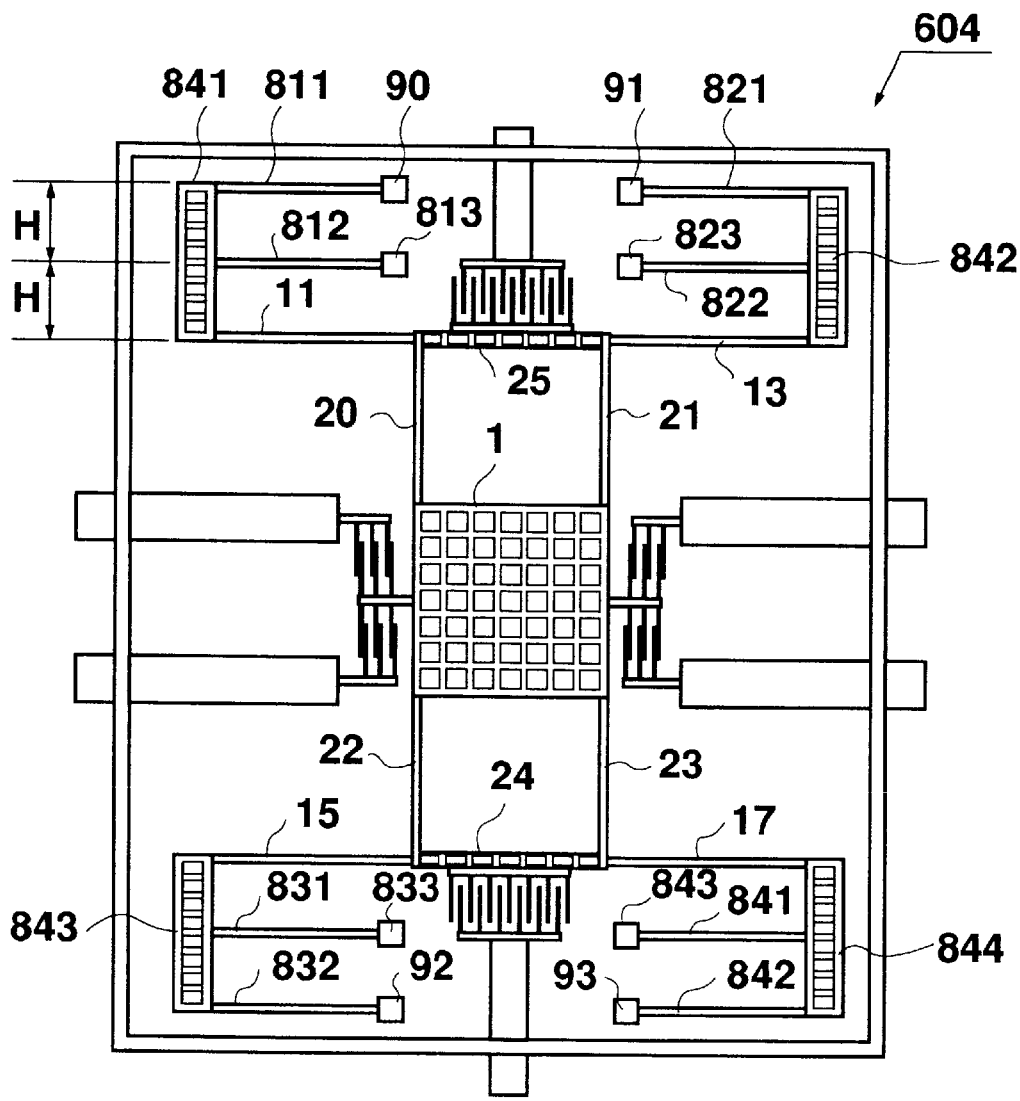
Fig. 28

Fig. 31

| TYPE | | EXCITATION IN X DIRECTION | | EXCITATION IN Y DIRECTION | | SPRING CONSTANT RATIO R (ky/kx) |
|---|---|---|---|---|---|---|
| | | DISPLACEMENT ($\mu$m) | SPRING CONSTANT kx (N/$\mu$m) | DISPLACEMENT ($\mu$m) | SPRING CONSTANT ky (N/$\mu$m) | |
| P1 | EMBODIMENT 1 (H=50$\mu$m) | 108 | $9\times10^{-6}$ | 1.4 | $7\times10^{-4}$ | 77 |
| P2 | NO CONNECTING PORTION[Fig. 22](H=50$\mu$m) | 108 | $9\times10^{-6}$ | 27.0 | $4\times10^{-5}$ | 4 |
| P3 | EMBODIMENT 8 (H=50$\mu$m) | 120 | $8\times10^{-6}$ | 0.5 | $2\times10^{-3}$ | 255 |
| P4 | EMBODIMENT 8 (H=100$\mu$m) | 120 | $8\times10^{-6}$ | 0.8 | $1\times10^{-3}$ | 143 |
| P5 | EMBODIMENT 8 (H=200$\mu$m) | 121 | $8\times10^{-6}$ | 3.7 | $3\times10^{-4}$ | 33 |
| P6 | EMBODIMENT 9 (H=50$\mu$m) | 121 | $8\times10^{-6}$ | 0.8 | $1\times10^{-3}$ | 158 |
| P7 | EMBODIMENT 10 (H=50$\mu$m) | 121 | $8\times10^{-6}$ | 0.7 | $1\times10^{-3}$ | 164 |

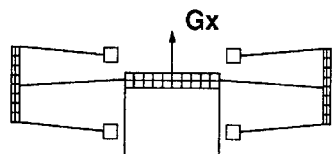
Fig. 33A
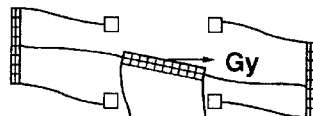
Fig. 33B
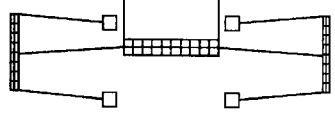
Fig. 33C
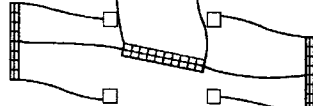
Fig. 33D
Fig. 33E
Fig. 33F

RESONANCE TYPE ANGULAR VELOCITY SENSOR

BACKGROUND OF THE INVENTION

1. Fields of the Invention

The present invention relates to an angular velocity sensor for detecting an angular velocity acting on a vehicle such as an automobile, airplane, or an electronic equipment. More particularly, the present invention relates to a resonance type angular velocity sensor which excites a mass portion corresponding to an inertia mass, and detects an angular velocity on the basis of a displacement of the mass portion due to a Coriolis force generated in a direction perpendicular to both directions of an exciting direction of the mass portion and a rotating axis direction of the angular velocity sensor.

2. Description of the Related Art

FIGS. 1A, 1B, and 1C show a structure of a resonance type vibrating component such used in as a conventional angular velocity sensor. In a vibrating component 150, a plate like mass portion 152 corresponding to an inertia mass is supported in the vertical direction in the drawing by respective two beams 151 having an end fixed to a frame portion 160 of a silicon substrate 520. Comb electrodes 156 are formed at the side portions in the horizontal direction in the drawing of the mass portion 152, and comb electrodes 158 are respectively formed in the frame portion 160 in such a manner as to mesh with and oppose the comb electrodes 156.

An exciting conductive layer (not shown) is connected to each of these comb electrodes 156 and 158. When an alternating voltage is applied to the exciting conductive layer, an electrostatic force is generated between the comb electrodes 156 and 158, and the mass portion 152 displaces to the lateral direction in the drawing due to the electrostatic force, to vibrate in the manner as shown in FIG. 1B.

During lateral excitation of the mass portion 152 in the above manner, when the angular velocity has a rotational axis in the horizontal direction of the drawing, the Coriolis force is generated in a direction perpendicular to both the exciting direction and the rotating axis direction. When the Coriolis force acts on the mass portion 152, the mass portion 152 displaces to the operating direction of the Coriolis force, the thickness direction of the mass portion 152 in FIG. 1A supported by beam 151, and vibrates.

FIG. 1C shows a cross section along a line 1C—1C in FIG. 1A, and, as shown in FIG. 1C, displacement detecting electrodes 155 and 157 for detecting a displacement to the thickness direction of the mass portion 152 are provided at positions so that the mass portion 152 is held therebetween from the thickness direction. When the mass portion 152 displaces to the thickness direction due to the Coriolis force, as mentioned above, the detecting electrodes 155 and 157 detect this displacement by, for example, a capacity detecting method or the like. Then, a signal in response to a magnitude of an amplitude of a vibration of the mass portion 152 due to the Coriolis force is obtained and the magnitude of the angular velocity or the like is detected.

In a conventional angular velocity sensor 150, the beam 151 supports the mass portion 152 in the exciting direction in such a manner as to freely move, and also supports the mass portion 152 in the Coriolis force generating direction in such a manner as to freely displace. Accordingly, the operating direction of the Coriolis force with respect to the mass portion 152 becomes the thickness direction of the substrate. Accordingly, in order to detect the displacement to the thickness direction of the mass portion 152 as shown in FIG. 1C, it is necessary to construct a three layer structure (a lower electrode, a mass portion, and an upper electrode) by forming the displacement detecting electrodes 155 and 157 in the upper and lower portion of the mass portion 152. However, since manufacturing a three layer structure is complex, a structure has been desired that would allow the Coriolis force to be generated in a plane direction of the substrate so as to simplify the manufacturing process while allowing Coriolis force detection.

Further, an angular velocity sensor 150 described above is manufactured by a semiconductor process technique for fine processing. However, in such a semiconductor process technique, the manufacturing process often results in the cross section of the beam 151 supporting the mass portion 152 becoming a trapezoidal shape having an oblique line direction formed by the advancing direction of the process, that is, the thickness direction of the beam is often not an ideal rectangle or square. This may be caused by for example, dispersion in the etching process or the like.

When the cross section of the beam 151 is trapezoidal, and the mass portion 152 is vibrated to the exciting direction, a leak vibrating component is generated in the thickness direction of the beam 151 when the beam 151 supporting the mass portion 152 vibrates in the exciting direction.

In a conventional angular velocity sensor 150, as mentioned above, the beam 151 supports the mass portion 152 in such a manner as to freely move to the exciting direction and to freely displace in the Coriolis force generating direction (that is, the thickness direction of the beam 151). The beam 151 further inhibits displacement to the vertical direction. Accordingly, most of the leak vibration component of the beam 151 due to the vibration to the exciting direction is generated to the Coriolis force detecting direction. Accordingly, by exciting the mass portion 152, even when the angular velocity is not applied, the mass portion 152 displaces to the detecting direction, that is, to the direction perpendicular to the drawing in FIG. 1A, so that an output is generated. Therefore, there is a possibility of deteriorating in detecting accuracy of the angular velocity sensor 150.

Further, in such a conventional angular velocity sensor 150, a space 154 is provided in a root area 159 disposed at one side of the beam 151 in the frame portion 160. In the space 154, the width in the z direction, that is, the width perpendicular to the exciting direction of the beam 151 is variably adjusted by a space width adjusting means (not shown). By adjusting the width of the space 154 using the space width adjusting means, the tensile stress of the beam 151 is changed, thereby adjusting the resonance frequency of the beam 151 so that the measurement in the best sensible state can be performed.

However, in such a conventional angular velocity sensor 150, since the beam 151 is used for both the exciting direction and the detecting direction, when the width of the space 154 is adjusted and the tensile stress is applied to the beam 151, the resonance frequency in the exciting direction and the detecting direction are increased. However, the resonance frequency to the exciting direction in the mass portion 152 and the resonance frequency to the Coriolis force detecting direction are not the difference Δf of the resonance frequency calculated by the characteristic of the angular velocity sensor. Accordingly, in the structure of adjusting the tensile stress of the beam 151 supporting the displacement of the mass portion 152 to the two directions mentioned above, there is a problem that adjustment for obtaining the best Δf is very difficult.

Further, in a conventional resonance type angular velocity sensor using the vibrator, since the component itself is large, a laser trimming process can be performed. However, as shown in FIGS. 1A, 1B, and 1C, in recent fine vibrating sensors manufactured by micro machining techniques using a material such as a silicon or the like, it is extremely difficult to fine adjust the frequency using a trimming process because the spot diameter of the laser beam is 10 or some tens of μm larger than the area to be trimmed in the vibrating type sensor, which may be as small as a few μm or less.

As mentioned above, conventional trimming methods of adjusting the resonance frequency of the vibrator to a constant value are not appropriate for adjusting the Δf. Accordingly, a simple structure for efficiently adjusting the Δf to the optimum value has been desired.

SUMMARY OF THE INVENTION

The present invention is made taking the above problem into consideration, and an object of the present invention is to provide simple structure a resonance type angular velocity sensor capable of accurately detecting an angular velocity.

A further object of the present invention is to provide a resonance type angular velocity sensor which can easily and efficiently adjust a resonance frequency of a mass portion corresponding to an inertia mass.

A still further other object of the present invention is to wire a resonance type angular velocity sensor with respect to a detecting electrode or the like in a simpler and more secure manner.

In order to achieve the above objects, a resonance type angular velocity sensor in accordance with the present invention is structured such as to excite a mass portion corresponding to an inertia mass and detect an angular velocity on the basis of a displacement of the mass portion due to a Coriolis force generated in a direction perpendicular to both directions of an exciting direction of the mass portion and a rotational axis direction of the angular velocity sensor, and the angular velocity sensor comprises the following features.

Accordingly, the resonance type angular velocity sensor is provided with a pair of mass displacement supporting bases disposed in an exciting direction in such a manner as to hold the mass portion therebetween, mass displacement direction supporting beams respectively extending to said mass portion from said respective mass displacement supporting base and supporting in such a manner as to allow said mass portion to displace to the Coriolis force generating direction at a time of generating the Coriolis force, a mass excitation supporting beam for supporting said mass displacement supporting base in such a manner as to inhibit said respective mass displacement supporting base portion from displacing to said Coriolis force generating direction and allow said mass portion to vibrate to said exciting direction through said mass displacement direction supporting beams, an exciting means for exciting said mass portion by exciting said mass displacement supporting base, and a displacement detecting means for detecting the displacement of said mass portion.

In accordance with the present invention, as described above, the mass excitation supporting beam for supporting the mass portion in such a manner as to freely vibrate in the exciting direction and the mass displacement direction supporting beams for supporting in such a manner as to allow the mass portion to displace to the Coriolis force generating direction are independently provided. Accordingly, when vibrating the mass portion excitation supporting beam to the exciting direction, even when a leak vibration component to the beam thickness direction is generated in the beam due to the manufacturing process, in most cases the direction of the leak vibration component and the Coriolis force detecting direction do not concur with each other (specially, they oppose each other by 90 degrees). Accordingly, the sensor output of the resonance type angular velocity sensor according to the present invention is little influenced by beam shape, enabling sensors having a high detecting accuracy to be obtained, even from imperfect manufacturing processes.

Further, by separating the beam, the tensile stress with respect to the respective beams, as an example, can be independently adjusted, making it easier to obtain a suitable the resonance frequency in the respective directions among the mass portion exciting direction and Coriolis force detecting direction. Accordingly, it is possible to easily adjust to obtain the optimum Δf.

Still further, because the mass portion is supported by the independent beam with respect to the perpendicular two directions, it is possible to make the exciting direction and the Coriolis force detecting direction coplanar. Accordingly, it is possible to simplify the manufacturing process for the resonance type angular velocity sensor.

The resonance type angular velocity sensor in accordance with the present invention may further employ the following aspects.

At first, a folded type beam can be used for the mass excitation supporting beam for supporting the mass displacement supporting base portion in such a manner that the mass portion can vibrate to the exciting direction.

The folded type beam extends to the direction perpendicular to the vibration direction of the subject to be supported (the mass displacement supporting base portion in this case) and is provided with at least two beam members having substantially the same length and disposed in parallel to each other. The beam members are then structured such as to be connected to each other at an end portion opposite to the subject to be supported in the paraller direction to the vibration direction. Further, an end portion close to the subject to be supported the two beam members is connected to the subject to be supported in the one beam member and is fixed to the substrate or the like in the other beam member.

It is possible to use a straight beam consisting of one linear beam for the mass excitation supporting beam, however, when using a straight beam, when the amplitude of the mass portion with respect to the exciting direction is large, tensile force is applied to the beam in its longitudinal direction, generating tensile stress within the beam. Accordingly, the spring constant of the beam is increased so that the relation of a restoring force due to the displacement and the beam becomes non-linear. Accordingly, together with an increase in the exciting amplitude, the resonance frequency in the exciting direction increases, and the sensor characteristic is changed.

In comparison with this, in a case in which a folded beam is used, when one of the beam members connected to the subject displaces, the other beam member operates in a same manner, so that the length of the respective beam member is not changed, even for large amplitudes. Accordingly, the beam member is not drawn to the longitudinal direction at a time of the large amplitude and the spring constant becomes fixed, so that it is possible to avoid changes in the sensor characteristic, even in cases of large amplitude. In this case, in the exciting vibration system not accompanied by a large amplitude, a straight beam can be used for the mass excitation supporting beam.

Further, in the present invention, a straight beam extending to the direction perpendicular to the displacement allowing direction can be used for the mass displacement direction supporting beams supporting the displacement of the mass portion to the Coriolis force generating direction. The straight beam can be formed in the direction perpendicular to the displacement allowing direction with no slack, and secure support and may, for example, rapidly stop vibration during displacement. Further, since the beam has a straight shape and simple structure, there is an additional advantage of improved manufacturing yield.

When the displacement of the straight type beam is large, there occurs a disadvantage that a tensile stress in the beam is generated, however, since the Coriolis force generated in the detecting direction by applying the angular velocity is small, the generated tensile stress is not large, so that the characteristic change in the sensor is small.

In accordance with the angular velocity sensor of the present invention, since the mass excitation supporting beam and the mass displacement direction supporting beams are provided in the above manner tensile stress may be independently adjusted with respect to the respective beams, so that the resonance frequency in each of the mass portion exciting direction and the Coriolis force detecting direction can be made an appropriate value.

For example, when a frequency adjusting mechanism is provided and a stress is applied to the mass excitation supporting beams respectively extending from the mass displacement supporting base portion, it is possible to adjust just the resonance frequency in the exciting direction of the mass portion. Adjustment with respect to the mass excitation supporting beam can be realized by, for example, applying tensile stress or compression stress to the beam by an electrical adjusting method using electrostatic force.

In a more specific example, in an example case in which a folded beam is used for the mass excitation supporting beam, the electrode is formed on the end portion of the folded type beam in which the beam members are connected to each other, and stress given to the beam is controlled by the electrostatic force through the electrode, and frequency is thereby adjusted. For example, when the structure is made such that a connecting beam (hereinafter, refer to a connecting portion) provided along the mass portion exciting direction of the folded type beam is extended further to the mass portion exciting direction and frequency adjusting electrodes are provided in a plurality of portions of the connecting portion, fine adjustment of the resonance frequency in the exciting direction can further be easily performed.

Further, when a detector for detecting the exciting state of the mass portion is independently provided, it is possible to adjust the stress of the mass excitation supporting beam in such a manner as to always obtain the optimum resonance frequency of the mass portion on the basis of the exciting state (the exciting frequency, the amplitude or the like) obtained by the detector. Still further, with respect to the exciting portion for exciting the mass portion, it is preferable to feedback control the exciting portion in such a manner that the vibration frequency in the exciting direction becomes the optimum value on the basis of the result detected by the detecting means.

For the frequency adjusting mechanism, mechanical adjustment such as laser trimming may be employed in stead of electrical adjustment or as an adjusting means applicable in combination with the electrical adjusting means. In this mechanical adjusting method, the resonance frequency of the mass excitation supporting beam can be selectively adjusted by, for examples, removing the trimming pattern exclusively formed on the mass excitation supporting beam, or by afterwards attaching the metal material and the like to the mass excitation supporting beam. In the above mechanical adjusting method, since the frequency adjusting width is large, the adjusting efficiency is high, so the method is especially, suitable for frequency rough adjustment.

The relationship between the resonance frequency in the respective directions of the resonance type angular velocity sensor and the frequency adjustment thereof will next be explained below.

Vibration sensors utilizing change of the resonance characteristic have drawn industry attention, as such sensors have excellent characteristics, such as high sensibility and high resolution because amplitude is significantly increased in a state that the resonance frequency of the vibrator and the exciting frequency exciting the vibrator concur with each other. This phenomenon is utilized as such vibrators are manufactured of a material having a low energy loss and a high vibration Q value.

However, such vibration sensors change resonance state, so that the sensibility of the sensor is significantly lowered when the exciting frequency is changed for any reason. Such changes of the resonance characteristic may be caused by the manufacturing process, temperature change during use, microscopic change of the structure of the vibrator generated by use for a long time (for example, material fatigue), or a number of other causes. Particularly, influence is a problem under a severe environment such as vehicle control for an automotive vehicle. This prevents the angular velocity from being accurately measured.

Next, with respect to sensibility, which is the most important among a sensor's characteristics, a primary factor of the change will be described below.

The sensibility of the resonance type angular velocity sensor is in proportional to the moving velocity of the mass at a time of exciting the mass. Then, the moving velocity of the mass is proportional to the amplitude of the mass. Accordingly, it is necessary to give to the mass a large amplitude so as to create a high sensibility. Since the sensor is the resonance type sensor, when the resonance frequency in the exciting direction of the sensor and the frequency of the exciting force concur with each other, the amplitude significantly increases. As a result, a very large exciting amplitude can be obtained by a small exciting voltage. Restricting the exciting voltage to a low level is useful for lowering noise (cross-talk) generated by the exciting signal electrically entering into the detecting circuit, and sensor resolution can be improved. The same manner may be applied to the detecting direction. The Coriolis force frequently generated by the angular velocity becomes the exciting force to the detecting end having the same period as that of the exciting frequency. When the period of generating the Coriolis force corresponds with the resonance frequency in the detecting direction, the amplitude generated in the detecting direction is significantly increased. As a result, a high sensibility can be obtained in the detecting direction.

As explained above, it is understood that the relation between the resonance frequency of the exciting end and the detecting end is important. This relation will be described below. The vibrator (the mass portion) is previously excited by the electrostatic force generated in the comb type electrode. The exciting frequency at this time corresponds with the resonance frequency in the exciting direction. Here, when angular velocity is given to the sensor, the Coriolis force Fc which is in proportion to the angular velocity and the vibrating velocity of the vibrator is generated in the detecting direction. Fc is represented by the following equation (1).

$$Fc=2*M*V*\Omega \tag{1}$$

in which M is the mass of the mass, V is an exciting velocity, and $\Omega$ is an angular velocity. The period of generating the Coriolis force is the same as the resonance frequency. The mass portion begins vibration in the direction perpendicular to the exciting direction due to the Coriolis force and the period thereof becomes the same as the period of generating the Coriolis force. At this time, when the frequency of the Coriolis force and the resonance frequency in the detecting direction concur, high sensibility can be obtained. In accordance with the above principle, it is understood that the highest sensibility can be obtained when the resonance frequency fx in the exciting direction and the resonance frequency fy in the detecting direction concur. Accordingly, when the difference of the frequency between the both directions is set to $\Delta f$, it is known that the closer $\Delta f$ is, the higher is the sensibility.

FIG. 2 shows a definition of $\Delta f$. Since smaller values for $\Delta f$ result in more frequent overlap of curves of the resonance frequency in the exciting end and the detecting end, it is understood that the amplitude A to the detecting end in the exciting end resonance frequency fx becomes large. This shows that amplitude A and sensor sensibility are proportional. However, since $\Delta f$ is greatly concerned with the responsiveness of the sensor, $\Delta f$ is also proportional to the lower the responsiveness with respect to the angular velocity input. In the case of using a sensor in a vehicle, on the scale of tens to hundreds of Hz of $\Delta f$ is generally necessary. The optimum value of $\Delta f$ is determined by a trade-off with respect to sensibility.

However, it is a general rule of the art that the manufacturing error in the manufacturing process of the sensor is about 10%. Accordingly, the shape of the manufactured sensor has a dispersion with respect to the design value. Even when sufficient effort is made to reduce the error in the manufacturing process, the mass of the respective parts and the thickness of the beam also have dispersion, so that it is difficult to completely achieve the target value for $\Delta f$. Further, when $\Delta f$ is changed with respect to any primary factor, even when the given angular velocity is fixed, the sensibility, the resolution, the zero point output (the off-set output), and such like are all changed.

Accordingly, in order to solve the above problem, it is required that the frequency adjustment be added by a simple and automatic method after the sensor component is manufactured.

When a direct voltage is applied to the portion between the folded type beam and the adjacent frequency adjusting electrode, it is possible to increase the sensibility of the angular velocity sensor by variably adjusting the resonance frequency in the exciting direction so as to bring it close to the resonance frequency in the detecting direction.

Further, concerning the change of the sensor characteristic due to the manufacturing process, temperature, or other periodical change, the beam shape of the vibrator and the electrical circuit are improved so as to automatically add the function, so that most post-manufacture adjustment can be automated and high performance can be maintained for a long time after manufacture. Manufacture costs can thereof be maintained to a low level since a special process is not used in manufacture.

In the resonance type angular velocity sensor according to the present invention, the following aspect may also be employed.

First, any two of the resonance type angular velocity sensors are used as a pair, the mass portions of the pair of sensors are respectively excited in such a manner as to be in opposite phase to each other in the same exciting direction. Accordingly, the structure is made that the exciting force is respectively applied to the two mass portions in such a manner as to have 180 degrees phase difference. In this structure, when the Coriolis force acts on the direction perpendicular to both of the exciting direction and the rotational axis direction of tie angular velocity so that the mass portion is displaced, the displacement direction of the mass portion is in direct opposition to each other between the two mass portions.

In the case of the single resonance type angular velocity sensor, when acceleration acts in the same direction as the operating direction of the Coriolis force in the mass portion, the mass portion displaces in the same manner as when angular velocity is applied.

Then, when a structure is made such that a pair of resonance type angular velocity sensors are used and the two mass portions are respectively excited with 180 degrees phase opposition, as described above, the Coriolis force respectively generated in the two mass portions directly opposite each other, making it relatively easy to selectively detect the angular velocity. Accordingly, the influence of the accelerator in the operating direction of the Coriolis force can easily be canceled, and high reliability can be attained.

A structure in which a displacement detector for detecting the displacement of the mass portion is provided in one end of the displacing direction of the mass portion and a displacement controller is provided in the other end of the displacing direction of the mass portion can also be employed. The displacement controller controls the mass portion in such a manner that when the mass portion is displaced by the operation of the Coriolis force and the displacement detector detects the displacement thereof, this displacement of the mass portion is canceled in response to the detection. Further, the displacement detector detects the displacement of the mass portion on the basis of the control amount required for canceling displacement. When a displacement controller having an above structure is provided, the linearity, sensibility, frequency characteristic, temperature characteristic, and the like of the resonance type angular velocity sensor can be improved.

Further, according to the present invention, a structure can be made such that the mass excitation supporting beam is provided with at least three parallel beam members having substantially the same length, extending to a direction perpendicular to the exciting direction of said mass displacement supporting base, the other ends disposed in an opposite portion to said respective mass displacement supporting base of the at least three beam members are connected to each other in the direction parallel to said exciting direction by the connecting beams. Still further, in this case, one end close to the mass displacement supporting base of one beam member among said three or more beam members is connected to said mass displacement supporting base in such a manner as to displace to said exciting direction, while the other beam members are disposed in both sides of said one beam member with holding said one beam member therebetween so that one end close to said mass displacement supporting base portion of each of said other beam members is fixed.

Still further, as another aspect, one end close to the mass displacement supporting base of one beam member among said at least three beam members may be connected to said mass displacement supporting base in such a manner as to displace to said exciting direction and the other beam members are disposed only in one side in said exciting direction of said one beam member.

Since the beam member one end of which is connected to the mass displacement supporting base, is connected to a plurality of beam members, one end of each being fixed to the substrate or the like so as to form a folded type beam, said mass excitation supporting beam is securely prevented from being curved to the Coriolis force generating direction.

Further, when said respective mass excitation supporting beam member is constructed by a plurality of beam members disposed in parallel to each other and the connecting beam connecting these and said connecting beam is structured such as to be separated from the connecting beam of the other mass excitation supporting beam member, wiring with respect to the various kinds of electrodes can be easily accomplished. Concretely speaking, when the displacement detecting electrode is disposed between the two mass excitation supporting beam members located in the one end direction and the other end direction of the exciting direction of the mass portion, wiring to the displacement detecting electrode can be easily done. Wiring with respect to the detecting electrode or the like disposed between the separated connecting beams can be formed by a vacuum evaporation method or the like with respect to the conductive material such as a metal and a patterning, so it is not necessary to bond an independent lead wire to the electrode.

In other aspect of the present invention, there is provided a sensor formed on the substrate, exciting the mass portion to be an inertia mass in parallel to the plane direction of said substrate and detecting the change of the vibration frequency of said mass portion, comprising a mass portion; a pair of mass displacement supporting bases for supporting said mass portion therebetween, being disposed in an exciting direction of the mass portion; amass displacement direction supporting beam extending from said respective mass displacement supporting bases to said mass portion and supporting said mass portion in such a manner as to allow it to displace to the Coriolis force direction; a mass excitation supporting beam for supporting said mass displacement supporting bases for inhibiting said respective mass displacement supporting base from displacing to said Coriolis force direction and allowing said mass portion to vibrate to said exciting direction on said mass displacement direction supporting beam; an exciter for exciting said mass portion by exciting said mass displacement supporting bases; and a displacement detector for detecting the displacement of said mass portion.

In this aspect, said mass excitation supporting beams have at least three parallel beam members having substantially the same length, extending to the direction perpendicular to the exciting direction of said mass displacement supporting base, one end close to the mass displacement supporting base of one beam member among said at least three beam members is connected to said mass displacement supporting base portion in such a manner as to displace to said vibrating direction, the other beam members are disposed in both sides of said one beam member with holding said one beam member therebetween or disposed only one side in the exciting direction of said one beam member, one end close to said mass displacement supporting base portion of said other beam members is fixed, and the other ends opposite to said mass displacement supporting base portion of said one beam member and said other beam members are connected to each other in the direction parallel to said exciting direction by the connecting beam.

With the above structure, since the displacement of the mass excitation supporting beam to a direction other than said exciting direction can be securely restricted, it is easy to accurately detect the change of the resonance frequency in the mass portion caused by the acceleration sensor, temperature sensor, or the like, as well as the angular velocity.

BRIEF DESCRIPTION OF THE DRAWINGS

FIGS. 11A and 11B are schematic views which shows an operation of the angular velocity sensor 502 shown in FIG. 10;

FIG. 28 is a plan view which shows a resonance type angular velocity sensor in accordance with an embodiment 9 of the present invention;

FIG. 31 is a table which shows a calculated result representing an easiness of a deformation to the x axis direction and the y axis direction of the beam in the respective beam structures;

FIGS. 33A, 33B, 33C, 33D, 33E, and 33F are schematic views which shows a deformation state in the respective beam structures shown in FIG. 31.

DESCRIPTION OF THE PREFERRED EMBODIMENTS

Embodiment 1
(Structure of an angular velocity sensor)

Figure 3:
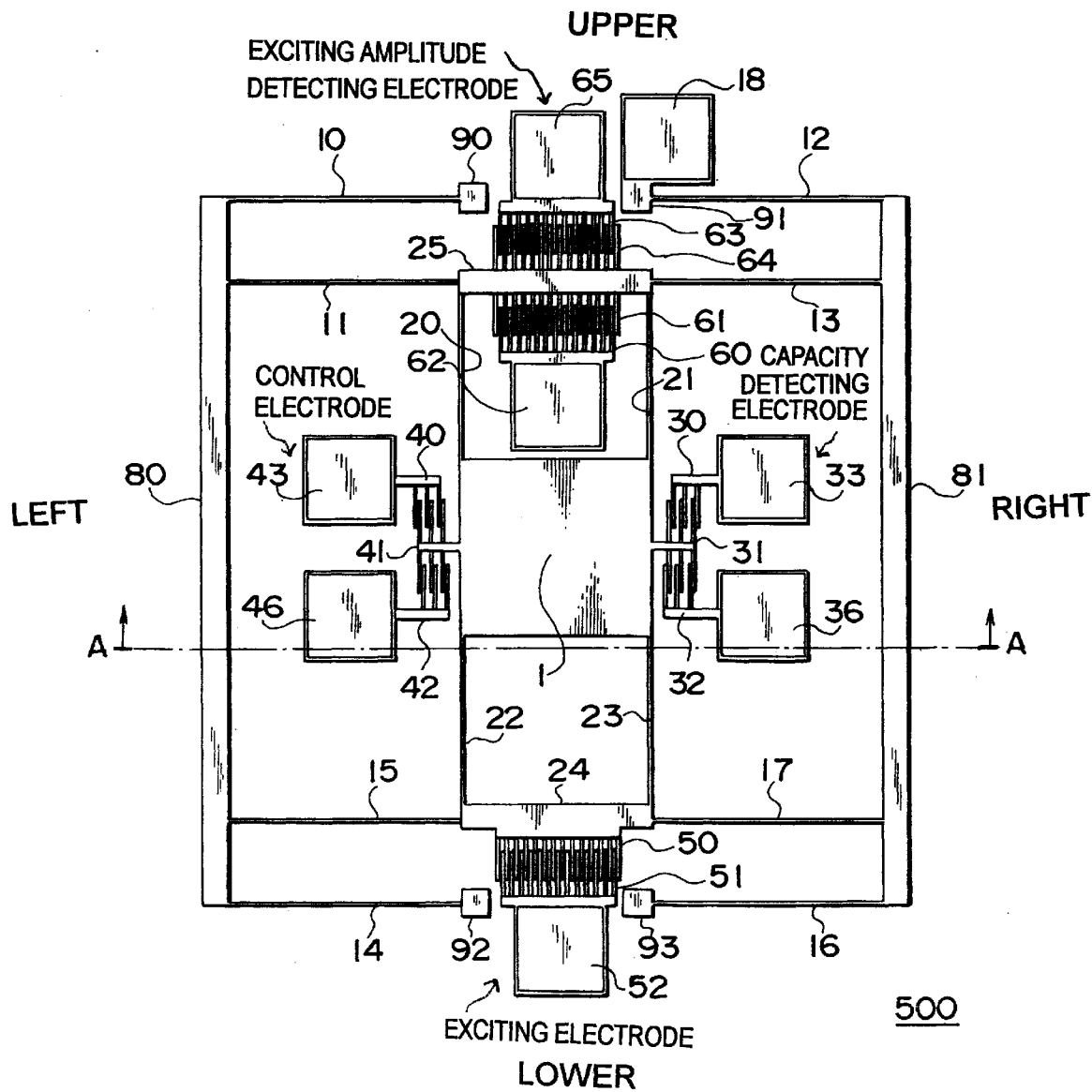
FIG. 3 is a plan view which shows a resonance type angular velocity sensor in accordance with an embodiment 1 of the present invention.
Figure 4:
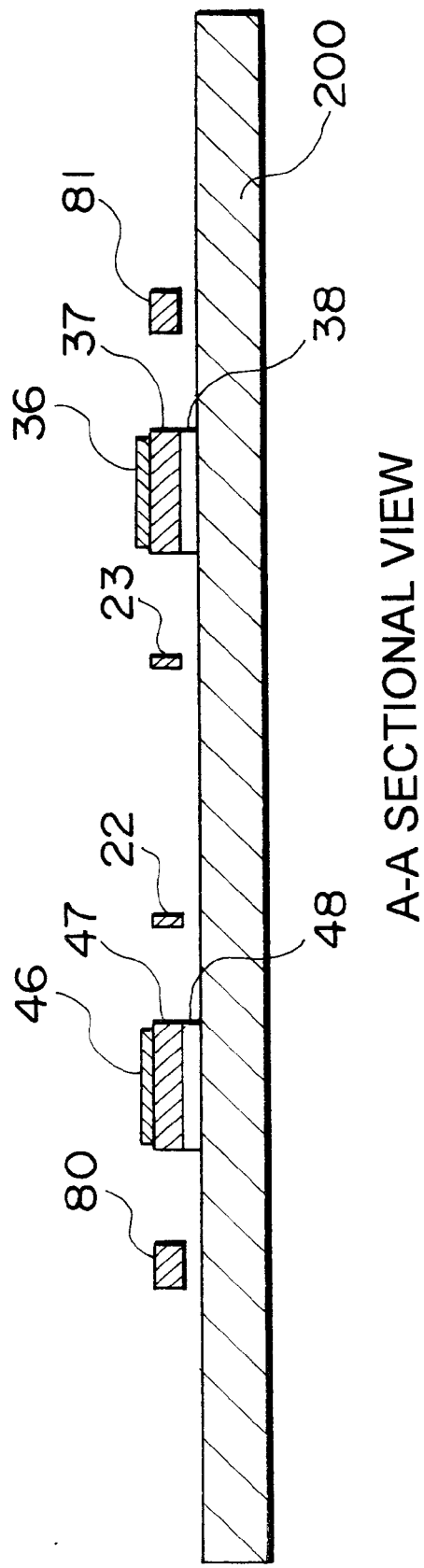
FIG. 4 is a cross sectional view along a line 4—4 which shows the angular velocity sensor 500 shown in FIG. 3.
Figure 5:
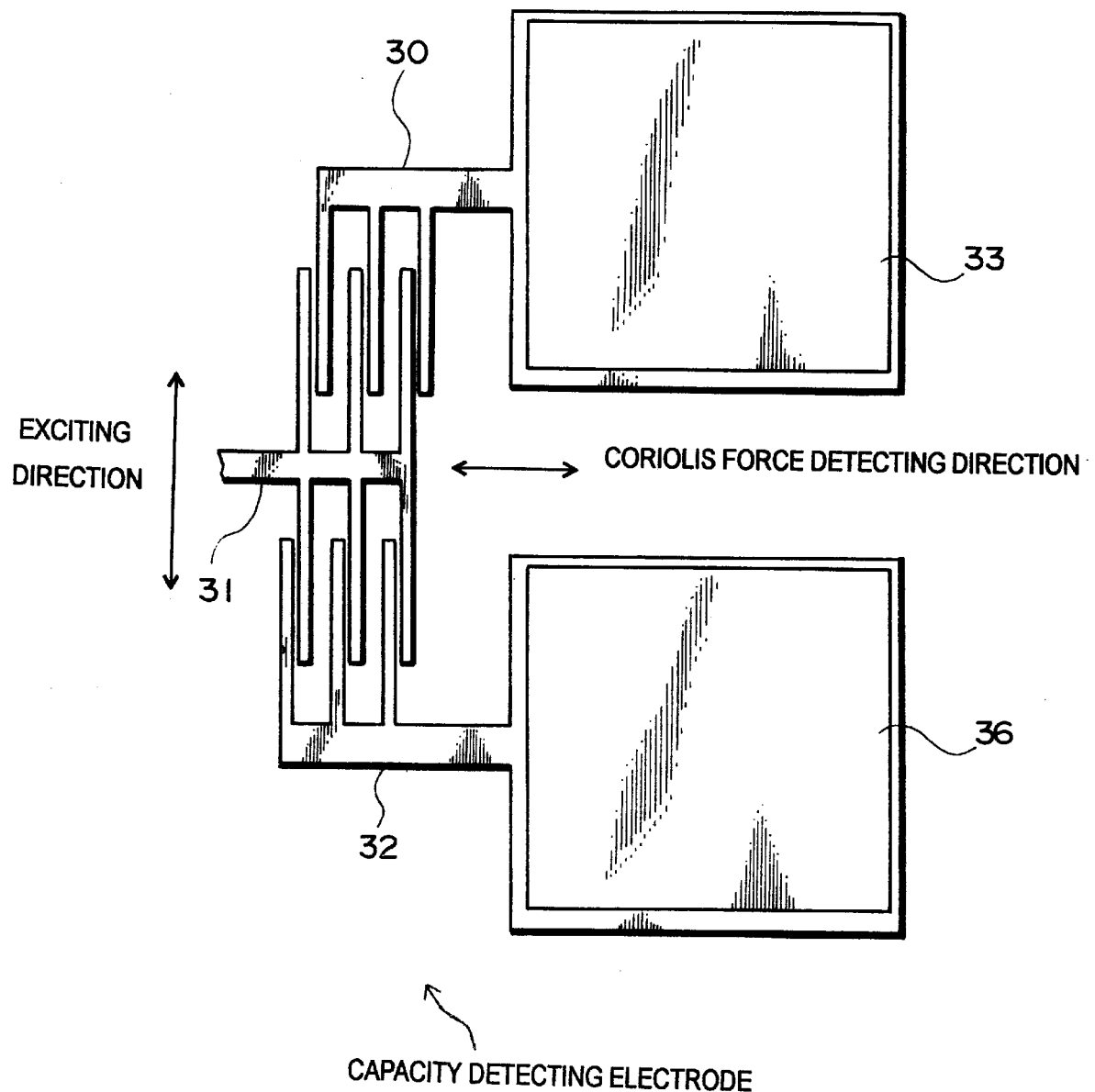
FIG. 5 is a schematic view which shows the structure near the capacity detecting electrode of FIG. 3.

FIG. 3 is a plan view of an angular velocity sensor in accordance with embodiment 1, FIG. 4 is a cross sectional view along a line 4—4 in FIG. 3, FIG. 5 is an enlarged view of a volume detecting electrode and FIGS. 6A, 6B, 6C, 6D, 6E shows an example of a process for manufacturing the angular sensor.

The angular velocity sensor of embodiment 1 is a fine angular velocity sensor manufactured using a micro machine technology for silicon. In this angular velocity sensor 500, a mass portion 1 is supported on by a mass excitation supporting beam and a mass displacement supporting beam in such a manner as to float on a substrate surface.

Specifically, a pair of mass displacement supporting base portions 24 and 25 hold the mass portion 1 therebetween in an exciting direction (a vertical direction in FIG. 3) and mass displacement supporting beams 20, 21, 22, and 23 respectively extend to the mass portion 1 from each of the mass displacement supporting base portions 24 and 25, thereby supporting the mass portion 1 from the vertical direction in FIG. 3 so as to allow the displacement of the mass portion in a direction of Coriolis force generation when a Coriolis force is generated.

Further, in the embodiment 1, as the mass excitation supporting beam for supporting the mass portion 1 in the exciting direction thereof, a folded beam comprising beam members 10, 11, 12, 13, 14, 15, 16, and 17 and connecting portions 80 and 81 connecting therebetween is used. In the folded beam, beam members 11, 13, 15, and 17 support respective mass displacement supporting base portions 24 and 25 from the lateral direction in FIG. 3, thereby inhibiting the displacement of the mass displacement supporting base portions 24 and 25 to the Coriolis force generating direction, and allowing the vibration of the mass portion 1 to the exciting direction through the mass displacing direction supporting beams 22 and 23.

In the folded beam, one end of each of the beam members 10, 12, 14, and 16 is connected to each respective anchors 90, 91, 92, and 93 fixed to the substrate. Parts (the mass portion 1and the respective supporting beams) constituting the vibration portion are supported on the substrate in the angular velocity sensor by these four anchor portions 90, 91, 92, and 93 in a floating manner.

Comb electrodes 50, 61, and 64 are respectively formed on the mass displacement supporting base portions 24 and 25 supported by the folded beam.

In this structure, a comb exciting electrode 51 constituting an exciting means for exciting the mass portion 1 is disposed at a position opposite to the comb electrode 50 of the mass displacement supporting base portion 24, and at least the base portion of electrode 51 is fixedly supported to the substrate. An electrode pad 52 is formed in the above portion of the exciting electrode 51. When an alternating voltage is applied to a portion between the comb electrodes 50 and 51 through the electrode pads 52 and 18, an electrostatic attraction force is generated and the mass displacement supporting base portion 24 is excited, so that the vibration of the mass displacement supporting base portion 24 is transmitted to the mass portion 1 through the mass displacement supporting beams 22 and 23, while the mass portion 1 vibrates to the exciting direction in the vertical direction in FIG. 3.

Further, a pair of comb detecting electrodes 60 and 63 for detecting an amplitude of the excitation of the mass portion 1 are disposed at the positions respectively opposing to the comb electrodes 61 and 64 of the mass displacement supporting base portion 25 shown in the above portion of FIG. 3, and in these electrodes, at least the base portions thereof are respectively fixed and supported to the substrate. Electrode pads 62 and 65 are connected to the respective comb detecting electrodes 60 and 63, and, when the excitation of the mass portion 1 is transmitted to the mass displacement supporting base portion 25 through the mass displacement supporting beam 20 and 21, the electrostatic capacity between the comb electrodes 61 and 64 and the comb detecting electrodes 60 and 63 is changed. The exciting amplitude in the mass portion 1 is then determined based on the change in capacity. In embodiment 1, in order to reduce noise influence, as the structure is made in such a manner as to obtain a differential output between the capacity change between the electrodes 63 and 64 and the electrodes 61 and 60, the exciting amplitude can be very accurately measured.

In FIG. 3, projecting electrodes 31 and 41 having a parallel planer plate shape are projected and formed on the right and left side surfaces of the mass portion 1. Further, capacity detecting electrodes 30 and 32, for detecting the displacement of the mass portion 1 to the lateral direction in FIG. 3 due to the Coriolis force generated by the angular velocity around the rotating axis of the direction perpendicular to the paper surface in FIG. 3, and control electrodes 40 and 42, for controlling the displacement of the mass portion 1, are fixed to the substrate at the positions opposing to the projecting electrodes 31 and 41.

In this case, when the mass portion 1 is changed to the lateral direction in FIG. 3 due to the Coriolis force based on the angular velocity, the respective electrostatic capacity between the capacity detecting electrodes 30 and 32 and the projecting electrode 31 is changed. With respect to this, an alternating voltage is applied to the portion between the control electrode 40 and the projecting electrode 41 and between the control electrode 42 and the projecting electrode 41 through the electrode pads 43 and 46 from the outer portion, thereby controlling in such a manner that the displacement of the mass portion 1 detected by the electrodes 30, 31 and 32, 31 in the capacity detecting end becomes zero. Then, the displacement amount of the mass portion 1 is calculated on the basis of the control amount necessary for making the displacement of the mass portion 1 zero.

In embodiment 1, a pair of capacity detecting electrodes 30 and 32 are provided, and the displacement of the mass portion 1 in the lateral direction is detected by measuring the differential output of the electrostatic capacity between the electrodes 30 and 31 and between the electrodes 31 and 32, so that the measuring accuracy can be improved. Further, a pair of control electrodes (the electrodes 40 and 42) are provided, thereby improving control accuracy and further improving measuring accuracy.

In such a case, smaller applied angular velocities will result in smaller amplitudes to the directing direction generated by the Coriolis force. Accordingly, the change of the electrostatic capacity in the capacity detecting electrodes 30 and 32 provided for the purpose of measuring such a fine amplitude change is also small, so that it is not easy to measure such a fine capacity change.

Then, in accordance with embodiment 1, in order to increase the change of the electrostatic capacity in the set amplitude, the number n of the planner plate electrodes disposed in parallel to the direction which does not prevent the exciting amplitude, i.e. the teeth number n of the comb electrodes, is increased. FIG. 5 shows an enlarged structure of the comb capacity detecting electrodes 30 and 32 in FIG. 3 and the comb projecting electrode 31 opposing thereto, and in the embodiment having the capacity detecting electrodes 30 and 32 and the projecting electrode 31 opposing thereto shown in FIG. 5, the teeth numbers of respective combs are three. When the teeth number of the comb is set n, the change amount of the electrostatic capacity becomes n times, so that the amplitude measurement can be made easy.

(Manufacturing method)

Figure 6A:
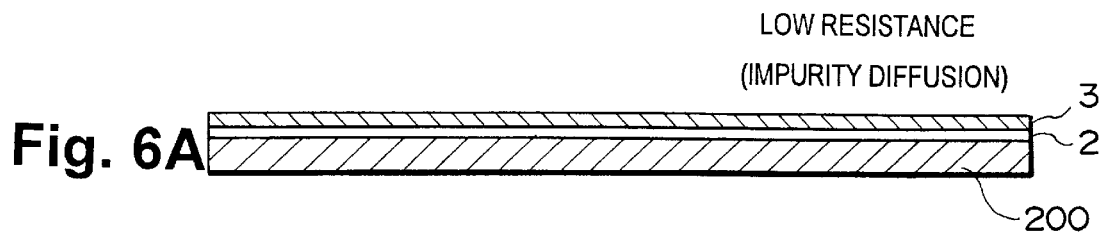
FIGS. 6A, 6B, 6C, 6D, and 6E are schematic views which show a manufacturing process of the angular velocity sensor 500 shown in FIG. 3.

The angular velocity sensor 500 can be manufactured by the process shown in FIGS. 6A, 6B, 6C, 6D, and 6E. First, in the angular velocity sensor 500, as shown in FIG. 6A, a film 3 made of an elastic material (for example, a single crystal or a polycrystal or the like) is formed on a substrate 200 a material, for example, a silicon substrate or a substrate of ceramic, glass or the like, through an insulating film such as a thin oxidation film 2 (for example, $SiO_2$). The elastic material film 3 may be made of a metal such as a nickel or the like or any other material. However, since these films 3 are also used for the electrode for detecting the magnitude of the amplitude of the vibrating member as a capacity change, in the case of using, for example, a silicon material, it is preferable to dope and diffuse an impurity such as phosphorus and boron so as to reduce resistance rate.

Figure 6B:
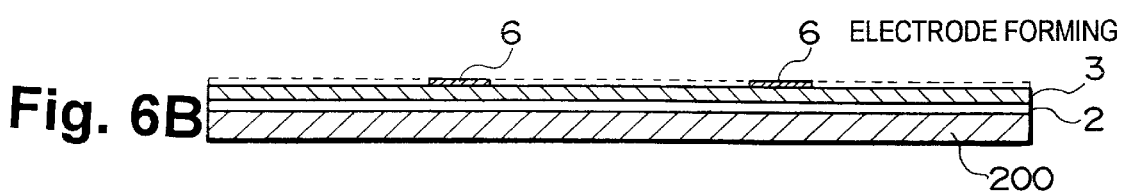

After forming the elastic material film 3, as shown in FIG. 6B, a conductive film 6 for the electrode is formed on the elastic material film 3, and patterned to a desired shape by a photo resist process or the like.

Figure 6C:
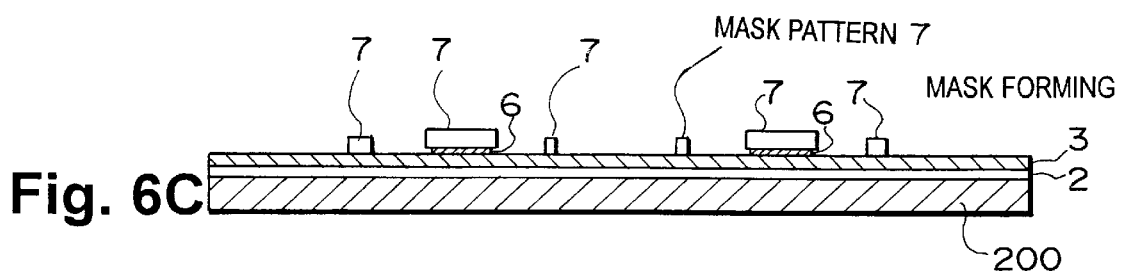
Figure 6D:
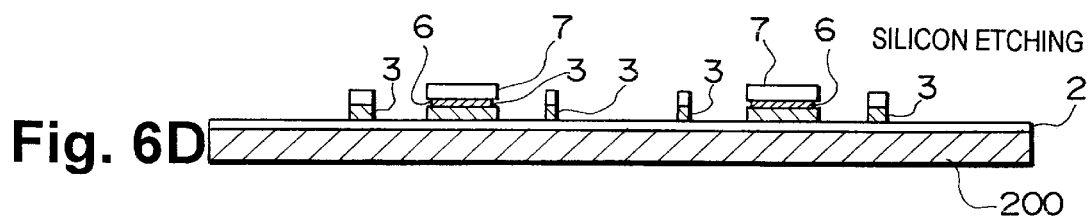
Figure 6E:
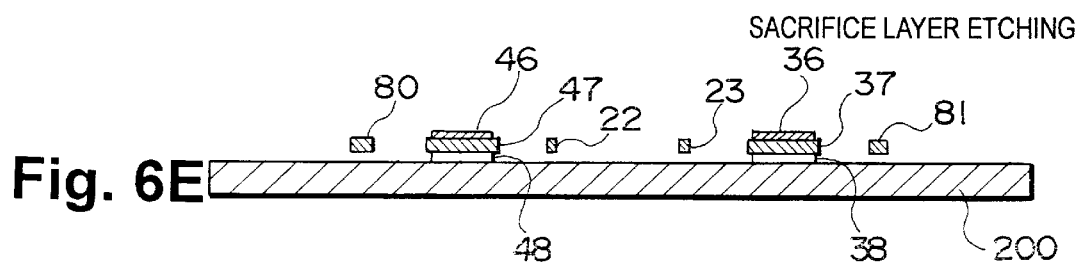

Next, a mask pattern 7 using the resistor the like is formed as shown in FIG. 6C, with setting this mask pattern 7 as a mask, the elastic material film 3 is etched to pattern the desired shape by a dry etching technique, an anisotropic wet etching technology, or such like.

Figure 1C:
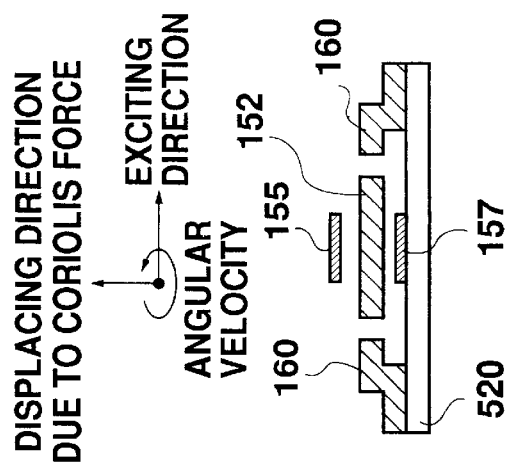
FIGS. 1A, 1B, and 1C are schematic views which show a conventional a resonance type angular velocity sensor.
Figure 1B:
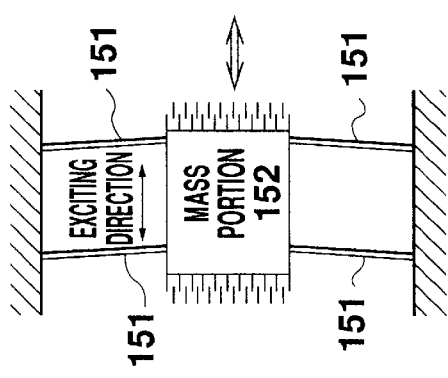
Figure 1A:
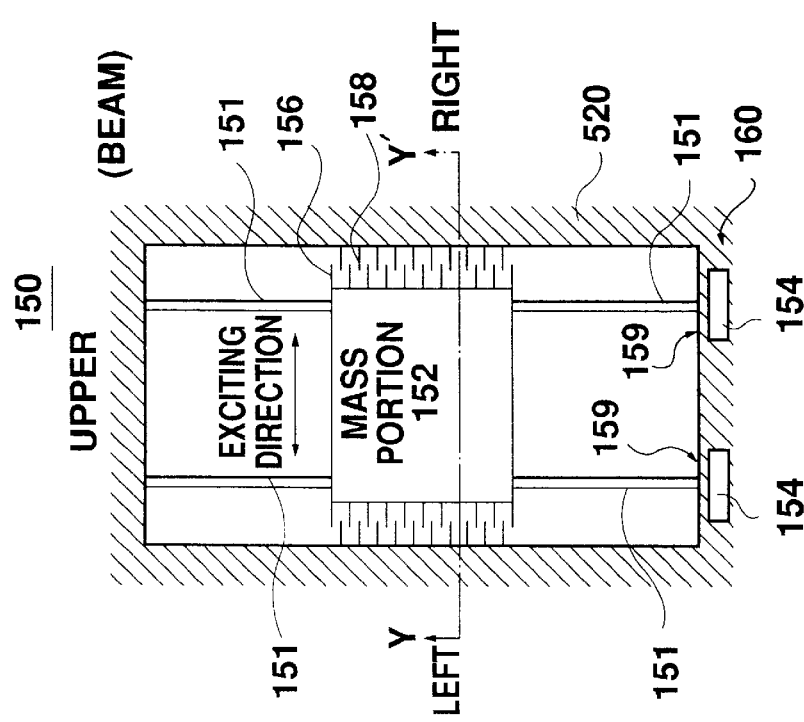
Figure 2:
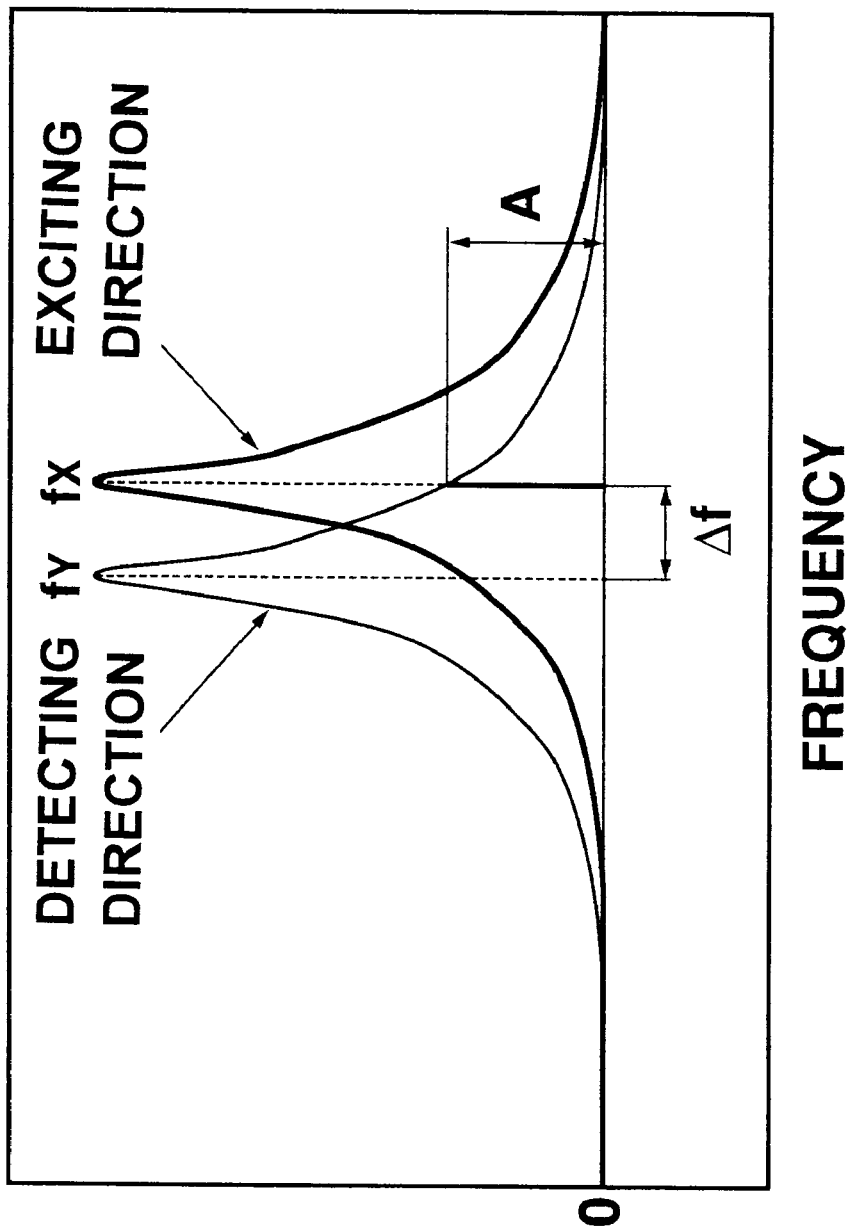
FIG. 2 is a schematic view which explains a difference Δf of a resonance frequency between two directions.

Thereafter, the oxidation film 2 in the lower portion of the elastic material film 3 constituting the respective beams and the mass portion 1 is selectively removed by a sacrifice layer etching technology or the like so that the structure body for vibrating as shown in FIG. 1 is formed on the silicon substrate 200.

In the angular velocity sensor 500, the planer plate like mass portion 1 serving as an inertia mass is formed on the center thereof. Further, since the mass portion 1 is necessarily supported on the substrate 200 in a floating manner, it is necessary to selectively remove the oxidation film 2 in the forming area of the mass portion 1. Sacrifice layer etching technology mentioned above is a popular method for forming the above structure. The sacrifice layer etching is based on the phenomenon that, when the substrate is soaked in a hydrofluoric acid, the vibration portion having the mass portion 1 formed by the silicon remains unchanged and only the portion made of silicon oxide is corroded by the hydrofluoric acid. Then, in the planner plate like mass portion 1, in order to efficiently permeate the hydrofluoric acid into the silicon oxide disposed in the lower layer of the silicon (the elastic material film 3), a multiplicity of holes are provided on the silicon surface. In this case, a dimension of the hole has an optimum value. When the hole is too small, the hydrofluoric acid is hard to pass and, when the hole is too large, the hole does not serve as amass. Accordingly, it is understood to be appropriate that the diameter of the hole be made substantially equal to the thickness of the mass portion 1.

(Operation)

An operation of the angular sensor 500 will be described below. First, a vibration system in the exciting direction will be described.

In the sensor, the sensor sensitivity with respect to the angular velocity input is in proportion to the exciting amplitude. Accordingly, in order to obtain a high sensitivity, a structure suitable for increasing the exciting amplitude is preferable. For example, when a straight beam such as the beams 20, 21, 22, and 23 in FIG. 3 is used for exciting the amplitude, the beam is drawn to the longitudinal direction at a time of a large amplitude so that a tensile stress is generated within the beam. Accordingly, the spring constant of the beam is increased and the relation between the displacement and the beam becomes non-linear. In other words, as the exciting amplitude increases, the resonance frequency in the exciting direction increases, and the sensor characteristic is changed.

Accordingly, in the exciting vibration system taking with the large amplitude, it is preferable that a folded beam be used in place of a straight beam used in embodiment 1 because the beam length is not changed at a time of the large amplitude, while and the spring constant is fixed, even at a time of large amplitude. The sensor characteristic is therefore not changed, as the fixing method for supporting the beam is different from the method for supporting the straight beam.

In the folded beam in accordance with the embodiment, the beam members 10, 12, 14, and 16, the respective ends of which are connected to the anchor portions 90, 91, 92, and 93 and the beam members 11, 13, 15, and 17 constituting a pair thereof have the same length in the lateral direction in FIG. 3. It is then structured that the connecting ends to the respective anchor portions and the opposite end portions are connected to each other by the connecting portions 80 and 81. When the exciting force is applied to the mass displacement supporting base portion 24 by the exciting electrode 51, the mass displacement supporting base portion 24 is vibrated causing the beam members 15 and 17 to vibrate in response thereto. Vibration is further transmitted to the beam members 14 and 16 paired with the beam members 15 and 17 through the connecting portions 80 and 81 so that the beam members 15 and 14 and the beam members 17 and 16 are vibrated in a similar manner.

Further, vibration is transmitted to the beam members 10 and 1and the beam members 12 and 13 disposed near the excitation detecting electrodes 61 and 63 through the connecting portions 80 and 81, and these members are vibrated in the same manner. The mass portion 1 connected to the mass displacement base portions 24 and 25 through the mass portion displacement supporting beams 20, 21, 22, and 23 is vibrated in the vertical direction in FIG. 3.

In this case, the mass excitation supporting beam is not always limited to the folded beam, but may also be the straight beam. In the case of using the straight beam, the anchor portion is provided in the lateral direction of the mass displacement supporting portions 24 and 25 in FIG. 3 and a straight beam extending from the mass displacement supporting base portions 24 and 25 to the anchor portion is provided. When using a straight beam in the above manner, the characteristic is slightly deteriorated as compared with a folded beam when the amplitude to the exciting direction of the mass portion 1 is great, as mentioned above. However, the beam can be separated in the supporting direction of the mass portion 1, so that the function of securely preventing the leakage vibration of the beam from generating to the Coriolis force detecting direction can be obtained in the same manner as the case of the folded type beam.

Next, the vibration system in the Coriolis force detecting direction will be described below. In accordance with embodiment 1, in the detecting direction, as is different from the exciting direction, a straight beam (20, 21, 22 and 23) is employed, as mentioned above. The straight beam is structured such that both ends of the beam are supported and the shape of the beam is straight. Accordingly, the beam is drawn from both ends in a tensional manner, is easily manufactured, and securely supports the mass portion 1. When the displacement amount of the straight beam is large, disadvantages as mentioned above are generated. However, since the Coriolis force generated in the detecting end generated by applying the angular velocity is actually small, and the tensile stress generated within the amplitude of the beam is as small as the negligible degree, the straight type beam which can simplify the structure and improve the yield at a time of manufacturing is preferable for the mass displacement supporting beam.

Next, an operation of the exciting amplitude control mechanism will be described below. Since the vibration in the exciting direction is a resonance state, the amplitude is significantly increased due to a vibration quality factor (hereinafter refer to a vibration Q value) which is affected by the structure. However, due to the temperature and the long time period, it is considered that the vibration Q value is changed by pressure changes within the sensor package and the deterioration of the fixing state of the vibrator. Accordingly, the exciting amplitude is changed and the sensitivity is dispersed. Then, a mechanism for compensating the change of the Q value is required. In embodiment 1, the exciting amplitude of the mass portion 1 is measured by the change of the electrostatic capacity between the electrodes 61 and 64 detected by the exciting amplitude detecting electrodes 60 and 63, and the alternating voltage applied to the portion between the exciting side electrodes 50 and 51 is controlled in such a manner as to keep the exciting amplitude in the mass portion 1 constant. As a result of this, without regard to the change of the Q value, a fixed sensibility can be obtained with respect to the angular velocity.

Next, feedback technology with respect to the vibration to the Coriolis force detecting direction of the mass portion 1 will be described below. As mentioned above, the mass portion 1 is excited by the exciting side electrodes 50 and 51. When the angular velocity around the perpendicular direction to the surface of FIG. 3 as the rotational axis is applied to the mass portion 1 excited in the above manner, the Coriolis force Fc is generated in the lateral direction in FIG. 3 (in the detecting direction). The mass portion 1 begins vibrating to the detecting direction perpendicular to the exciting direction.

An electrostatic capacity between the capacity detecting electrodes 30 and 32 and the projecting electrode 31 is changed due to the vibration of the mass portion 1 to the detecting direction. Accordingly, information concerning the position, velocity, acceleration, and angular velocity of the mass portion 1 can be detected from the change. Further, in the embodiment 1, the calculated control amount is applied to the control electrodes 40 and 42 as an alternating voltage, so as to deny the motion of the mass portion 1. Accordingly, the feedback loop is formed so that the motion of the mass portion 1 is restricted to the adjacent portion of the zero point. In the embodiment 1, a control using a null-balance method mentioned above is performed by using the control electrode, so that the linearity, frequency characteristic, responsibility, sensibility, and temperature characteristic of the sensor can be improved.

As mentioned above, as in embodiment 1, the mass excitation supporting beam for supporting the mass portion in such a manner as to vibrate to the exciting direction as mentioned above, and the mass displacing direction supporting beam for supporting in such a manner as to allow the mass portion to displace to the Coriolis force generating direction are independently provided. Accordingly, in the case of vibrating the mass portion excitation supporting beam to the exciting direction, even when the leak vibration component to the beam thickness direction is generated in the beam, the direction of the leak vibration component does not cioncide with the direction of detecting the Coriolis force, so that the sensor output of the resonance type angular velocity sensor 500 is little affected by the beam shape. Accordingly, without relation to the dispersion of the manufacturing process which effects the dispersion of the beam shape, a sensor having a high detection accuracy can be obtained.

Further, by separating the beam, for example, independently adjusting the tensile stress of each of the beams, an optimum $\Delta f$ can be easily obtained.

Further, by supporting the mass portion in the two directions perpendicularly crossing to each other by means of the independent beam, the exciting direction and the Coriolis force detecting direction can be made coplanar. Accordingly, the process of manufacturing the angular velocity sensor can be greatly simplified.

In embodiment 1, the mass portion 1 is supported by the respective two straight type beams 20, 21, 22, and 23, from both vertical sides of the mass portion 1. However, the mass portion 1 may be supported by the respective one straight type beam from the vertical direction. In such a case, as shown in FIG. 3, when the mass portion 1 is supported by the respective two straight type beams 20, 21, 22, and 23, the folds in the plane direction of the mass portion 1 are difficult to generate, and support can be secured.

Figure 7:
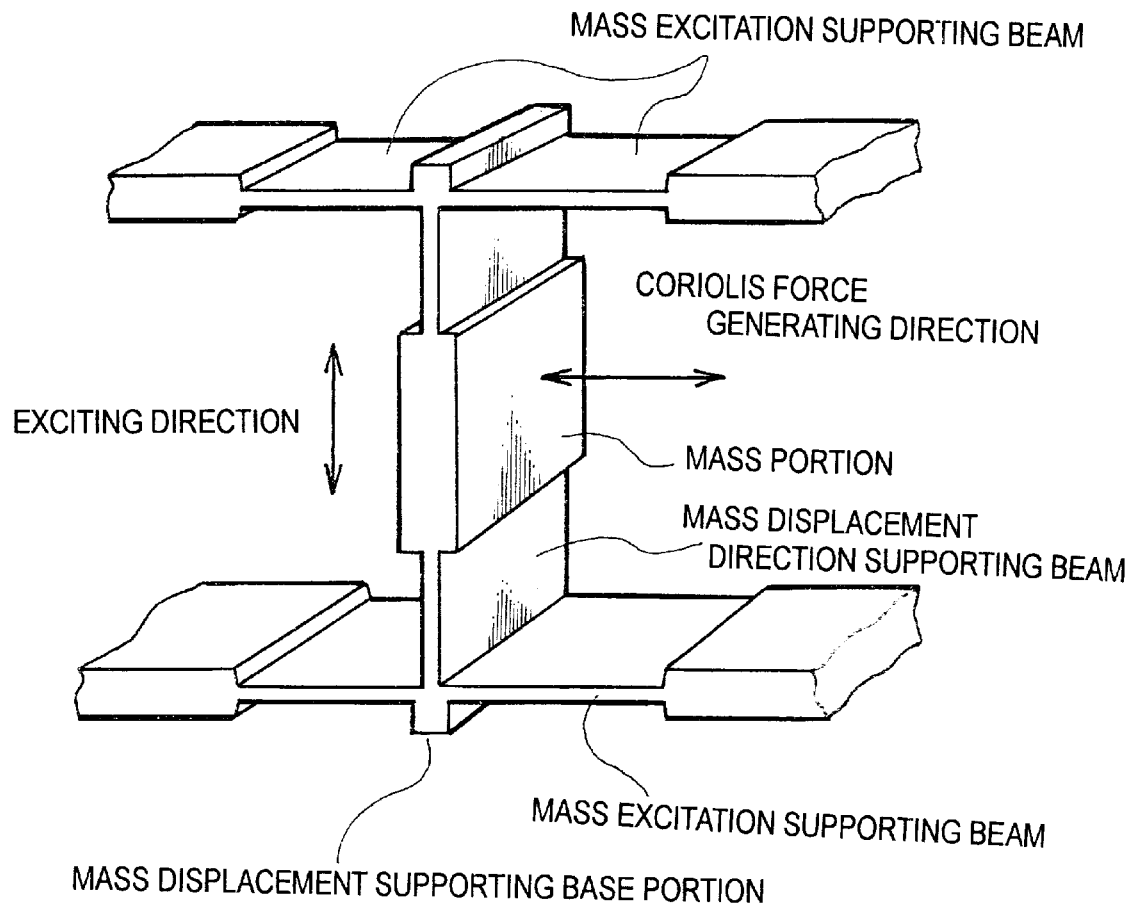
FIG. 7 is a schematic view which shows another structure of a resonance type angular velocity sensor in accordance with the embodiment 1.

Further, in the embodiment 1, the exciting direction of the mass portion 1 and the direction of detecting the Coriolis force are coplanar with the planer plate mass portion, however, the structure is not limited to this, and the displacing direction of the mass portion 1 due to the Coriolis force may be set to the thickness direction of the plate of the mass portion, as shown in FIG. 7. In FIG. 7, the mass excitation supporting beam supports the mass portion through the mass displacement supporting base portion from the direction (the horizonal direction in the drawing) perpendicular to the plate plane direction of the mass portion, so as to excite the mass portion to the plane direction (the vertical direction in the drawing). Further, the mass displacement supporting beam supports the mass portion from the exciting direction thereof in such a manner so as to allow the mass portion to displace due to the Coriolis force. Even in such a case, since the mass excitation supporting beam and the mass displacement supporting beam are separated from each other, the structure can be made such that the leak vibration due to the vibration to the mass exciting direction of the mass excitation supporting beam does not appear in the Coriolis force detecting direction.

Embodiment 2

Figure 8:
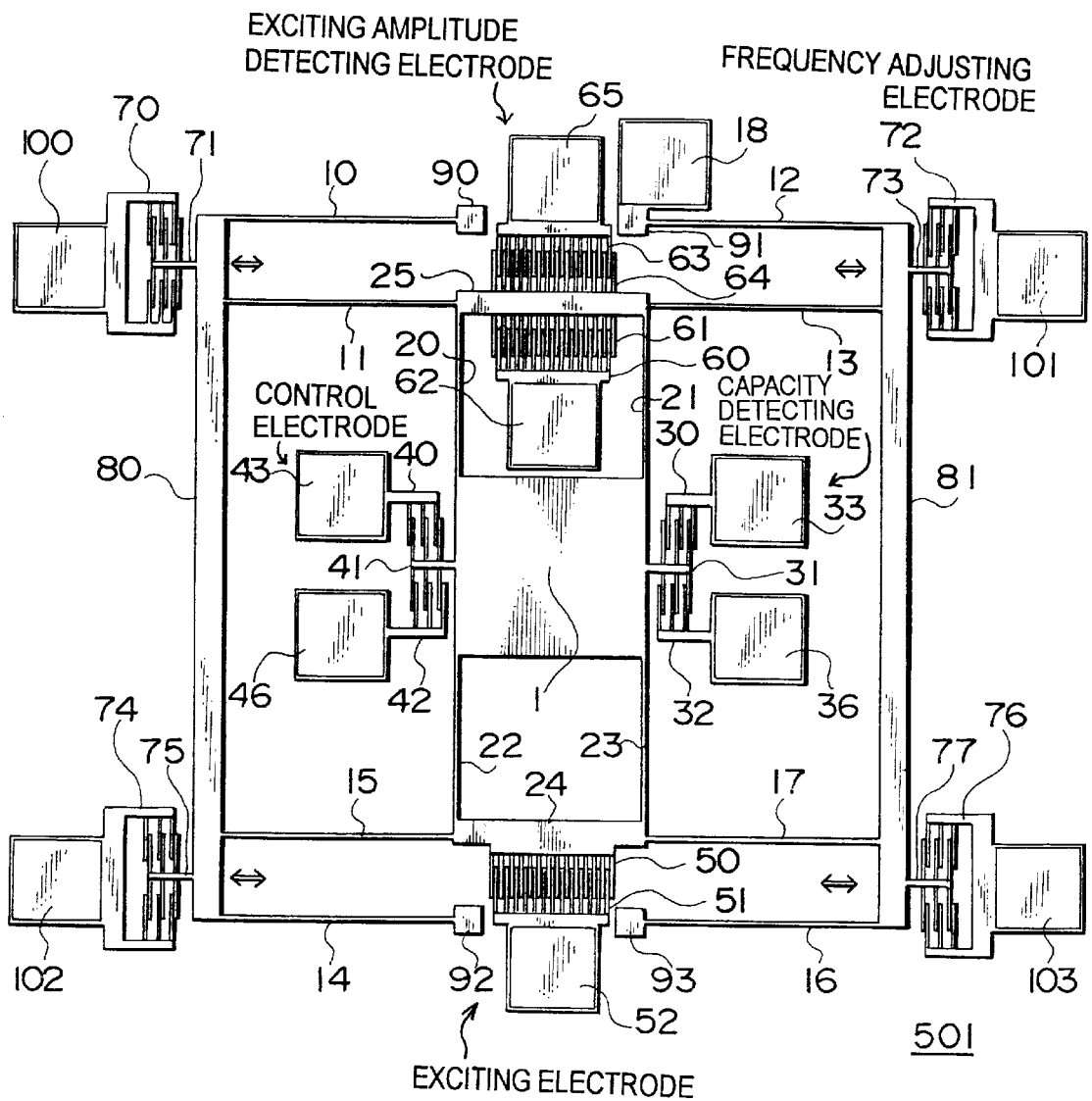
FIG. 8 is a plan view which shows a resonance type angular velocity sensor in accordance with an embodiment 2 of the present invention.

Embodiment 2 will next be described below. Embodiment 2 enables adjusting the frequency difference Δf between the exciting frequency (resonance frequency) of the mass portion 1 and the vibrating frequency (resonance frequency) to the Coriolis force detecting direction to an appropriate value by structuring that either of the exciting frequency of the mass portion 1 or the vibrating frequency to the Coriolis force detecting direction can be selectively adjusted. FIG. 8 shows a structure of an angular velocity sensor 501 in accordance with embodiment 2.

In embodiment 2, the mass displacement supporting beam and the mass excitation supporting beam are separated in the same manner as in embodiment 1. Further, in embodiment 2, the frequency is adjusted using the characteristics of the respective beams.

Although adjustment can be performed using either one of the exciting direction or the detecting direction, simultaneously, changing both frequencies at the same time make the adjustment complex, and should be avoided. Accordingly, in adjusting the frequency, it is an important point whether or not each of the resonance frequencies in the exciting direction and the detecting direction can be independently changed. Then, a matching between the adjusting mechanism and the sensor structure is the most important in order to add the frequency adjusting mechanism to the angular velocity sensor.

Methods of adjusting the Δf include an electric adjusting method using a static electricity force and a mechanical adjusting method using a laser trimming or the like. In the embodiment 2, the electric adjusting method is used. The principle of the electric adjusting method in embodiment 2 is that the beam is drawn to the longitudinal direction by the electrostatic attraction or the compression stress is generated, so that the spring constant is changed so as to variably adjust the resonance frequency. The advantage of the electric adjustment is that the Δf can be automatically adjusted, with the following three objects.

First, the adjusting process after combining with the sensor is simplified. Accordingly, adjusting costs can be reduced. Further, when the electric circuit necessary for the adjustment is formed at the same time of forming the other electric circuit, no excess cost is required.

Second, sensor stability can be maintained for a long time. Generally speaking, sensors mounted on vehicles or the like are used for long period of time. Under such conditions, as there is a possibility that the sensor characteristic changes due to the change of the mechanical characteristic of the vibrator and the change of the pressure within the package, it is preferable that the sensor characteristic be observed and automatically adjusted so as to operate in the optimum state for a long time.

Third, the temperature characteristic of the sensor can be improved. For controlling a vehicle, the temperature sensor use varies widely, from −30° C. to +85+ C. In the case of being used in the above severe condition, there is a possibility that the sensor characteristic is changed due to the temperature. The characteristic change is automatically restricted by the electric adjustment so that the temperature characteristic of the sensor can be improved.

Among the above adjustments, in order to achieve the second and third objects, it is impossible to pre-adjust the angular velocity sensor before forwarding because the environment causing the change of the sensor characteristic is experienced after the forwarding of the sensor. Accordingly, in order to independently adjust the resonance frequency in the exciting or detecting direction, one preferable solution is to independently separate the respective exciting and detecting vibrating systems. This means that the beam supporting the vibrating mass portion 1 is independently separated and that it is further necessary that the mass portion 1 can freely move in both the exciting and the detecting directions because the mass portion 1 vibrates perpendicular to the exciting direction, and is always excited when the angular velocity is applied. In the embodiment 2, as in the same manner as the embodiment 1, a structure having a good adjusting efficiency can be obtained by independently separating the beam used for the exciting direction and the beam used for the detecting direction.

In the angular velocity sensor 501 shown in FIG. 8, the exciting frequency is adjusted by applying the tensile stress or the compression stress against the mass excitation supporting beam.

As shown in FIG. 8, the mass excitation supporting beam is a folded beam and comb frequency adjusting projecting electrodes 71, 73, 75, and 77 are formed on the side of connecting portions 80 and 81 connecting the one ends of the respective beam members 10, 11, 12, 13, 14, 15, 16, and 17. Further, comb frequency adjusting electrodes 70, 72, 74, and 76 are disposed at a position opposite to the respective comb projecting electrodes 71, 73, 75, and 77 in such a manner as to mesh with these projecting electrodes. In this case, electrode pads 100, 101, 102, and 103 made of conductive material are formed in the respective adjusting electrodes 70, 72, 74, and 76.

When the electrostatic attraction force is applied to the portion between the frequency adjusting electrodes 70, 72, 74, 76, and 77 and the corresponding projecting electrodes 71, 73, 75, and 77 by applying a direct voltage to the portion between the frequency adjusting electrodes 70, 72, 74, 76 and 77 and the corresponding projecting electrodes 71, 73, 75 and 77, the beam members 10 and 11; 12 and 13; 14 and 15; and 16 and 17 are drawn to the direction of the frequency adjusting electrodes. Accordingly, the tensile stress is generated in the respective beam members 10, 11, 12, 13, 14, 15, 16, and 17, so that the resonance frequency of the beam member in the exciting direction, that is, the resonance frequency in the exciting direction of the mass portion 1 is increased. Further, when the electrostatic reaction force is applied to the portion between the both, compression stress is generated in the respective beam members 10, 11, 12, 13, 14, 15, 16, and 17, so that the resonance frequency of the beam body (the exciting frequency of the mass portion 1) is decreased.

In such a case, when direct voltage is applied to the portion between the frequency adjusting electrode and the electrode opposing thereto, the electrostatic attraction force is generally served between the both and tensile stress is generated in the respective beam members. However, when the positions of the electrodes 70, 71, 72, 73, 74, 75, 76, and 77 are changed, compression stress can be generated by applying an electrostatic attraction force between them. This can be achieved by generating compression stress in the beam members 10, 11, 12, 13, 14, 15, 16, and 17, which can be achieved by, for example, the structure shown in FIG. 8. In this structure, comb projecting electrodes having the same structure as that of the projecting electrodes 71 and 73 are formed near the middle portion in the exciting direction of the connecting portions 80 and 81, the frequency adjusting electrodes are disposed opposite thereto and the center portion is drawn to the outward direction in the lateral direction in the drawing. The exciting resonance frequency can be reduced using compression stress as mentioned above.

Further, in the frequency adjusting mechanism using comb electrodes shown in FIG. 8, a multiplicity of combs of the frequency adjusting electrodes 70, 72, 74, and 76 are disposed in a small area in such a manner as to oppose to the comb electrodes, so that the beam members 10, 11, 12, 13, 14, 15, 16, and 17 can efficiently apply tensile and compression stresses. In the structure shown in FIG. 3, the electrodes 70, 71, 72, 73, 74, 75, 76, and 77 are disposed near the extending line of the beam members 10, 11, 12, 13, 14, 15, 16, and 17. This beam securely generates tensile stress.

In embodiment 2, a desired tensile or compression stress can be generated in the beam members 10, 11, 12, 13, 14, 15, 16, and 17 by providing the frequency adjusting mechanism. Then, the tensile stress or the compression stress to the beam member does not affect beams 20, 21, 22, and 23 corresponding to the mass displacement beam. Accordingly, as a result, it is possible to freely adjust just the resonance frequency in the exciting direction.

(Circuit structure and operation)

Figure 9:
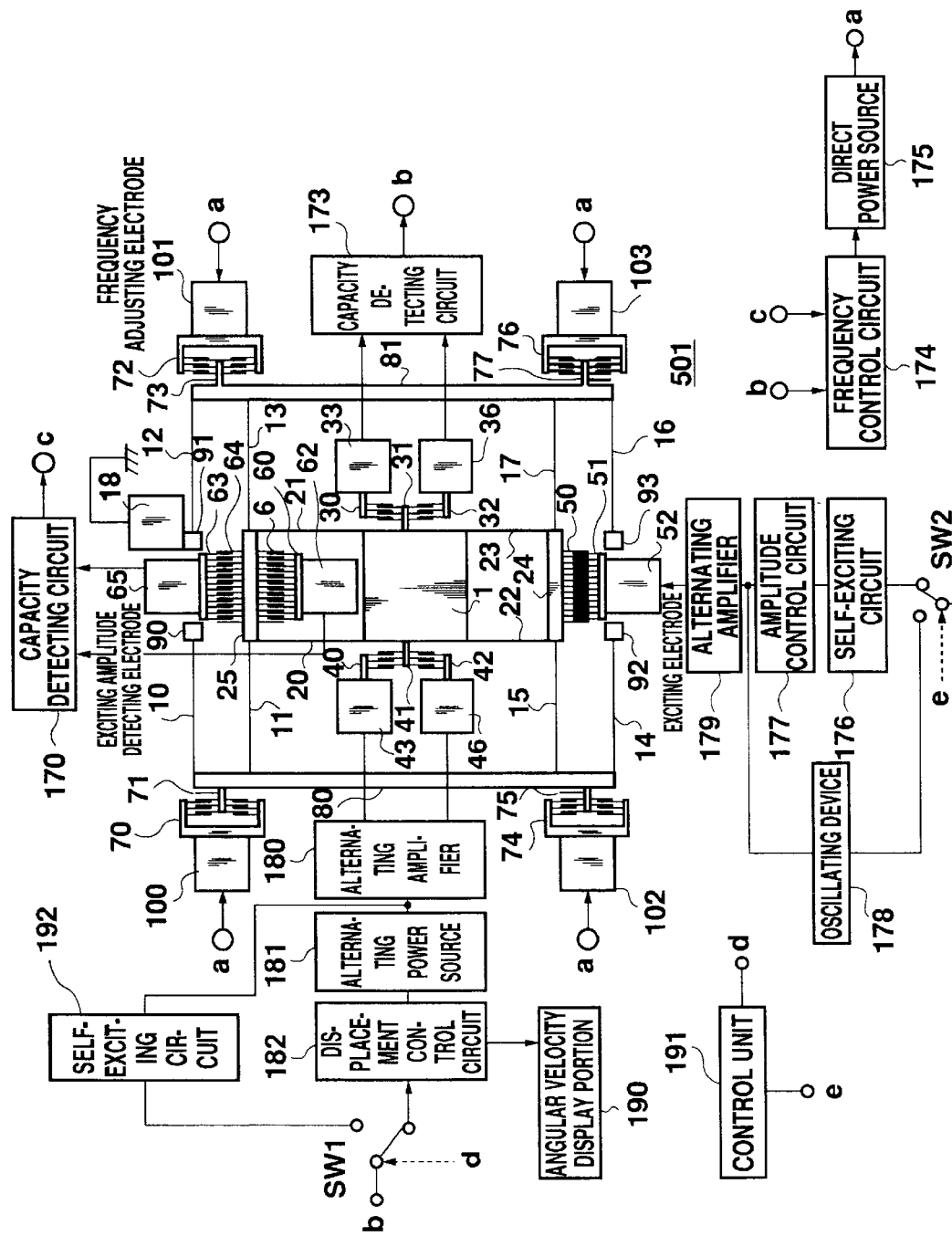
FIG. 9 is a schematic view which shows a circuit structure for controlling the angular velocity sensor 501 of FIG. 8.

The angular velocity sensor 501 of embodiment 2 is driven, and the resonance frequency in the respective directions is controlled, by, for example, a circuit structure shown in FIG. 9.

Drive of angular velocity sensor 501

For driving the angular velocity sensor, a switch SW1 is set to a displacement control circuit 182 and a switch SW2 is set to a self-exciting circuit 176 by a control unit 191.

Alternating voltage supplied through an amplitude control circuit 177 and an alternating amplifier 179 from the self-exciting circuit 176 is applied to the exciting electrode 51, so that the mass portion 1 is vibrated to the exciting direction. The vibration is detected by a capacity detecting circuit 170 through the exciting amplitude detecting electrodes 60 and 63 and the detected output from the capacity detecting circuit 170 is supplied to the self-exciting circuit 176, which generates a self-exciting signal on the basis of the above detected output and further the amplitude control circuit 177 controls in such a manner as to make the amplitude of the vibration constant on the basis of the excitation control signal. Then, in accordance with the above structure, a feedback loop is formed in such a manner that the mass portion 1 always vibrates to the exciting direction with an appropriate frequency and an appropriate amplitude.

When the Coriolis force due to the angular velocity operates during vibration of the mass portion 1 to the exciting direction and the mass portion 1 displaces to the detecting direction so as to vibrate, the vibration to the detecting direction of the mass portion 1 is transmitted to the capacity detecting circuit 173 through the capacity detecting electrodes 30 and 32 as a capacity change and the change thereof is detected.

The detected output from the capacity detecting circuit 173 is supplied to the displacement control circuit 182 and the displacement control circuit 182 controls the alternating power source 181 in such a manner as to make the displacement of the mass portion 1 zero on the basis of the detected output, so that the corresponding control voltage is applied to the control electrodes 40 and 42 through the alternating amplifier 180.

Further, the displacement control circuit 182 determines the Coriolis force acting on the mass portion 1 on the basis of the control signal necessary for making the displacement of the mass portion 1 zero, and is then able to calculate the corresponding angular velocity. Then, the calculated angular velocity is output to the angular velocity display portion 190 and a desired display is performed.

Adjustment of frequency

At first, the switch SW1 and SW2 are respectively set to the self-exciting circuit 192 end and the self-exciting circuit 176 end by the control unit 191.

Next, alternating voltage is applied to the portion between the control electrodes 40 and 42 and the projecting electrode 41 through the alternating amplifier 180 from the self-exciting circuit 192. Vibration to the detecting direction of the mass portion 1 is transmitted to the capacity detecting circuit 173 through the capacity detecting electrodes 33 and 36 as the capacity change. The capacity detecting circuit 173 generates the detected output using the capacity change and supplies the detected output to the frequency control circuit 174.

Next, the exciting frequency in the exciting direction Δf apart from the resonance frequency in the detecting direction of the mass portion 1 obtained by the drive mentioned above is determined and set. The self-exciting circuit 1 generates vibration, and supplies it to the exciting electrode 50 through the alternating amplifier 179, so that: the mass portion 1 is vibrated to the exciting direction. The vibration to the exciting direction of the mass portion 1 is detected by the capacity detecting circuit 170, and the mass portion 1 is vibrated to the exciting direction with the resonance frequency. The detected output is supplied to the frequency control circuit 174.

The frequency control circuit 174 determines a lag between the optimum frequency difference Δf and the actual frequency difference Δf on the basis of the respective detected output from the capacity detecting circuit 173 in the detecting direction and the capacity detecting circuit 170 in the exciting direction, and controls the direct current power source 175 in correspondence to the lag. Further, when the direct voltage from the direct current power source 175 is applied to the respective frequency adjusting electrodes 70, 72, 74, and 76, a predetermined stress acts on the beam members 10 to 17, the vibration frequency in the exciting direction is changed and the frequency difference Δf between the vibration frequency in the detecting direction, and the vibration frequency in the exciting direction is changed.

As stated above, after detecting the actual frequency difference Δf, the desired voltage is applied to the frequency adjusting electrodes 70, 72, 74 and 76 in such a manner as to concur with the optimum frequency difference Δf, so that the vibration frequency in the exciting direction is selectively adjusted. These circuits then automatically perform the adjusting operation, thereby always driving the angular velocity sensor 50 with the optimum Δf, so that a high reliability can be maintained for a long time.

In such a case, the frequency adjusting method may use the following method. When the mass is vibrated to the exciting direction, even when the angular velocity is not given, mechanical coupling may be generated between the vibration in the exciting direction and the vibration in the detecting direction due to the manufacturing error in the beam cross section or the like, so that the exciting vibration leaks slightly to the detecting end. Accordingly, in this case, the leaked vibration component is positively used for adjusting the Δf using one or more two methods.

As a first method, the switch SW2 is set to the self-exciting circuit 176 end by the control unit 192. The alternating voltage generated in the self-exciting circuit 176 is applied to the exciting electrode 52 through the amplitude control circuit 177 and the alternating amplifier 179 so as to excite the mass portion 1 to the exciting direction. The frequency at this time becomes a natural frequency in the exciting direction. Further, when the voltage applied to the frequency adjusting electrodes 70, 72, 74, and 76 is swept with monitoring the vibration to the detecting direction generated by the coupling by means of the capacity detecting electrodes 30, 31, and 32, the resonance characteristic in the detecting direction can be known. The resonance frequency in the detecting direction is obtained by the peak value of the amplitude obtained here. Then, the voltage applied to the frequency adjusting electrodes 70, 72, 74 and 76 is determined so as to become the desired Δf.

As a second method, the switch SW2 is set to the vibration generator 178 by the control unit 192. The alternating voltage generated in the vibration generator 178 is applied to the exciting electrode 52 through the alternating amplifier 179 so as to excite the mass portion 1 to the exciting direction. The exciting frequency at this time is not always the natural frequency in the exciting direction. When the vibration generating frequency of the vibration generator is swept with monitoring the vibration to the detecting direction by the capacity detecting circuit 173, the resonance characteristic in the detecting direction can be known. Further, the resonance frequency in the exciting direction can be determined from the output from the capacity detecting circuit 170. Then, the voltage applied to the frequency adjusting electrodes 70, 72, 74, and 76 is determined so as to become the desired Δf.

Embodiment 3

Figure 10:
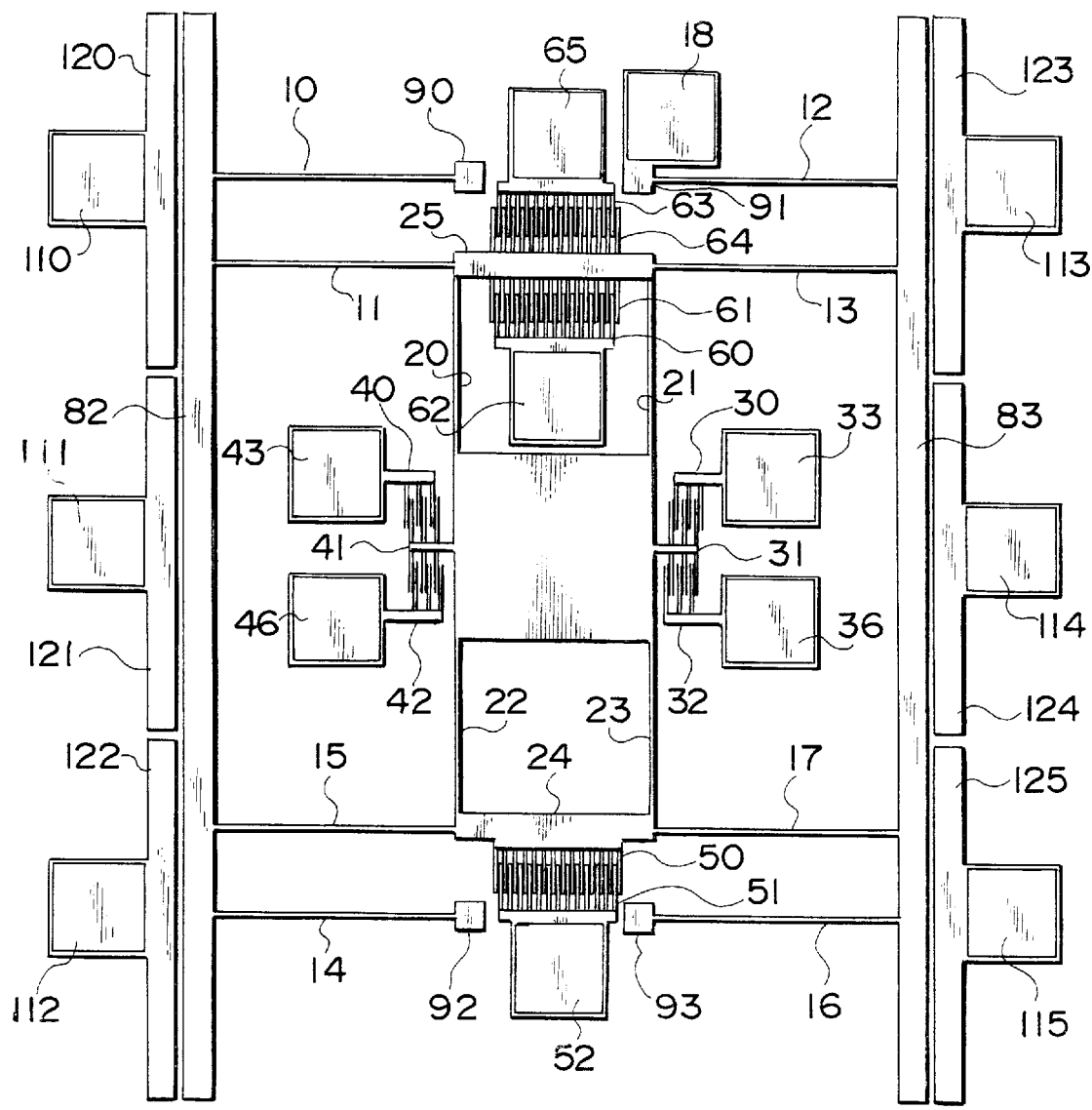
FIG. 10 is a plan view which shows a resonance type angular velocity sensor in accordance with an embodiment 3 of the present invention.

FIG. 10 shows an angular velocity sensor 502 provided with an electric frequency adjusting mechanism differing from the mechanism shown in FIG. 8. In the structure shown in FIG. 10, the connecting portions 81 and 80 are extended to the vertical direction in the drawing, to the exciting direction of the mass portion 1 so as to constitute the frame portions 82 and 83. The frequency adjusting opposing electrodes 84 and 85 are disposed with a slight distance with respect to the frame portions 82 and 83. The electrode pads 104 and 105 are respectively formed on the center portions in the exciting direction of the opposing electrodes 84 and 85. The stress is applied to the beam members 10, 11, 12, 13, 14, 15, 16, and 17 by applying the direct voltage to the portion between the opposing electrodes 84 and 85 and the frame portions 82 and 83. FIGS. 11A and 11B show states of respective portions in a case of outwardly drawing the center portions in the exciting direction of the frame portion 82 and 83 by using the opposing electrodes 84 and 85, in the structure shown in FIG. 10. FIG. 11A shows a state when voltage is not applied to the portion between the opposing electrodes 84 and 85 and the frame portions 82 and 83, while FIG. 11B shows a state in which a tensile force due to the electrostatic attraction force acts between the both. When the outward tensile force is applied to the center portion of the frame portions 82 and 83, as shown in FIG. 11B, the compression stress is generated in the respective beam members 10, 11, 12, 13, 14, 15, 16, and 17. The resonance frequency in the exciting direction of the mass portion 1 is changed by the above structure (in this case, the resonance frequency is lowered). In this case, the structure shown in FIG. 10 can be replaced by the structure in which the electrodes having a comb shape are provided at the center area in the exciting direction of the connecting portions 80 and 81.

Embodiment 4

Figure 12:
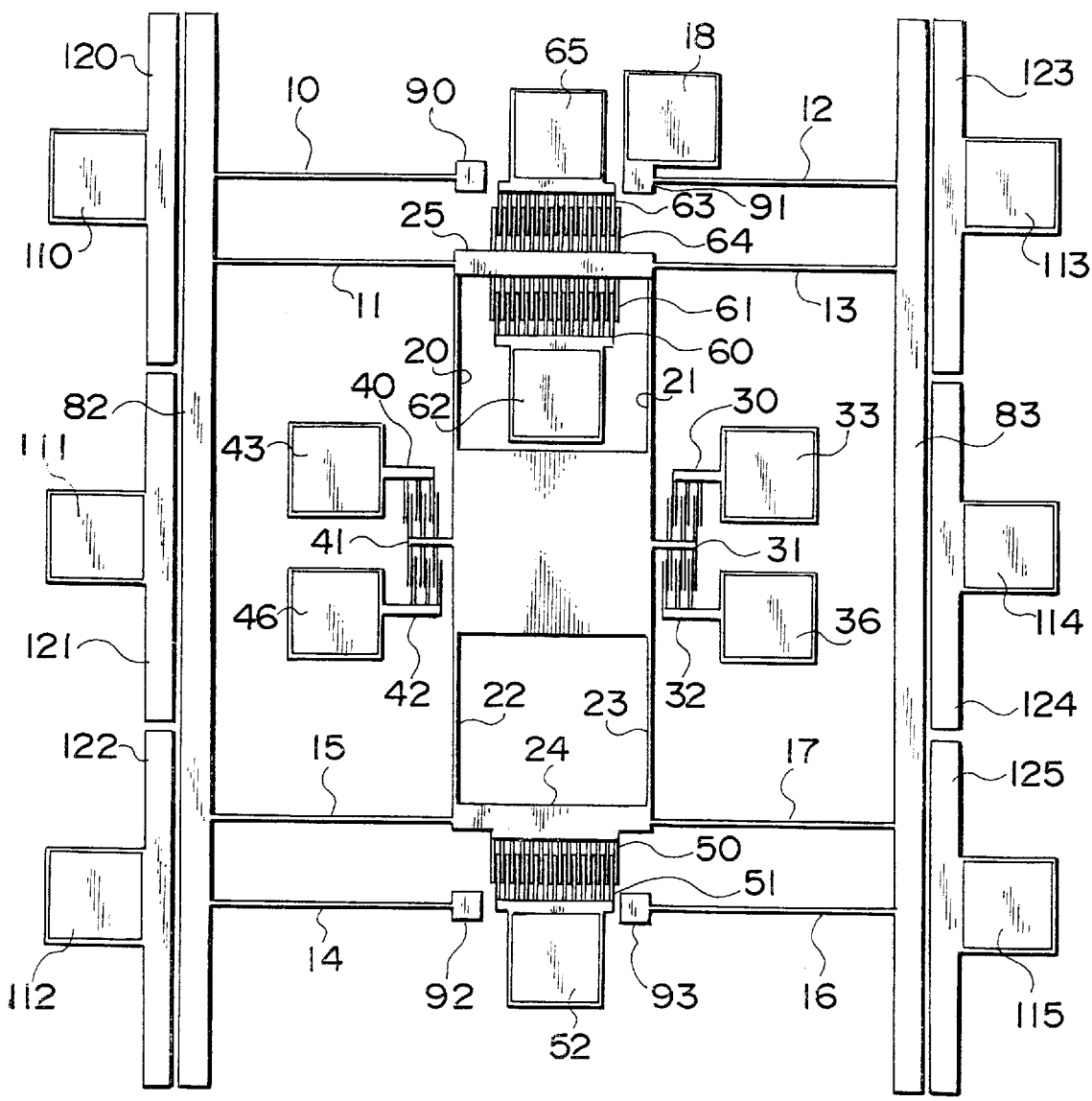
FIG. 12 is a plan view which shows a resonance type angular velocity sensor in accordance with an embodiment 4 of the present invention.

Next, an angular velocity sensor 503 provided with an electric frequency adjusting mechanism which is further different from the embodiments 2 and 3 mentioned above will be described below with reference to FIG. 12. In FIG. 12, sets of three frequency adjusting opposing electrodes 120, 121, and 122, and 123, 124, and 125 are respectively provided in such a manner as to oppose to the frame portion 82 and 83 extending to the exciting direction of the mass portion 1 with a fine interval. In this case, when electrostatic attraction force is applied by applying the direct voltage to the portion between the electrodes 120, 123 and 122, 125 and the frame portions 82 and 83, tensile stress is generated in the beam members 10, 11, 12, 13, 14, 15, 16, and 17, so that the resonance frequency in the exciting direction is increased. On the other hand, when electrostatic attraction force is applied by applying direct voltage to the portion between the electrodes 121 and 124 and the frame portions 82 and 83 using the electrodes 121 and 124, compression stress is generated in the beam members 10, 11, 12, 13, 14, 15, 16, and 17 and the resonance frequency in the exciting direction is reduced.

The structure using the frame portions 82 and 83 and the frequency adjusting opposing electrodes as shown in FIG. 10 of the embodiment 3 and FIG. 12 of the embodiment 4 has an advantage such that it is simple structure, allowing the manufacturing process yield to be improved. Further, in the structure in accordance with the embodiment 4, the exciting resonance frequency can be increased and decreased using a combination of electrodes.

Figure 13:
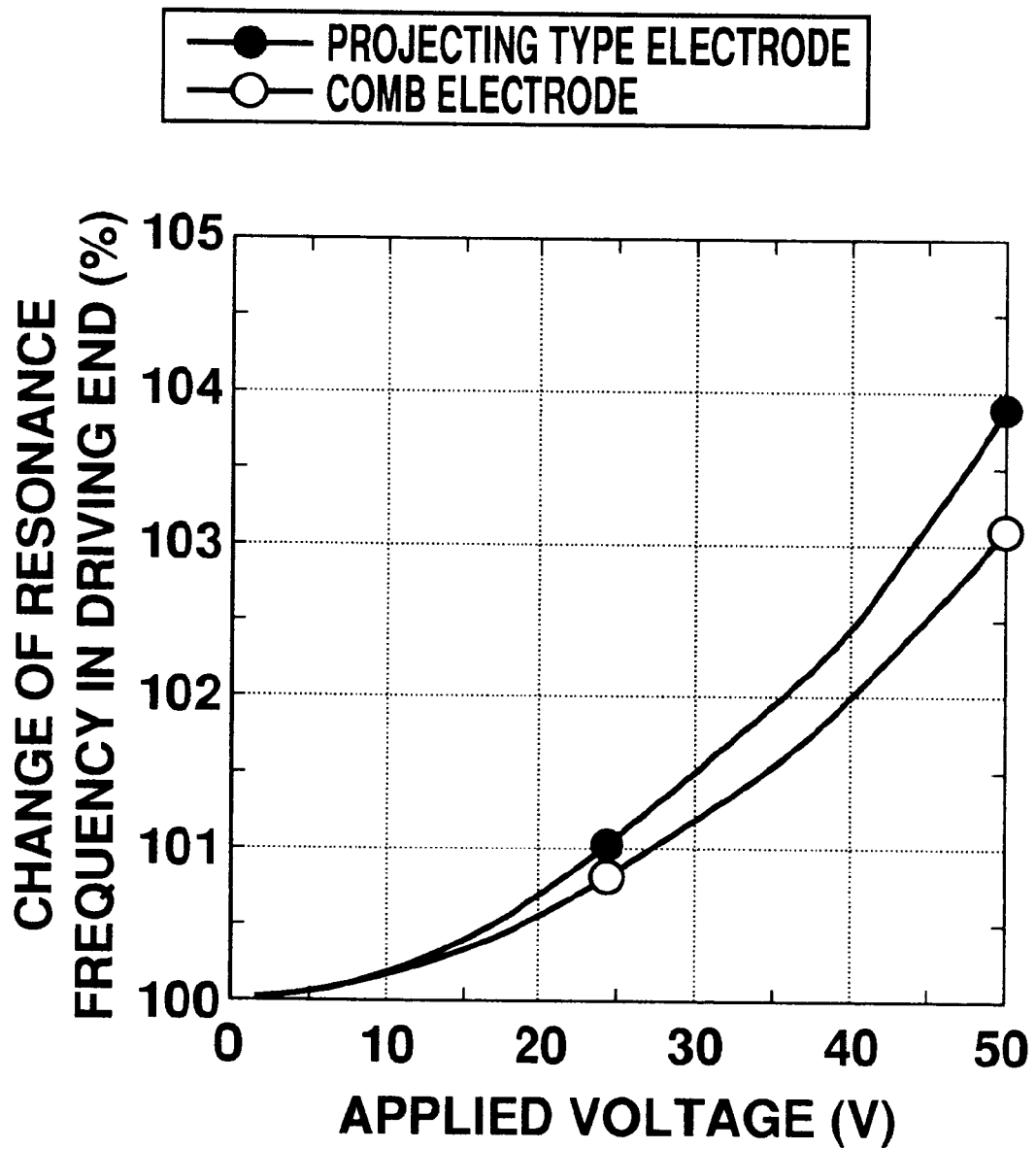
FIG. 13 is a graph which shows a frequency adjusting characteristic of the angular velocity sensors 501 and 503.

FIG. 13 shows a change of the applied voltage and the resonance frequency between the electrodes in the case of using the comb electrode system shown in FIG. 8 in accordance with embodiment 2 and the projecting electrode system shown in FIG. 12 in accordance with embodiment 4 (for example, in a case using only the opposing electrodes 120, 122, 123, and 125 shown in FIG. 12). In either system, it is possible that a higher applied voltage to the portion between the electrodes will, result in a higher resonance frequency at the driving end, that is, in the exciting direction of the mass portion is set. Then, in accordance with the electric adjusting methods, fine adjustment of the resonance frequency can be performed.

Embodiment 5

Embodiment 5 is provided with a mechanism for adjusting the frequency by a mechanical adjusting method which differs from embodiments 2 to 4 described above.

In the mechanical adjusting method, although adjustment is efficient, mechanical adjustment can only be performed in a factory. Fine adjustment is also difficult, so mechanical adjustment is particularly effective as a rough adjustment until the range in which the electrical adjusting method can be performed.

Figure 14A:
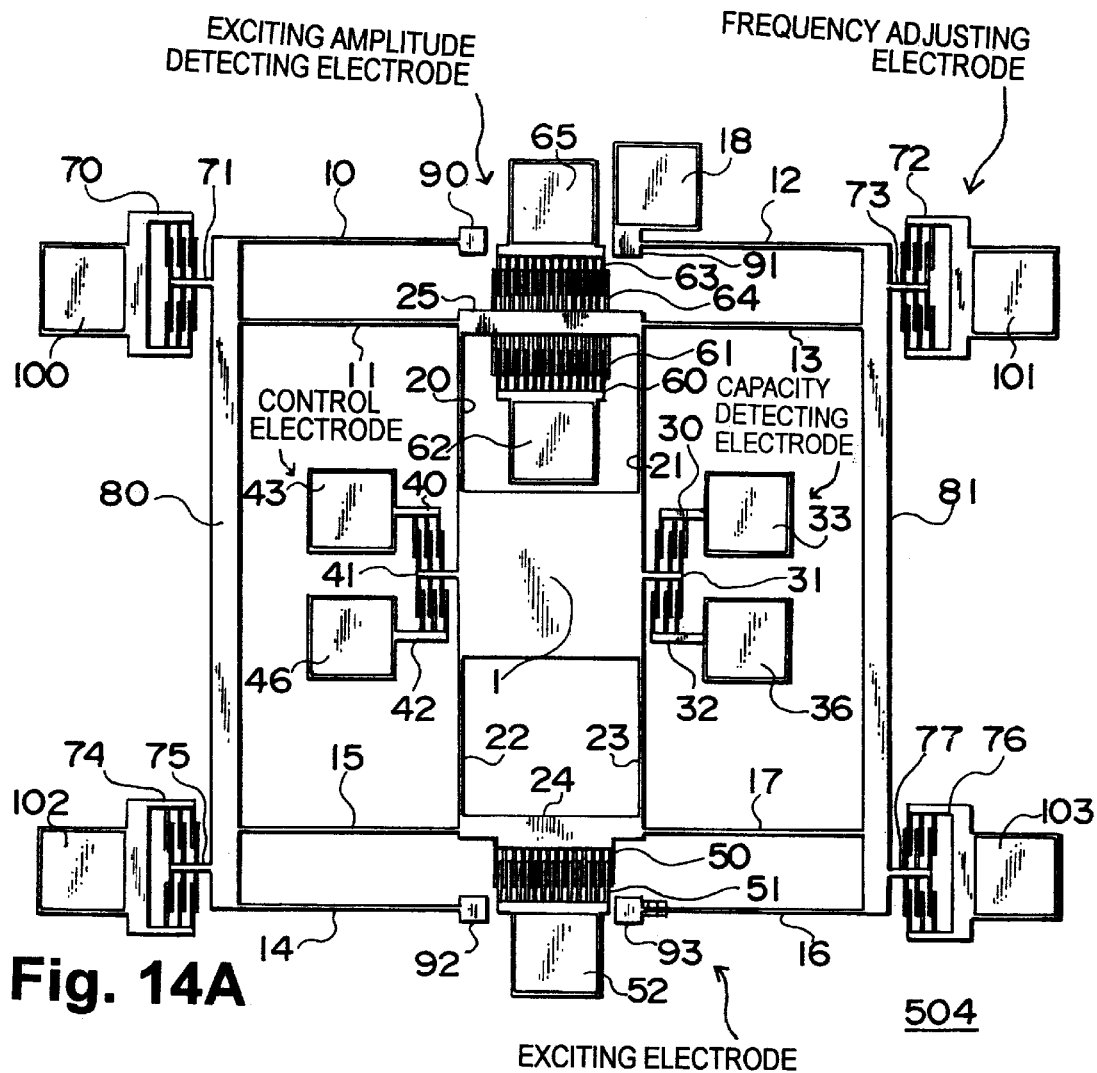
FIGS. 14A and 14B are schematic views which show a resonance type angular velocity sensor with a ladder pattern in accordance with an embodiment 5 of the present invention.
Figure 14B:
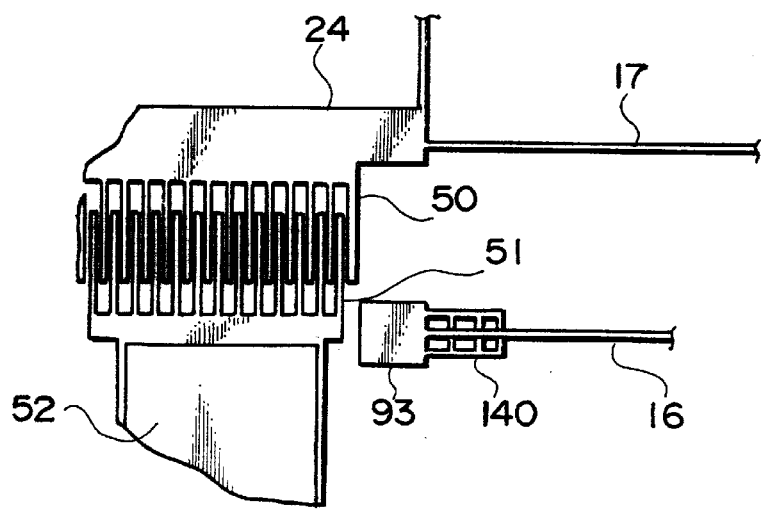

In embodiment 5, a method of changing the rigidity of the beam is employed. Concretely speaking, as shown in FIGS. 14A and 14B, a ladder pattern 140 is added near the portion having a great stress due to the deformation, for example, the fixing portion of the beam member 16 of the folded beam corresponding to the mass excitation supporting beam so as to constitute an angular velocity sensor 504. In this case, the ladder pattern 140 can be provided in the other end portion of the beam member 16 or the end portion of any of the beam members 11, 12, 13, 14, 15, and 17. Further, the pattern is burned off piece by piece by the laser trimming apparatus according to the desired frequency change width. The changing width of the resonance frequency is previously calculated and the desired changing width can be obtained by laser trimming.

Figure 15:
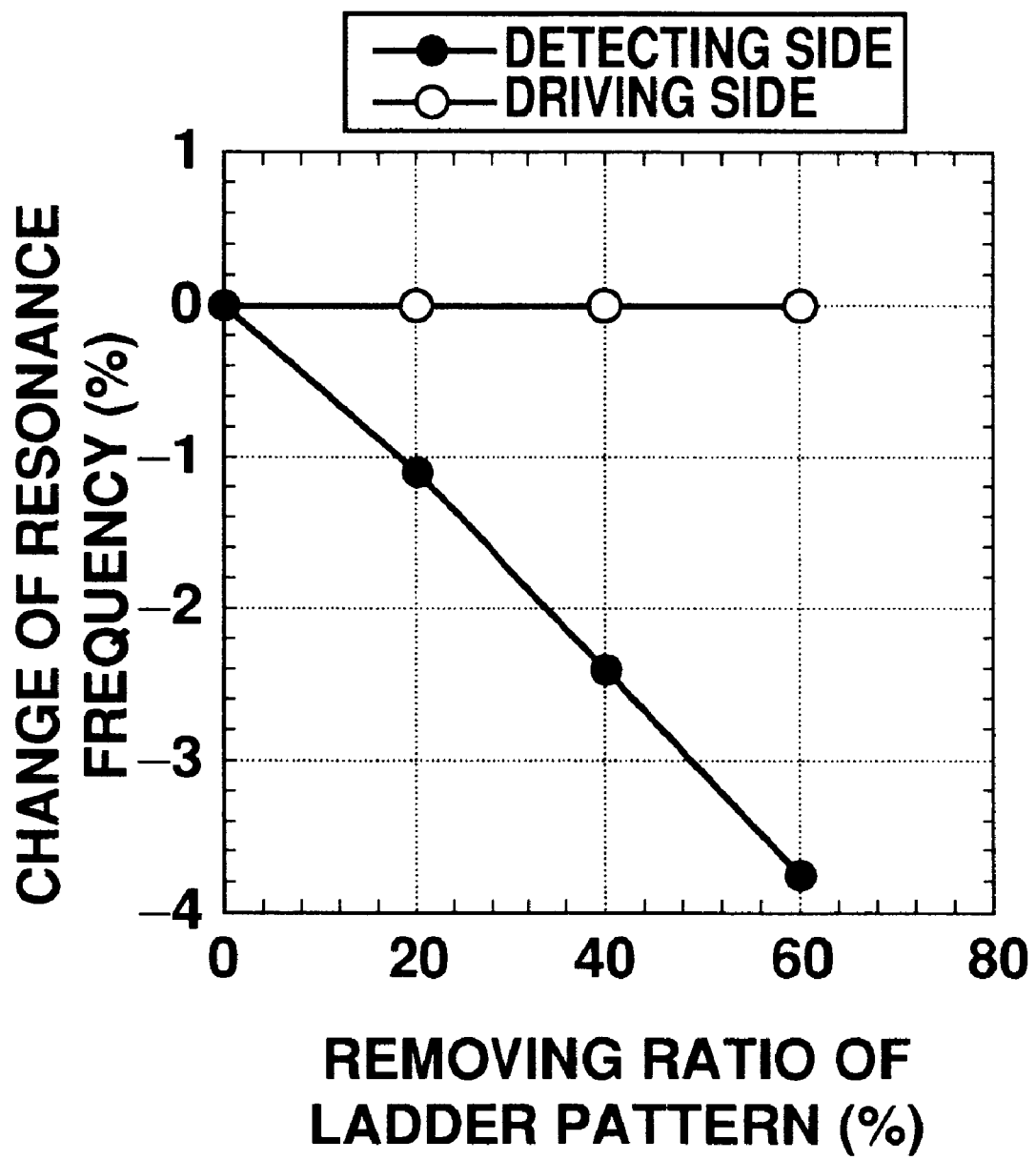
FIG. 15 is a graph which shows a frequency adjusting characteristic of the angular velocity sensor 504 in FIG. 14.

FIG. 15 shows a relation between the removing rate of the ladder pattern and the change of the resonance frequency. As is clear from FIG. 15, a relatively large change is shown in such a manner that a higher removal rate of the ladder pattern results in a smaller resonance frequency in the drive end, as shown by a black circle, that is, the mass portion exciting direction. On the contrary, even when the ladder pattern is removed, the resonance frequency at the detecting end shown by a white circle, that is, the detecting direction of the Coriolis force is not changed.

As clearly understood from the above description, it is possible to selectively adjust just the one resonance frequency (here, the resonance frequency in the exciting direction) using the apparatus of embodiment 5. Further, in the structures shown in FIGS. 14A and 14B, the risk of erroneously cutting the beam is reduced since the ladder pattern to be cut is apart from the beam member.

Embodiment 6

In embodiment 6, mechanical adjustment is performed as in the manner of embodiment 5, but the mass of the connecting portions 80 and 81 shown in FIG. 3 is adjusted in a different manner. Here, it is to be noted that since the mass portion 1 disposed in the center portion relates to the both resonance frequency in the exciting direction and the exciting direction, the mass portion 1 does not itself serve as the adjusting portion.

Figure 16:
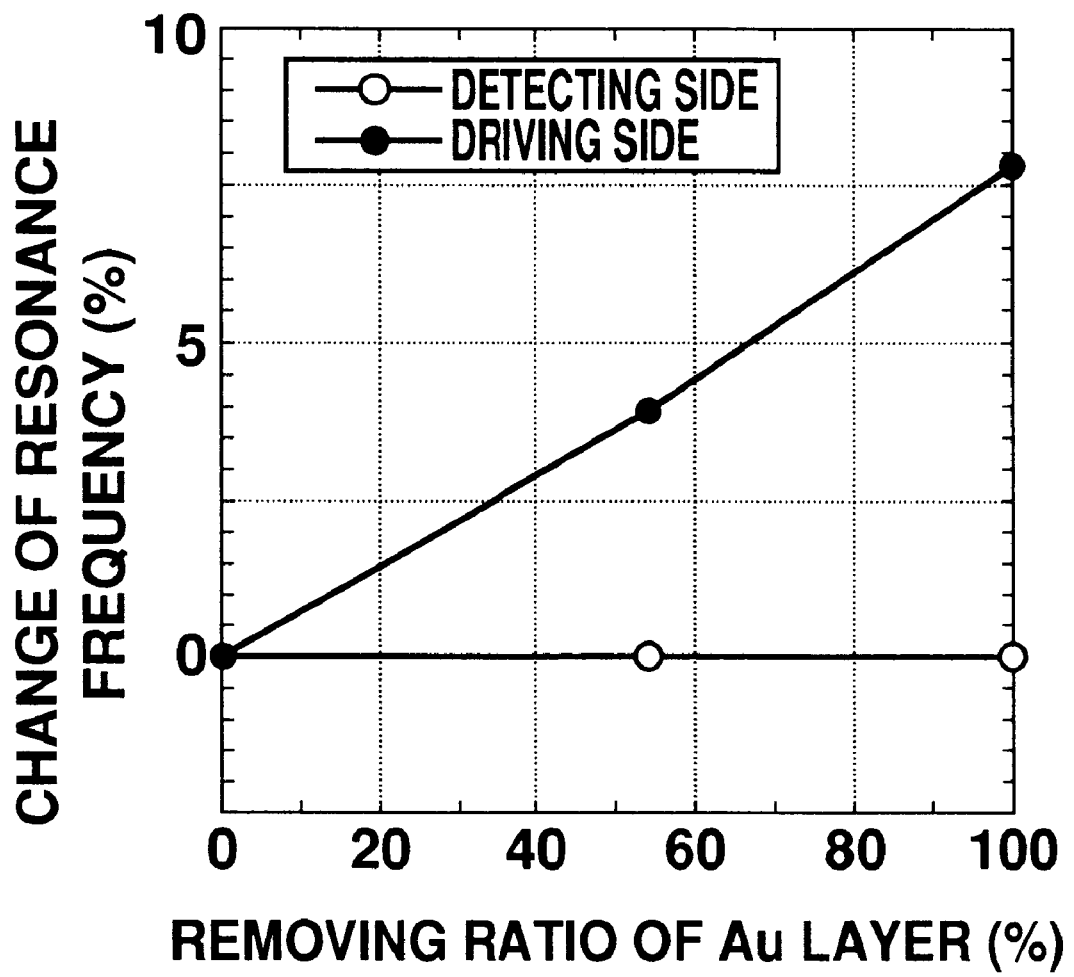
FIG. 16 is a graph which shows a frequency adjusting characteristic of a resonance type angular velocity sensor in accordance with an embodiment 6 of the present invention.

A metal material such as a gold and the like is previously added to the surface of the connecting portions 80 and 81 by vacuum evaporation or the like. Because the mass of the connecting portions 80 and 81 relates only to the resonance frequency in the exciting direction, just the exciting frequency can be changed. Further, at this time, the resonance frequency in the detecting direction is not significantly changed. FIG. 16 shows a state of the change of the resonance frequency with respect to the removing rate of gold (Au) after the metal material of gold is previously added to the surface of the connecting portions 80 and 81 by vacuum evaporation or the like. Laser irradiation, etching, or the like can be used as a method of removing the gold. Further, in order to adjust the frequency, the rate of adding the metal material may be increased or decreased. As is apparent from FIG. 16, in accordance with the structure of this embodiment, the resonance frequency in the exciting direction can be changed without changing the resonance frequency at the Coriolis force detecting end.

In this case, in the sensor made by the same manufacturing process as that shown in FIGS. 6A–E of embodiment 1, the resonance frequency is respectively measured in the exciting and detecting directions. When the resulting frequency difference Δf is not appropriate on the basis of the measured result of this value, it is preferable to perform mechanical rough adjustment as shown in embodiments 5 and 6. When the Δf is made close to the target value by mechanical rough adjustment, the sensor is packaged (for example, vacuum packaged). However, if the measured result Δf is close to the target value, no mechanical rough adjustment is required. Thereafter, the Δf due to the lag of the resonance frequency generated afterwards by the circuit structure (FIG. 9) shown in the embodiment 2 is adjusted by means of the electric frequency adjusting mechanism shown in the embodiments 2 to 4 in such a manner so as to always be the appropriate value.

Embodiment 7

Figure 17:
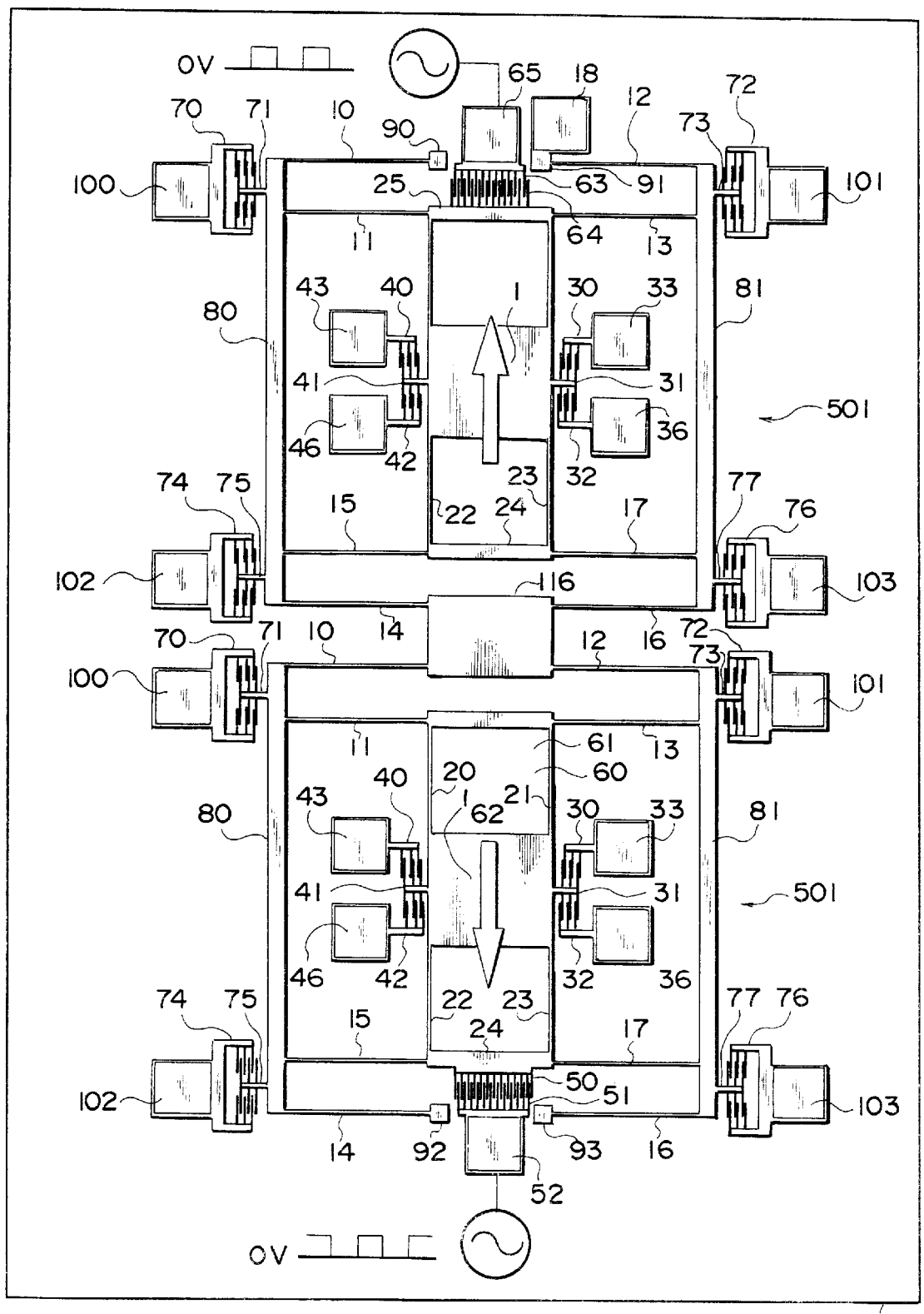
FIG. 17 is a plan view which shows a resonance type angular velocity sensor in accordance with an embodiment 7 of the present invention.

In the angular velocity sensor described above, when the horizontal acceleration is applied to the substrate and the frequency component included in the acceleration is close to the frequency component of the angular velocity, there is a possibility that the angular velocity is not separated from the accelerator. In order to solve this problem, in embodiment 7, for example, the two angular velocity sensors 501 as shown in the embodiment 2 are used through the connecting portion 116 as shown in FIG. 17, and these are disposed within one package 600. Further, in the respective mass portions 1, the exciting vibration thereof is excited in a state that the phases thereof are shifted 180 degrees. The connecting portion 116 may or may not be fixed to the substrate or not be fixed to the substrate.

When the mass portion 1 is driven in a state that the phase of the exciting vibration is shifted 180 degrees, the Coriolis force generated by the angular velocity acts on the two mass portions 1 in the inverted direction to each other. Accordingly, the sensor output with respect to the applied angular velocity is shifted 180 degrees. On the other hand, when acceleration is applied, the two mass portions 1 displace to the same direction due to the acceleration. Then, when the difference of the output from the two angular velocity sensors 501 is taken, it is simple to separate the angular velocity from the acceleration.

Further, since the centers of gravity of the two sensors are always fixed as a tuning fork due to their inverted phase vibration, little energy of the vibration leaks outward. As a result of this, the vibration Q value as the vibrator is improved so that a sensor having a high sensibility can be realized.

Embodiment 8

Figure 18:
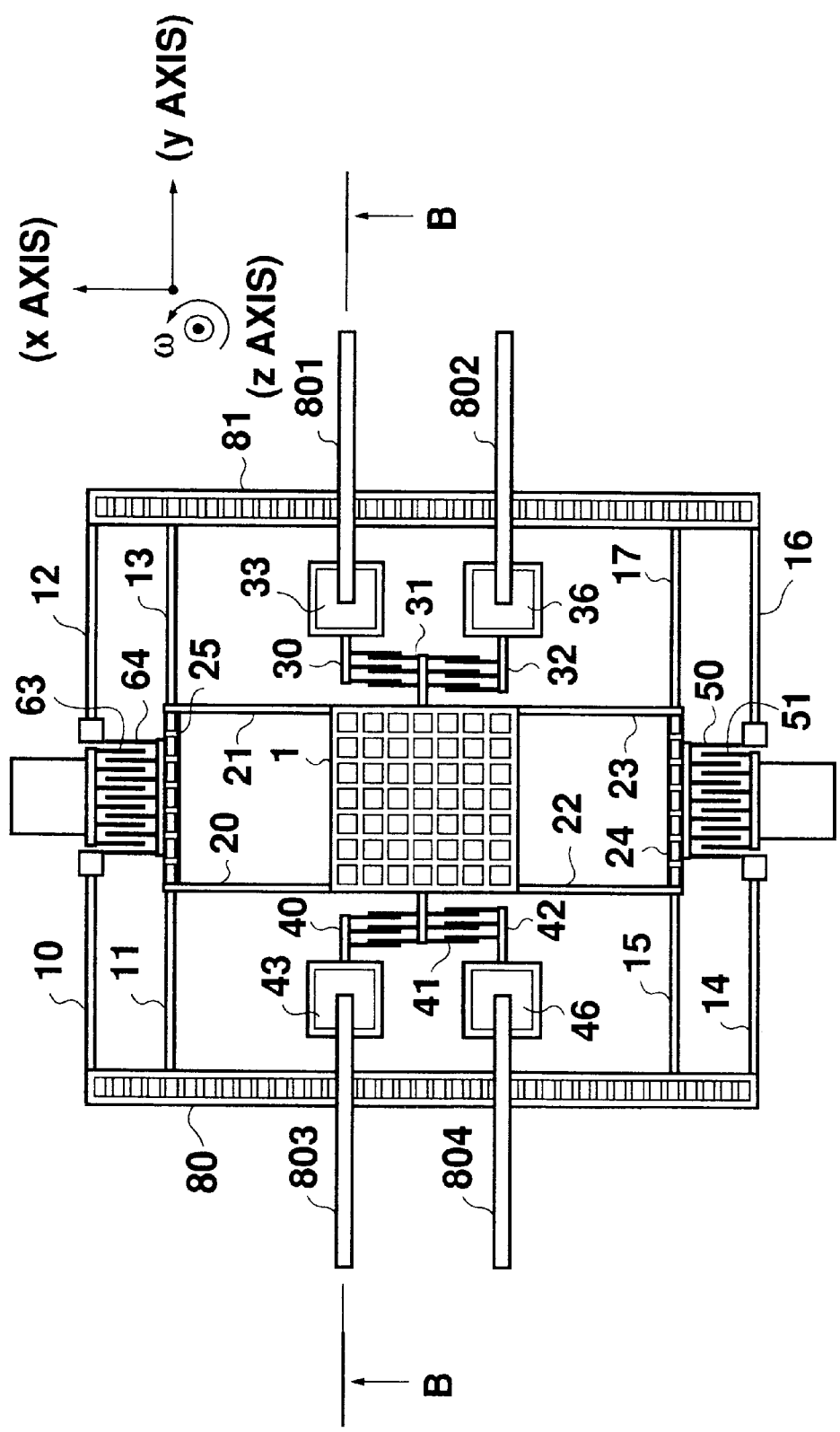
FIG. 18 is a schematic view which explains a plane structure of a lead wire with respect to a control electrode and a capacity detecting electrode of the angular velocity sensor in accordance with embodiments 1 to 7.
Figure 19:
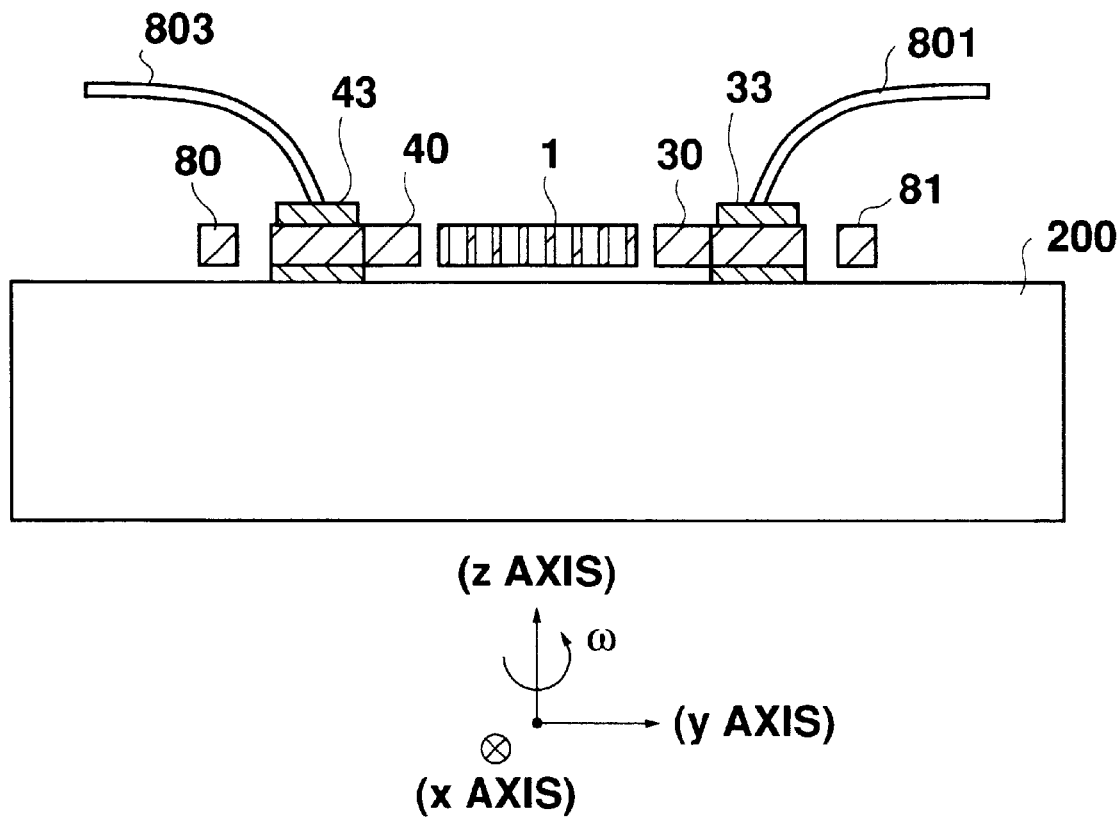
FIG. 19 is a cross sectional view along a line 19—19 which shows the angular velocity sensor in FIG. 18.

FIGS. 18 and 19 show structures of leading wires 801, 802, 803, and 804 with respect to the control electrodes 40 and 42 and the capacity detecting electrodes 30 and 32 of the angular velocity sensor in accordance with the embodiment mentioned above.

In these embodiments, in order to prevent the mass displacement supporting base portions 24 and 25 from displacing to a y axis direction, the connecting portions 80 and 81 are provided in both y axis directions so as to increase rigidity in that direction. Accordingly, the leading wires 801, 802, 803, and 804 comprising the lead wires from the control electrodes 40 and 42 and the capacity detecting electrodes 30 and 32 are bonded to the electrode pads 43, 46, 33, and 36 in such a manner as to straddle the connecting portions 80 and 81.

Figure 20:
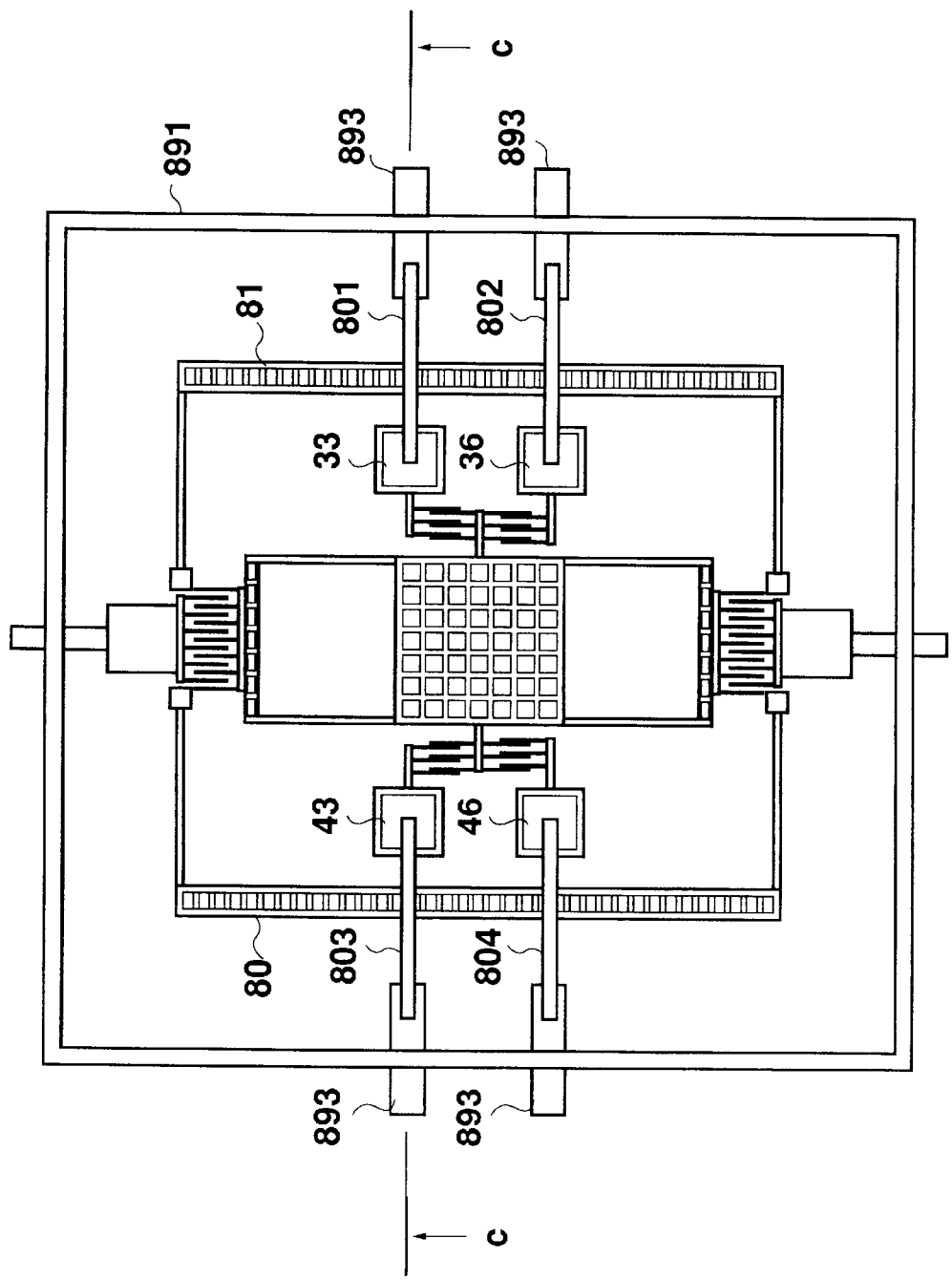
FIG. 20 is a plan view showing a method of wiring the lead wire which is different from the method of FIG. 18.
Figure 21:
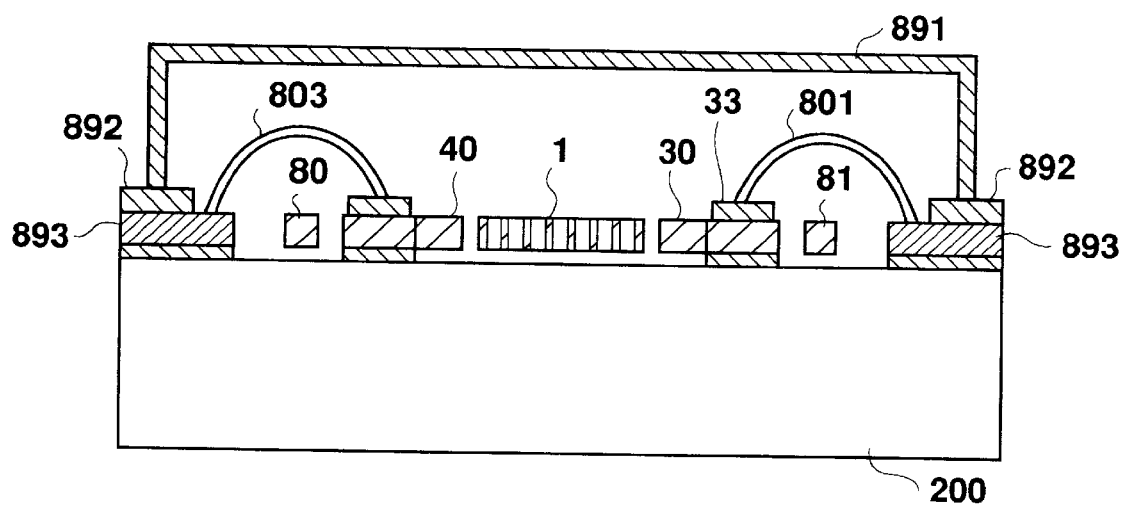
FIG. 21 is a schematic view which shows a cross sectional structure along a line 21—21 of FIG. 20.

Further, in order to improve the angular velocity detecting sensibility, it is necessary to enlarge the vibration Q value of the mass portion 1. In order to solve this, it is preferable to dispose the function components in the vacuum environment. Then, as shown in FIGS. 20 and 21, the silicon substrate 200 is covered by a cap 891 made of a conductive material from above so as to form the internal space vacuum. In this structure, the leading wires 801, 802, 803, and 804 are respectively connected to a leading pad portion 893 and an insulating protecting film 892 is formed on the surface of the pad portion 893 so as to prevent conduction between the pad portion 893 and the cap 891. Further, the leading wires 801, 802, 803, and 804 are connected to the pad portion 893 in such a manner as not to be in contact with the cap 891.

In this case, since in the wiring method as shown in FIGS. 18, 19, 20, and 21, it is necessary to bond the leading wires 801, 802, 803, and 804 to the electrode pad having a small area, a high level bonding operation is required. Further, since the leading wires are three-dimensionally disposed, the inertia force is affected to the leading wires themselves, so that there is a possibility of the breaking of a wire.

Figure 22:
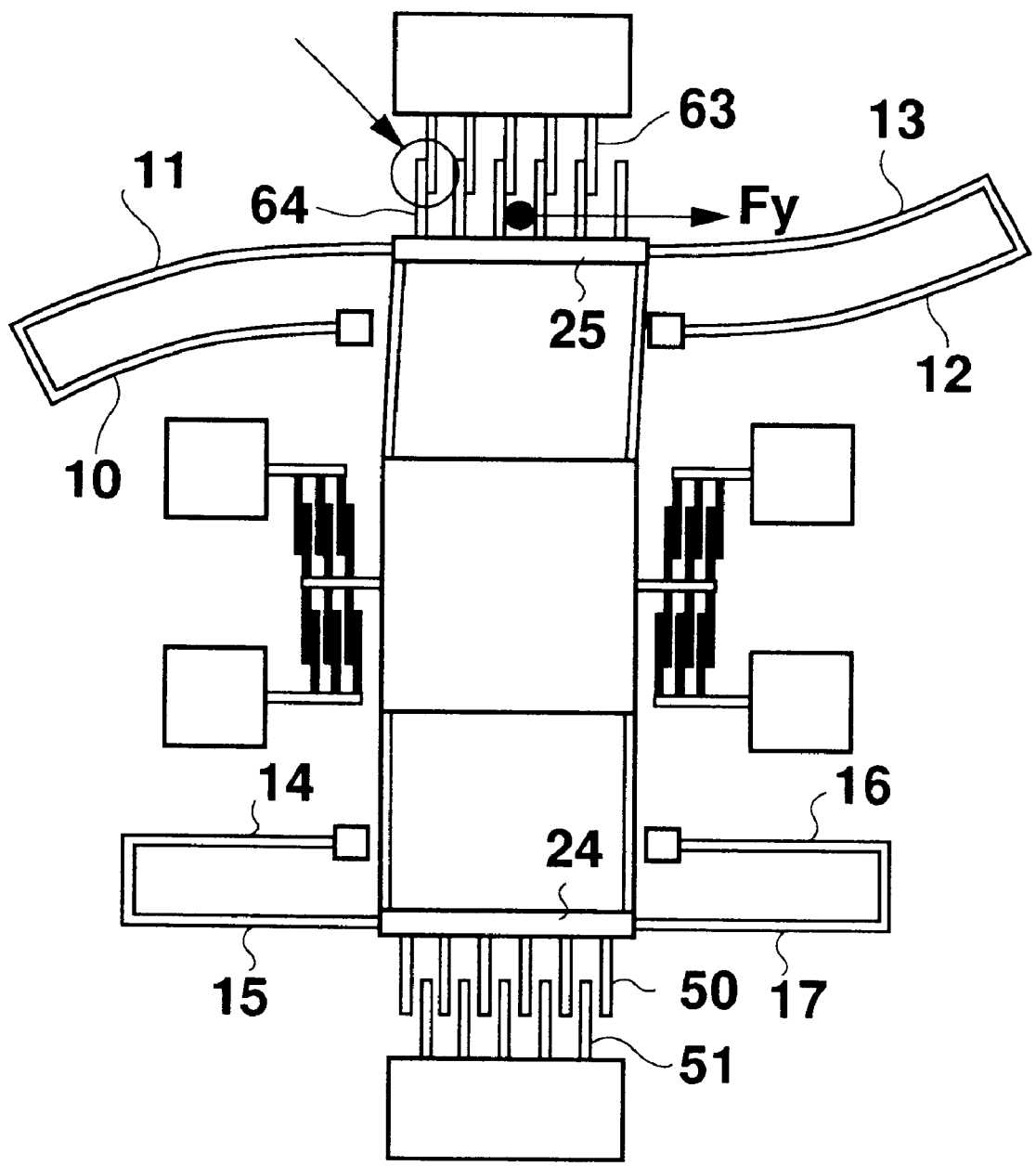
FIG. 22 is a plan schematic view which shows an improved embodiment for making it easy to wire the lead wire from each of the electrodes of the angular velocity sensor in accordance with embodiments 1 to 7.

In order to solve such wiring problems, as shown in FIG. 22, the connecting portion is omitted, and the mass displacement supporting base portions 25 and 24 are supported by the folded type beam 10 and 11; 12 and 13; 14 and 15; 16 and 17, one end of which is fixed to the substrate 200.

However, in the beam structure shown in FIG. 22, when the movable comb electrodes 64 and 50 are presumed to be equivalently supported to the substrate 200 by the spring in the x axis direction and the y axis direction. Since the spring is comprised folded beams, the spring constant in the x axis direction can be decreased, at the same time the spring constant in the y axis direction decreases. Further, the interval between the one tooth of the movable comb electrode 64 and the one tooth of the fixed comb electrode 63 are not completely equal to each other due to limits in manufacturing accuracy. As a result of this, at a time of exciting to the x axis direction, the force is also applied to the movable comb electrode 64 in the y axis direction, and vibration is also performed in the y axis direction. When the vibration to the y axis direction is easily performed, as shown in FIG. 22, the beams 10, 11, 12, and 13 are deformed and the movable comb electrode 64 performs an oval motion on the substrate surface, which is often not preferable.

Figure 23:
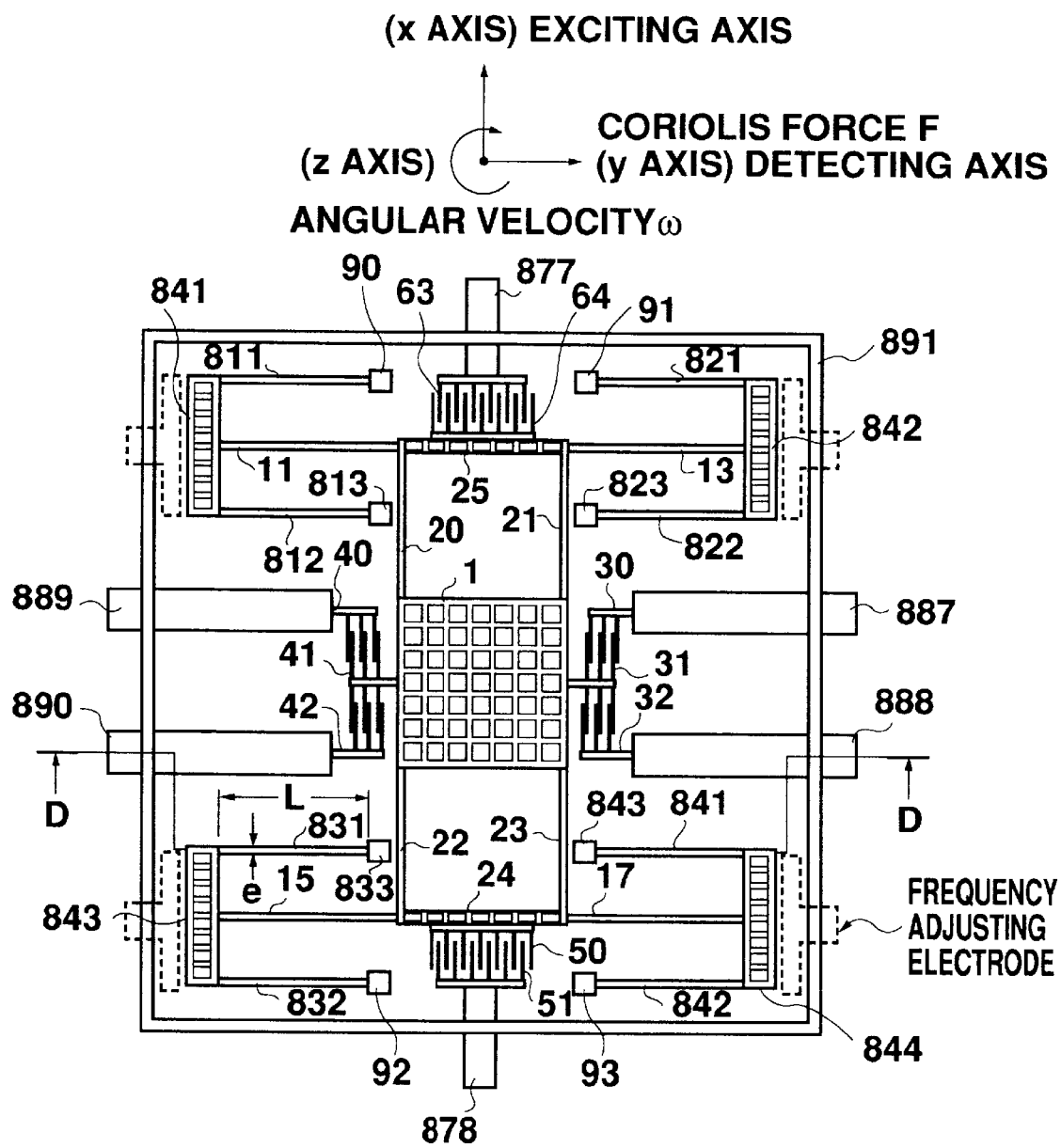
FIG. 23 is a plan view which shows a resonance type angular velocity sensor in accordance with an embodiment 8 of the present invention.
Figure 24:
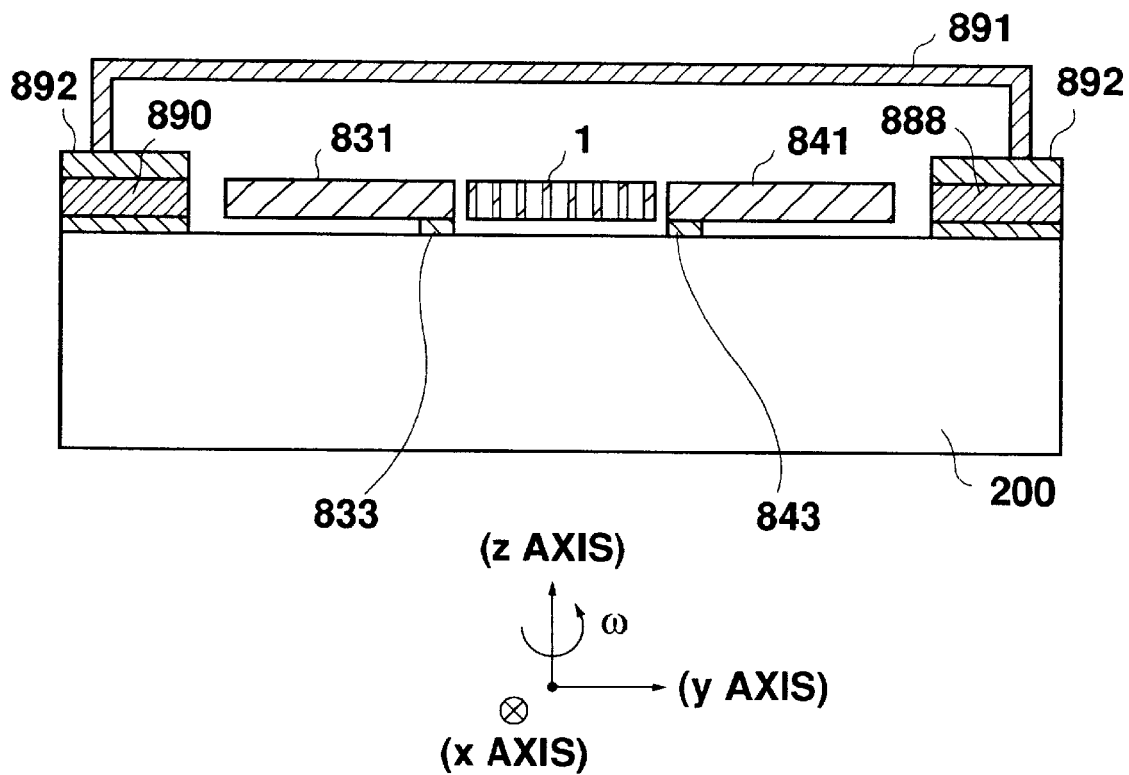
FIG. 24 is a cross sectional view along a line 24—24 which shows the angular velocity sensor 602 shown in FIG. 23.

Accordingly, a structure shown in FIG. 23 can be applied as a structure in which a wiring can be easily performed and deformation of the mass excitation supporting beam to the y axis direction can be prevented. FIG. 23 shows a plane structure of an angular velocity sensor 602 in accordance with an embodiment 8 of the present invention and FIG. 24 shows a cross sectional structure along a line 24—24 in FIG. 23. The different point from the embodiments 1 to 7 mentioned above is that the mass excitation supporting beam for supporting the mass portion 1 in the exciting direction (the x axis direction in the drawing) is separated in the exciting direction so as to easily set the wires 889, 890, 887, and 888 with respect to the control electrodes 40 and 42 and the capacity detecting electrodes 30 and 32 provided in the Coriolis force detecting direction (the y axis direction in the drawing).

The mass excitation supporting beam is constituted by the floating beam members 11, 13, 15, and 17; the fixed beam members 811, 812, 821, 822, 831, 832, 841, and 842; and the link portions 851, 852, 853, and 844.

The floating beam members 11, 13, 15, and 17 respectively support the mass displacement supporting base portions 24 and 25 from the right and left portions (the y direction) in FIG. 23. The fixed beam members 811 and 812 for supporting the floating beam member 11 are disposed at the right and left portions in a parallel manner with holding the floating beam member 11 therebetween, and are fixed on the substrate at the anchor portions 90 and 813 formed in one end of the mass displacement supporting base portion 25. Further, in the fixed beam members 811 and 812, one end opposing to the mass displacement supporting base portion 25 is connected to the link portion 851 and the floating beam member 11 is connected to the center portion of the link portion 851, so that the floating beam member 11 is supported by a pair of fixed beam members 811 and 812 and the link portion 851.

The other floating beam members 13, 15, and 17 are respectively supported by the corresponding fixed beam members 821 and 822 and the link portion 852, the fixed beam members 831 and 832 and the link portion 853, and the fixed beam members 841 and 842 and the link portion 844, in the same that of the beam member 11. The anchor portions 91, 823, 92, 833, 93 and 843 respectively fix and support the one end of the respective fixed beams 821, 822, 831, 832, 842, and 841 onto the substrate. As mentioned above, since a folded mass excitation supporting beam is formed by a floating beam member, a pair of corresponding fixed beam members, and a link portion connecting therebetween, rigidity in the y axis direction can be increased so that the movable comb electrodes 64 and 50 in the y axis direction can be prevented.

Further, a rectangular cap 891 is mounted to the substrate 200 in such a manner as to cover the substrate 200 having the sensor 602 formed. The wires 889, 890, 887, and 888 led from the control electrodes 40 and 42 and the capacity detecting electrodes 30 and 32 positioned between two mass excitation supporting beam standing in a line to the vibration axis direction do not have a structure preventing the wiring in the y axis direction which is provided in the embodiment 1 as the connecting portions 80 and 81. Accordingly, as shown in FIGS. 23 and 24, wiring can be easily performed by making the wiring pattern extend outward from the cap 891.

In such a case, an insulation protecting layer 892 for preventing contact with the cap 891 is formed on the surface of the wires 889, 890, 887, and 888 led out from the sensor forming area, and, in the wire leading portion, as shown in FIG. 24, the cap 891 covers the insulation protecting layer 892.

Figure 25:
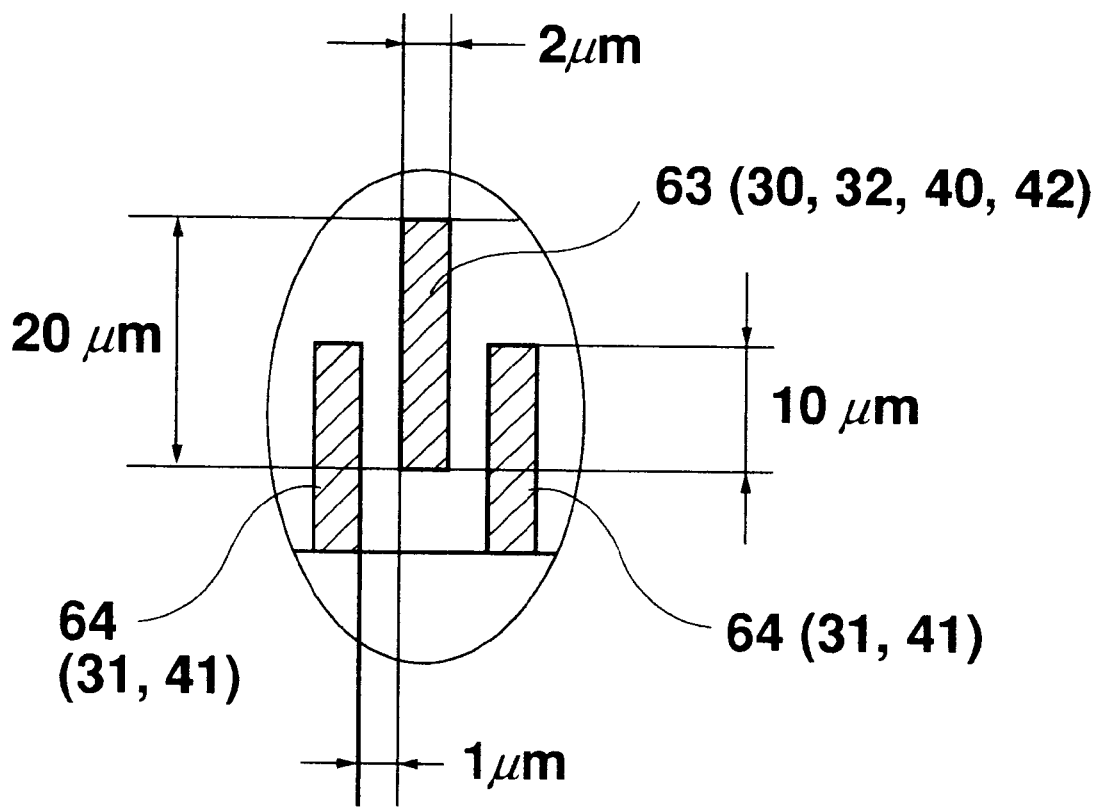
FIG. 25 is a schematic view which shows a positional relation between a movable comb electrode and a fixed comb electrode.

Further, the dimensional relationship between the movable comb electrode 64 and the fixed comb electrode 63 is shown in FIG. 25. The relationship between the other movable comb electrode 50 and the fixed comb electrode 51 is the same as shown in FIG. 25. Further, the relation between the movable comb electrode 31 and the fixed comb electrodes 30 and 32 and the relation between the movable comb electrode 41 and the fixed comb electrodes 40 and 42 are substantially the same as is shown in FIG. 25.

Figure 26A:
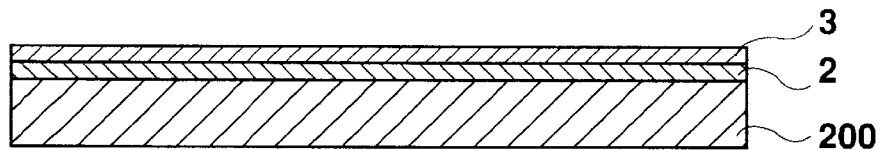
FIGS. 26A, 26B, 26C, 26D, and 26E are schematic views which show a manufacturing process of the angular velocity sensor 602 in accordance with an embodiment 8.
Figure 26B:
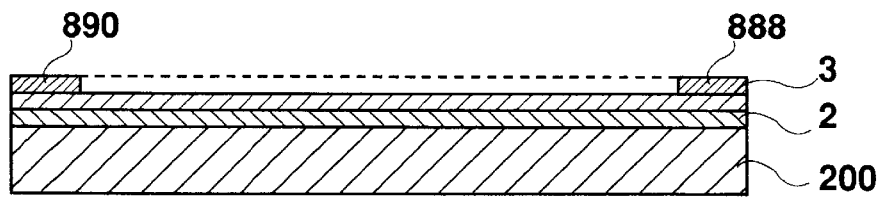

The angular velocity detecting sensor 602 having the above structure is manufactured in the following manner. As shown in FIG. 26A, a silicon oxide film 2 is first formed on the silicon substrate 200, followed by a silicon layer 3 given a conductivity by adding an impurity. Next, an aluminum is disposed on the silicon layer 3 by vacuum evaporation and, as shown in FIG. 26B, a patterning is performed to a predetermined shape by a photo lithograph so as to form the wire layers 877, 878, 887, 889, 888, and 890 shown in FIG. 23.

Figure 26C:
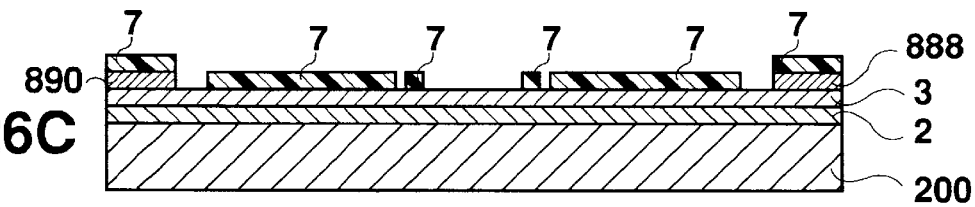
Figure 26D:
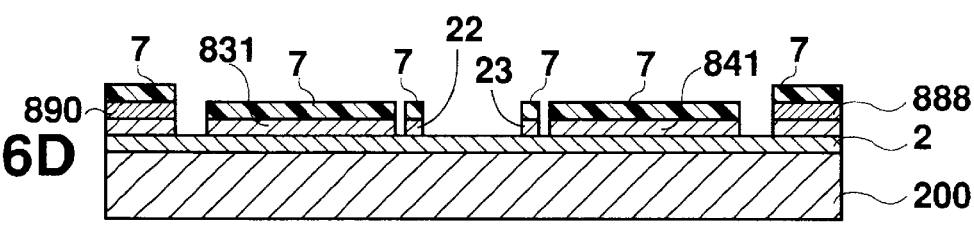
Figure 26E:
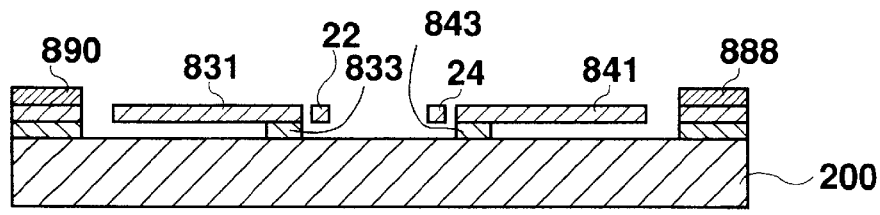

Next, the photo resist is uniformly applied to the surface of the silicon layer 3 in order to form the floating portion such as the respective beams, the mass portion 1, or the like and patterning is done so as to form the mask pattern 7 as shown in FIG. 26C. Next, in a state of making the mask pattern 7 as a mask, the silicon layer 3 is etched by wet etching and silicon layer 3 is patterned to a desired shape as shown in FIG. 26D. Next, by using the sacrifice layer etching technique, the silicon oxide film 2 disposed in the removed lower portion of the floating portion as shown in FIG. 26E. In this sacrifice layer etching, the silicon oxide film 2 is removed by soaking the substrate 200 in the hydrofluoric acid. At this time, since the areas of the anchor portions 90, 813, 91, 823, 92, and 93; the anchor portions 833 and 843; and the wire layers 877, 878, 887, 888, 889, and 890 are wide, the silicon oxide film 2 disposed in the lower portion thereof is not removed. Only the silicon oxide film 2 disposed in the floating portion and the lower portion of the comb electrodes 63, 64, 50, 51, 39, 31, 32, 40, 41, and 42 is removed. In order to remove the silicon oxide film 2 disposed in the lower portion of the silicon layer 3 in the above manner, the mass portion 1 having the large area among the floating portions is formed in a lattice shape having a multiplicity of windows such that the hydrofluorine acid can easily soak, and the link portions 851, 852, 853, and 844 and the mass excitation supporting base portions 24 and 25 are formed in a ladder shape having a multiplicity of windows. In the mass portion 1, since a predetermined inertia mass is required, a total area in the opening portion is not made too large. Accordingly, the thickness of the silicon film 3 in the mass portion 1 and the length of a side of the respective windows are set substantially equal to each other.

In this case, the material of the substrate 200 is not limited in the same manner as was the case in embodiments 1 to 7 mentioned above. In place silicon, any other semiconductor, ceramics, glass, or the like can also be used. Further, a silicon nitride film, an alumina, or the like can be used for the etching sacrifice layer. Also, for a function layer mainly forming the floating portion A, any elastic material, including a metal such as nickel or the like, can be used. When silicon is used, since the comb electrodes 63, 64, 50, 51, 30, 31, 32, 40, 41, and 42 are formed by the silicon film 3, a material having a high conductivity is desired, and it is further preferable to add donor and acceptor impurities.

Further, in recent years, a dry etching method by hydrogen fluoride vapor has been used for a sacrifice layer etching technique of the silicon oxide film 2. This method treats a sticking of the mass portion 1 and the substrate 200.

Figure 27A:
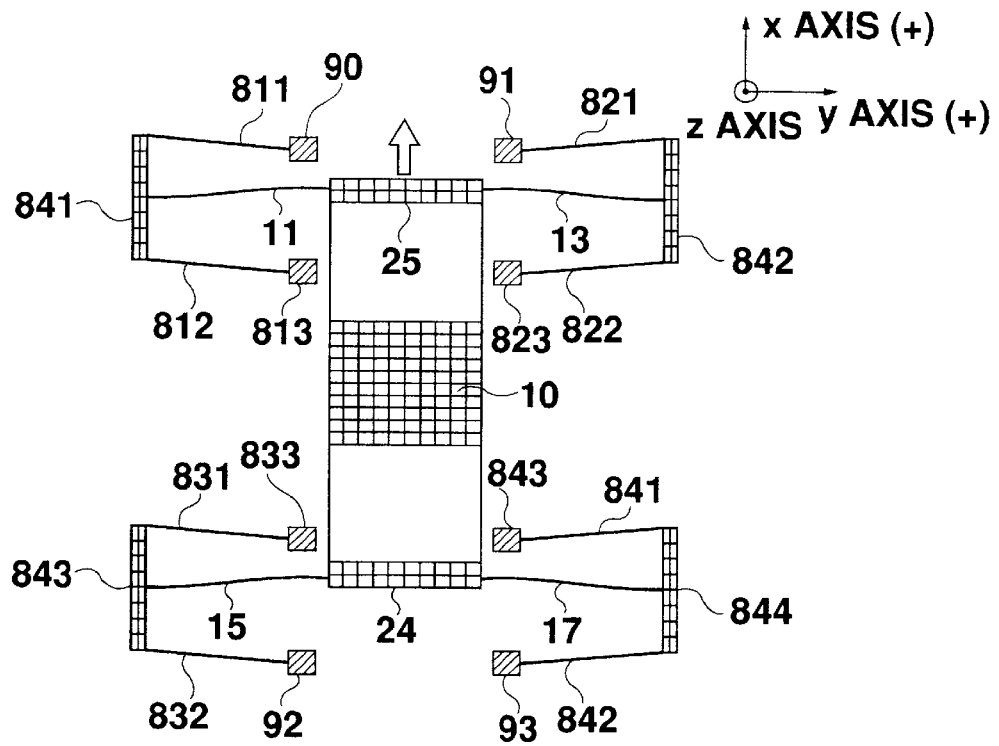
FIGS. 27A and 27B are a schematic view which explains an operation of the angular velocity sensor 602 in accordance with embodiment 8.
Figure 27B:
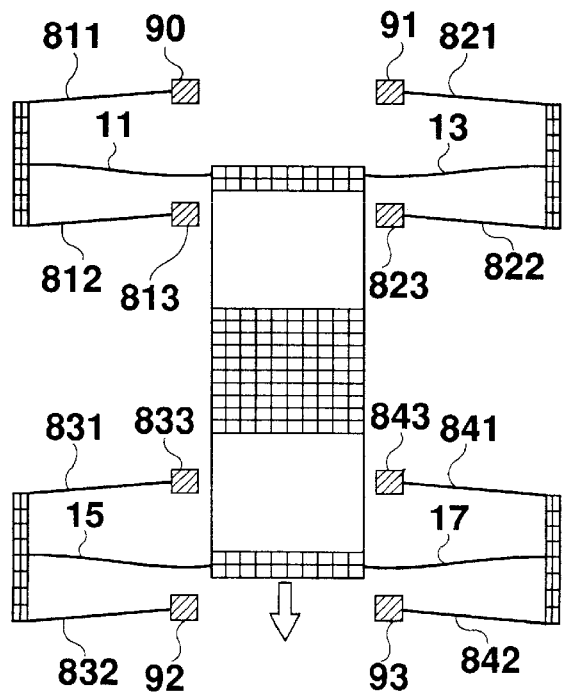

Next, an operation of the angular velocity sensor 602 will be described. Unlike the case described above in which the fixed comb electrode 63 is used as the exciting electrode, in the sensor, the alternating voltage is applied to the electrode 63. Alternating electrostatic force then acts on the portion between the fixed comb electrode 63 and the movable comb electrode 64 so that the mass displacement supporting base portions 25 and 24 and the mass portion 1 are vibrated in the x axis direction. Accordingly, as shown in FIG. 27A, when the movable comb electrode 64 is drawn to the fixed comb electrode 63, the mass portion 1 displaces to the positive x axis direction. At this time, the fixed beam members 811 and 812 having an end directly fixed to the substrate 200 by the anchor portions 90 and 813, and the fixed beams 821 and 822 having an end directly fixed to the substrate 1 by the anchor portions 91 and 823 are curved to the negative x axis direction in a convex manner, while the floating beam members 11 and 13 are curved in a convex manner to a positive x axis direction. The relation between the fixed beam members 831 and 832 positioned at an opposite portion in the x axis direction with holding the mass portion 1 therebetween and the floating beam member 15 is the same as the relation between the fixed beam members 841 and 842 and the floating member 17. On the other hand, as shown in FIG. 27B, when the movable comb electrode 64 is excluded from the fixed comb electrode 63, the mass portion 1 displaces to the negative x axis end. At this time, the fixed beam members 811 and 812 and the fixed beams 821 and 822 are curved to the positive x axis direction in the convex manner, while the floating beam members 11 and 13 are curved to the negative x axis direction in the convex manner. The relation between the fixed beam members 831 and 832 and the floating beam member 15 is the same as the relation between the fixed beam members 841 and 842 and the floating beam member 17. Since these fixed beam members 811, 812, 821, 822, 831, 832, 841, and 842 are very flexible in the x axis direction but very rigidity in the y axis direction, the mass displacement supporting base portions 25 and 24 easily deform to the x axis direction but does not easily deform to the y axis direction. Accordingly, in the exciting state, the gap between the fixed comb electrode 63 and the movable comb electrode 64, and between the fixed comb electrode 51 and the movable comb electrode 50 is not changed so that these components are never in contact with each other.

Because of the above beam structure, the mass portion 1 easily vibrates in the x axis direction. When the displacement of this vibration is set to $x = x_0 \cdot \sin \alpha t$ (in which $\alpha$ is an angular frequency of a voltage applied to the exciting electrode, and $x_0$ is an amplitude of the vibration in the x axis direction), a velocity Vx is expressed as $Vx = x_0 \cdot \alpha \cdot \cos \alpha t$. In this vibration state, when an angular velocity $\omega$ is operated around the z axis, a Coriolis force Fc acts on the mass portion 1 to the y axis direction. The Coriolis force Fc can be obtained by the following equation (2).

$$Fc = 2m \cdot \omega \cdot Vx = 2m \cdot \omega \cdot x_0 \cdot \alpha \cdot \cos \alpha t \qquad (2)$$

in which m is a mass of the mass portion 1.

Accordingly, the force Fc expressed by the equation (2) acts on the mass portion 1 to the y axis direction, and the mass portion 1 vibrates to the y axis direction with a frequency in the x axis direction.

The vibration displacement in the y axis direction can be detected by the electrostatic capacity change of any one or both of the movable comb electrode 31 and the fixed comb electrodes 30 and 32, and the movable comb electrode 41 and the fixed comb electrodes 40 and 42 corresponding to the detecting electrode. Since the vibration displacement of the y axis is in proportion to the angular velocity $\omega$ given the Coriolis force F, the vibration displacement is also in proportion to the dimension of the angular velocity ω.

Since the mass displacement supporting base portion 25 and 24 are fixed with respect to the y axis, the mass displacement direction supporting beams 20 and 21, and 22 and 23 are curved to the positive or negative y axis direction in a parallel manner and in a convex manner, so that the movable comb electrodes 31 and 41 easily displace to the y axis direction.

When the movable comb electrode 50 and the fixed comb electrode 51 are set to the excitation detecting electrode, the exciting amplitude $x_0$ in the x axis direction can be detected by detecting the displacement of these electrodes 50 and 51. Then, the exciting amplitude in the x axis direction of the mass portion 1 can be maintained constant using feedback control of the applied voltage to the fixed electrode 63 as the exciting electrode so as to always make the exciting amplitude $x_0$ a constant value.

Further, in the above embodiment 8, the deformation in the y axis direction is detected by the capacity change of any one or both of the average values of the output of the fixed comb electrodes 40 and 42 serving as the detecting electrode, and the average value of the output of the fixed comb electrodes 30 and 32. However, the angular velocity ω can be detected by detecting the displacement in the y axis direction from the average value of the output value of the fixed comb electrodes 30 and 32, applying the voltage to the fixed comb electrodes 85 and 86 in such a manner that the displacement becomes zero, and obtaining the amplitude of the voltage, as in a manner of the embodiments 1 to 7. Accordingly, an equal voltage is applied to the fixed comb electrodes 40 and 42, so as to supply an external force canceling the Coriolis force Fc represented by the equation (2) to the mass portion 1.

In the above manner, when the angular velocity ω is detected in a state that the displacement in the y axis direction is zero, it is possible to remove a non-linear error.

Embodiment 9

Next, embodiment 9 will be described. The sensor 602 in embodiment 8 is disposed in both sides of the floating beam member 11 in which the fixed beam members 811 and 812 are connected to the mass displacement supporting portion 25, the fixed beam members 821 and 822 are disposed on both sides of the floating beam member 13, the fixed beam members 831 and 832 are disposed on both sides of the floating beam member 15, and the fixed beam members 841 and 842 are disposed on both sides of the floating beam member 17. However, in the sensor 604 in accordance with the embodiment 9, both fixed beam members 811 and 812 are disposed in one side close to the positive x axis with respect to the floating beam member 11, and both fixed beam members 821 and 822 are disposed in one side close to the positive x axis with respect to the floating beam member.13, as shown in FIG. 28. Further, the fixed beam members 831 and 832 are disposed in one side close to the negative x axis with respect to the floating beam member 15, and the fixed beam members 841 and 842 are disposed in one side close to the negative x axis with respect to the floating beam member 17. Because the mass excitation supporting beam is formed by the structure of the fixed beam member and the floating beam member, the mass excitation supporting beam is prevented from being deformed to the y axis direction so that the Coriolis force can be accurately detected.

Embodiment 10

Figure 29:
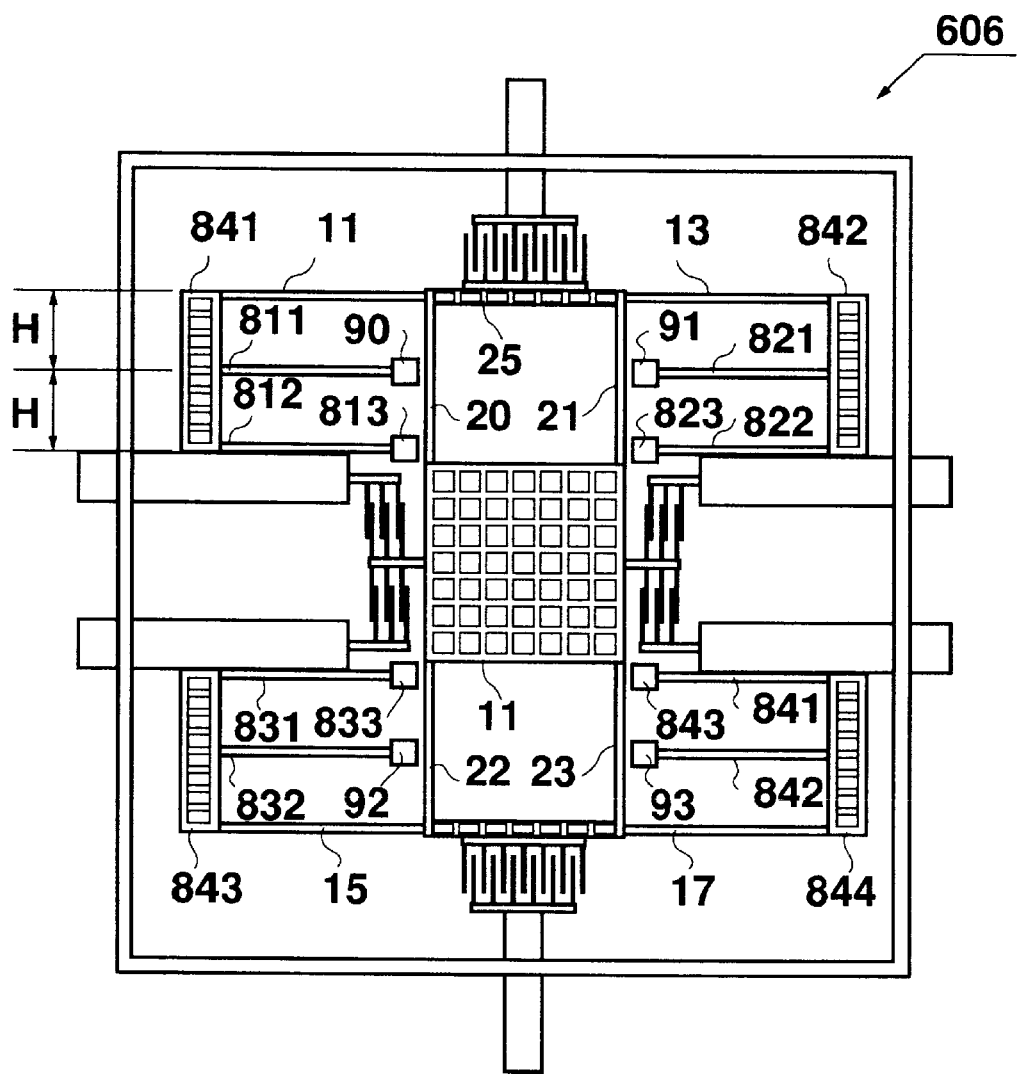
FIG. 29 is a plan view which shows a resonance type angular velocity sensor in accordance with an embodiment 10 of the present invention.

Next, an embodiment 10 will be described below. In the sensor 604 in accordance with embodiment 9, the respective fixed beam members are provided in the apart side (the outer side) of the mass portion 1 with respect to the floating beam member, however, in comparison with this, in sensor 606 according to embodiment 10, the respective fixed beam members are provided in the near side (the inner side) of the mass portion 1 with respect to the floating beam member. Accordingly, in this sensor 606, as shown in FIG. 29, the fixed beammembers 811 and 812 are disposed at one side close to the negative x axis with respect to the floating beam member 11 and the fixed beam members 821 and 822 are disposed at one side close to the negative x axis with respect to the floating beam member 12. Further, the fixed beam members 831 and 832 are disposed at one side close to the positive x axis with respect to the floating beam member 15 and the fixed beam members 841 and 842 are disposed at one side close to the positive x axis with respect to the floating beam member 17.

Figure 30:
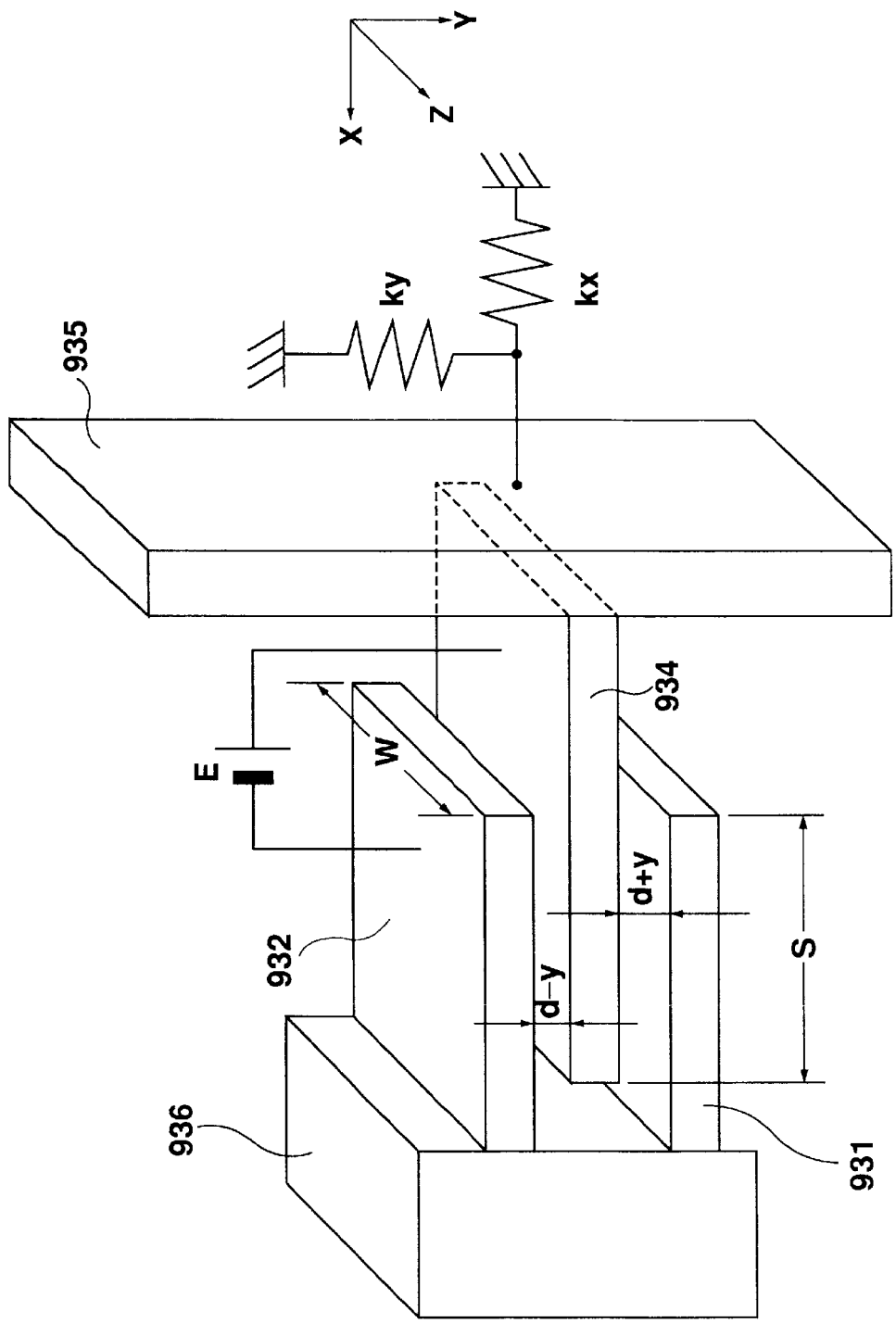
FIG. 30 is a schematic view which equivalently shows a relation between a movable comb electrode, a fixed comb electrode and a beam corresponding to an exciting electrode.

Next, the performance of the sensors 602, 604, and 606 of embodiments 8, 9, and 10 are evaluated as follows. In order to improve the detecting accuracy in the sensors 602, 604, and 606, it is necessary that the exciting vibration in the x axis direction does not leak to the y axis direction. As shown in FIG. 30, when the force to the x axis direction and the force to the y axis direction in accordance with one movable tooth 934 of the movable comb electrode 64 are respectively set to gx and gy, the respective forces gx and gy are represented as the following equations (3) and (4).

$$gx = \epsilon w E^2 / d \qquad (3)$$

$$gy = \epsilon w s E^2 / [2(d-y)^2 - 2(d+y)^2] \qquad (4)$$

in which E is a dielectric constant of a gap, d is an interval between the movable tooth 934 and the fixed teeth 931 and 932 at a time when the displacement in the y axis direction is zero, y is a displacement, E is an applied voltage, w is a thickness of the movable tooth 934 and the fixed teeth 931 and 932, and s is a length in the x axis direction of the portion in which the movable tooth 934 and the fixed teeth 931 and 932 are overlapped. When the number of the comb is n, the force Gx and Gy acting on the link 935 corresponding to the mass displacement supporting base portion are n times of the equations (3) and (4).

The folded type beam comprising the floating beam members 11, 13, 15, and 17, the connecting portions 851, 852, 853, and 844 and the fixed beam members 811, 812, 821, 822, 831, 832, 841, and 842 is modeled by a spring having spring constants kx and ky with respect to the displaced attitude in the x axis and the y axis directions in FIG. 30. The force Gx in the x axis direction and the force Gy in the y axis direction respectively acting on the link 935 are set to be about $10^{-3}$ N. The state of the deformation of the respective beams at a time when the external force is applied to the link 935 is analyzed by a finite element method. The displacement x in the x axis direction and the displacement y in the y axis direction of the link 935 in the case that the external force Gx and Gy are independently applied are next calculated. The spring constant kx in the x axis direction is then calculated by the equation kx=Gx/x and the spring constant ky in the y axis direction is calculated by the equation ky=Gy/y. The state of the deformation of the beam in the angular velocity sensor in accordance with the embodiment 8, 9 and 10 is shown in FIGS. 33A, 33B, 33C, 33D, 33E, and 33F. FIGS. 33A and 33B show the beam structure in accordance with embodiment 8, FIGS. 33C and 33D show the beam structure in accordance with embodiment 9 and FIGS. 33E and 33F show the beam structure in accordance with embodiment 10. Further, FIGS. 33A, 33C, and 33E show the deformed state in the case that only the external force Gx is applied to the center of the mass displacement supporting base portion 25 and FIGS. 33B, 33D and 33F show the deformed state in the case that only the external force Gy is applied to the center of the mass displacement supporting base portion 25.

Figure 32:
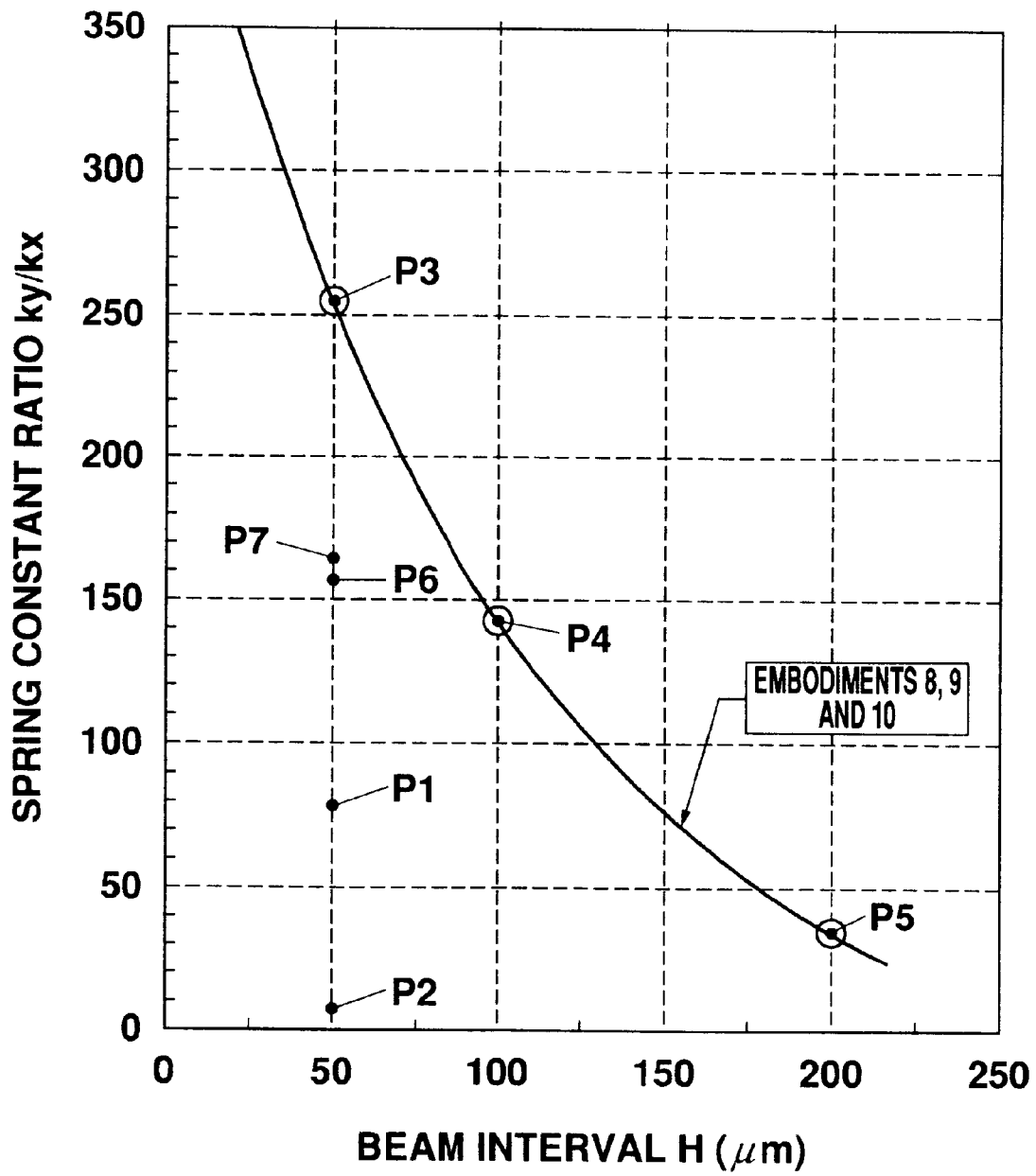
FIG. 32 is a graph which shows a relationship between a beam interval H and a spring constant ratio in the respective beam structures shown in FIG. 31.

In this model, as shown in FIG. 23, a width e of the respective beams is set to be 3 μm, a length L is set to be 233 μm, a thickness w (a thickness of the silicon layer 3 in FIGS. 30, 26A, to 26E) is set to 12 μm, length of the links 25 and 24 is set to 203 μm, width thereof is set to 2 μm, and mass of the mass portion 1 is set to $3.6 \times 10^{-10}$ kg. Further, in embodiment 8, as shown in FIG. 23, the spring constant kx and ky are calculated in the case that the interval with respect to the fixed beam members 811 and 812 is set to be 2H and the interval H is changed. Still further, in embodiments 9 and 10, the intervals between the respective fixed beam members 811 and 812 and the floating beam member 11 are H. The greater is the spring constant ratio R of the spring constant ky in the y axis direction with respect to the spring constant kx in the x axis direction, the more easily the mass displacement supporting base portion 25 can displace, however, this means that it is difficult to displace the mass displacement supporting base portion 25 in the y axis direction. Accordingly, increasing spring constant R will result in an improved angular velocity sensor characteristic. A calculated result of this model is shown in FIG. 31, and a graph of the calculated result is shown in FIG. 32.

In the calculated results, in the case of the structure such as the sensor 602 in accordance with the embodiment 8, that is, the structure P3 in which the fixed beam member is disposed in both of the floating beam member, when H=50 μm is set, the spring constant ratio R is 255. Accordingly, it is understood that in comparison with the embodiments 9 and 10, that is, the structure P6 and P7 in which two fixed beams are disposed in one side of the free beam (the R value in the structure P6 is 158 and the R value in the structure P7 is 164), the structure in accordance with embodiment 8 has the better characteristics. However, even in the structure P6 and P7 in accordance with embodiments 9 and 10, it is understood that the spring constant ratio R is large so that the characteristic is further improved in comparison with the structure P1 (the R value is 77) in which one fixed beam is provided in one side with respect to the connecting portion extending to the x axis direction and the floating beam member, as shown in FIG. 3, and the structure P2 (R value of 4), in which, as shown in FIG. 22, the connecting portion is not provided with respect to the structure P1. Further, in the structure of the sensor 602 of embodiment 8, when the interval H is set to be 100 μm and 200 μm, it is understood that when the interval H is widened, the spring constant ratio R decreases so that the characteristic deteriorates.

In the above embodiments 8 to 10, an explanation is given to the embodiment in which two fixed beam members are provided with respect to one floating beam member, however, three or more fixed beam members may also be provided. Further, it is understood that smaller intervals 2H between the fixed beam members correspond to a better the characteristic in the sensor structure in embodiments 8 to 10. Still further, from the result shown in FIG. 31, it is desirable that the ratio H/L be equal to or less than 0.3 to 0.4. In the case of the structure P4, the ratio H/L is 0.43.

In the above description, an embodiment on the basis of the resonance type angular velocity sensor was selected and its operation was explained, however, as long as the beam for vibrating the mass portion to the x axis direction and the beam for vibrating the mass portion to the y axis direction are separated, vibration of the beam for vibrating to the x axis direction in the y axis direction is difficult and its vibration to the x axis direction is easy detection accuracy cane improved. Application is therefore not limited to the vibration type angular velocity sensor and the structure can be applied and developed as a popular vibrating type sensor for detecting various kinds of physical, chemical, or optical values, including but not limited to those that will be mentioned below.

A first applicable example is in measuring or detecting acceleration. This application can be achieved by detecting the change amount of the amplitude due to the movement of the mass portion to the x axis direction caused by the inertia force of the mass portion at a time when the acceleration to the same direction is applied to the stable exciting state excited to the x axis direction with a constant amplitude as the capacity change of the exciting or the feed-back electrode.

A second applicable example is a chemical amount sensor or the like, based on the principle that the resonance frequency of excitation changes with mass changes resulting from gas attachment to the mass portion.

A third applicable example is in optical sensing. In this case, a principle is applied that the resonance frequency of the vibrator is changed due to the temperature change of the vibrator which is changed by irradiation of the optical amount, for example, to the mass portion and the beam portion.

A fourth applicable example is a detecting system for a dynamic amount, such as force or pressure, based on the principle that the exciting amplitude and the resonance frequency are changed by the external force applied or transmitted to the vibrator.

In this case, when the frequency adjusting mechanism shown in the embodiments 2, 3, 4, 5, and 6 is added to the structure of the respective angular velocity sensor shown in the embodiments 8 to 10, the resonance frequency of the mass excitation supporting beam can be always an appropriate value. In a specific example, as shown in FIG. 23 by a doted line, the frequency adjusting electrode is provided at the positions opposing to the connecting portions 841, 842, 843 and 844 of the respective excitation supporting beam.

Further, when the respective angular velocity sensors shown in embodiments 8 to 10 are structured such that the respective two sensors are paired and the exciting phase of the pair of mass portions are shifted by 180 degree as described in embodiment 7, the displacement of the mass portion due to the acceleration can be securely separated from the displacement of the mass portion due to the angular velocity.

What is claimed is:

1. A resonance based angular velocity sensor, comprising:
   a mass portion;
   a pair of mass displacement supporting bases configured to support said mass portion therebetween and disposed in an excitation direction of the mass portion;
   at least one mass displacement direction supporting beam extending from said mass displacement supporting bases to said mass portion and configured to support said mass portion in such a manner as to allow said mass portion to be displaced by a Coriolis force generated in a direction perpendicular to both directions of the excitation direction of the mass portion and a rotational axis direction of a sensor angular velocity;
   a plurality of mass excitation supporting beam members configured to support said mass displacement supporting bases and to inhibit said mass displacement supporting bases from displacing due to said Coriolis force while allowing said mass portion to vibrate in said excitation direction;

an exciter configured to excite said mass portion by exciting said mass displacement supporting bases; and a displacement detector configured to detect a displacement of said mass portion caused by said Coriolis force, thereby detecting the sensor angular velocity based on said displacement.

2. The resonance based angular velocity sensor of claim 1, wherein:

the plurality of mass excitation supporting beam members are disposed along the Coriolis force direction, members of a first set of said mass excitation supporting beam members are connected to each of end portions of said pair of mass displacement supporting bases in such a manner as to displace along said excitation direction, and members of a second set of said mass excitation beam members are fixed.

3. The resonance based angular velocity sensor of claim 2, wherein:

said mass excitation supporting beam members are formed by a folded beam.

4. The resonance based angular velocity sensor of claim 1, wherein:

members of a set of said mass excitation supporting beam members are disposed at each end of said pair of mass displacement supporting bases and along the Coriolis force direction, and said plurality of mass excitation supporting beam members comprises at least two parallel beam members of substantially the same length, extending in the direction perpendicular to the excitation direction of said pair of mass displacement supporting bases.

5. The resonance based angular velocity sensor of claim 1, wherein:

members of a set of said plurality of mass excitation supporting beam members are disposed at each end of said pair of mass displacement supporting bases and along the Coriolis force direction, said plurality of mass excitation supporting beam members comprises at least two parallel beam members of substantially the same length, extending in the direction perpendicular to the excitation direction of said pair of mass displacement supporting bases, one of said at least two beam members has a first end closest to said pair of mass displacement supporting bases, said first end being connected thereto in such a manner as to displace along said excitation direction, the other of said at least two beam members has a first end closest to said pair of mass displacement supporting bases, said first end being fixed, and said at least two beam members have second ends opposite to said pair of mass displacement supporting bases, said second ends being connected to each other by a connecting beam extending parallel to said excitation direction.

6. The resonance based angular velocity sensor of claim 1, wherein:

members of a set of said plurality of mass excitation supporting beam members are disposed at each end of said pair of mass displacement supporting bases and along the Coriolis force direction, said plurality of mass excitation supporting beam members comprises at least three parallel beam members of substantially the same length, extending in the direction perpendicular to the excitation direction of said pair of mass displacement supporting bases, one of said at least three beam members has a first end closest to said pair of mass displacement supporting bases, said first end being connected thereto in such a manner as to displace along said excitation direction, a remaining of said at least three beam members is disposed either along both longitudinal sides of said one of at least three beam members or on only one longitudinal side of said one of at least three beam members, ends closest to said pair of mass displacement supporting bases of each of said remaining beam members are fixed, and ends of all beam members opposite to said pair of mass displacement supporting bases are connected to each other by a connecting beam extending parallel to said excitation direction.

7. The resonance based angular velocity sensor of claim 6, further comprising:

a plurality of said connecting beams configured to connect at least three of said parallel beam members;

said connecting beams being isolated from each other.

8. The resonance based angular velocity sensor of claim 1, wherein said at least one mass displacement direction supporting beam comprises a straight beam extending in the direction perpendicular to a direction of said displacement of the mass portion caused by the Coriolis force.

9. The resonance based angular velocity sensor of claim 1, further comprising:

a stress adjusting mechanism configured to adjust stresses in said plurality of mass excitation supporting beam members and said at least one mass displacement direction supporting beam, thereby setting the resonance frequencies in said excitation and Coriolis force directions.

10. The resonance based angular velocity sensor of claim 1, further comprising:

a frequency adjusting mechanism configured to set a resonance frequency in said mass excitation direction of said excitation supporting beam members and to adjust only a resonance frequency in said excitation direction of said mass portion by creating a stress in said mass excitation supporting beam members.

11. The resonance based angular velocity sensor of claim 10, wherein said frequency adjusting mechanism is configured to adjust the resonance frequency in said mass excitation direction of said mass excitation supporting beam members by creating a tensile stress or a compression stress in said mass excitation supporting beam members through an electric adjustment.

12. The resonance based angular velocity sensor of claim 11, wherein:

members of a set of said plurality of mass excitation supporting beam members are disposed at each end of said pair of mass displacement supporting bases and along the Coriolis force direction, said plurality of mass excitation supporting beam members comprises at least two parallel beam members of substantially the same length, extending in the direction perpendicular to the excitation direction of said pair of mass displacement supporting bases, one of said at least two beam members has a first end closest to said pair of mass displacement supporting bases said first end being connected thereto in such a manner as to displace along said excitation direction, the other of said at least two beam members has a first end closest to said pair of mass displacement supporting bases, said first end being fixed, said at least two beam members have second ends opposite to said pair of mass displacement supporting bases, said second ends being connected to each other by a connecting beam extending parallel to said excitation direction, said frequency adjusting mechanism comprises a frequency adjusting electrode opposing to said connecting beam configured to provide a tensile stress or a compression stress to said at least two beam members by an attraction force or a repulsion force applied between said frequency adjusting electrode and said connecting beam based on an electrostatic force.

13. The resonance based angular velocity sensor of claim 12, further comprising a plurality of frequency adjusting electrodes in a plurality of opposing positions of said connecting beam elongated along the mass portion excitation direction.

14. The resonance based angular velocity sensor of claim 10, further comprising a detector configured to detect an exciting state of said mass portion and to adjust a stress of the mass excitation supporting beam members in such a manner as to maintain an optimum resonance frequency of the mass portion on the basis of the exciting state of said mass portion obtained by said detector.

15. The resonance based angular velocity sensor of claim 14, wherein the exciter is feedback controlled in such a manner that the resonance frequency in said excitation direction becomes an optimum value on the basis of the detected result of said detector.

16. The resonance based angular velocity sensor of claim 10, wherein said frequency adjusting mechanism is configured to adjust the resonance frequency in said mass excitation direction of said mass excitation supporting beam members by any one or both of an electrical adjustment and a mechanical adjustment.

17. The resonance based angular velocity sensor of claim 16, wherein said frequency adjusting mechanism is configured to adjust the resonance frequency in said mass excitation direction by providing a trimming pattern in said mass excitation supporting beam and removing said trimming pattern.

18. The resonance based angular velocity sensor of claim 16, wherein said frequency adjusting mechanism is configured to adjust the resonance frequency in said mass excitation direction by attaching an adjusting material to said mass excitation supporting beam members.

19. A pair of resonance based angular velocity sensors, each sensor comprising:

a mass portion;

a pair of mass displacement supporting bases configured to support said mass portion therebetween and disposed in an excitation direction of the mass portion;

at least one mass displacement direction supporting beam extending from said respective mass displacement supporting bases to said mass portion and configured to support said mass portion in such a manner as to allow said mass portion to be displaced by a Coriolis force generated in a direction perpendicular to both directions of the excitation direction of the mass portion and a rotational axis direction of a sensor angular velocity;

a plurality of mass excitation supporting beam members configured to support said mass displacement supporting bases and to inhibit said mass displacement supporting base from displacing due to said Coriolis force while allowing said mass portion to vibrate in said excitation direction;

an exciter configured to excite said mass portion by exciting said mass displacement supporting bases; and a displacement detector configured to detect displacement of said mass portion caused by said Coriolis force, thereby detecting the sensor angular velocity based on said displacement, each of the mass portions of said two resonance based angular velocity sensors being excited in an inverted phase to each other in the same excitation direction.

20. The resonance based angular velocity sensor of claim 19, wherein:

members of a set of said plurality of mass excitation supporting beam members are disposed at each end of said pair of mass displacement supporting bases and along the Coriolis force direction, said plurality of mass excitation supporting beam members comprises at least two parallel beam members of substantially the same length, extending in the direction perpendicular to the excitation direction of said pair of mass displacement supporting bases, one of said at least two beam members has a first end closest to said pair of mass displacement supporting bases, said first end being connected thereto in such a manner as to displace along said excitation direction, the other of said at least two beam members has a first end closest to said pair of mass displacement supporting bases, said first end being fixed, and said at least two beam members have second ends opposite to said pair of mass displacement supporting bases, said second ends being connected to each other by a connecting beam extending parallel to said excitation direction.

21. The resonance based angular velocity sensor of claim 19, wherein said at least one mass displacement direction supporting beam is a straight beam straight extending in the direction perpendicular to a direction of displacement.

22. The resonance based angular velocity sensor of claim 19, further comprising:

a stress adjusting mechanism configured to adjust stresses in said mass excitation supporting beam members and said at least one mass displacement direction supporting beam, thereby setting resonance frequencies in said excitation and Coriolis force directions.

23. The resonance based angular velocity sensor of claim 19, further comprising a frequency adjusting mechanism configured to set a resonance frequency in said mass excitation direction of said excitation supporting beam members and to adjust only a resonance frequency in said excitation direction of said mass portion by creating a stress in said mass excitation supporting beam members.

24. The resonance based angular velocity sensor of claim 23, wherein:

members of a set of said plurality of mass excitation supporting beam members are disposed at each end of said pair of mass displacement supporting bases and along the Coriolis force direction, said plurality of mass excitation supporting beam members comprises at least two parallel beam members of substantially the same length, extending in the direction perpendicular to the excitation direction of said pair of mass displacement supporting bases, one of said at least two beam members has a first end closest to said pair of mass displacement supporting bases, said first end being connected thereto in such a manner as to displace along said excitation direction, the other of said at least two beam members has a first end closest to said pair of mass displacement supporting bases, said first end being fixed, said at least two beam members have second ends opposite to said pair of mass displacement supporting bases said second ends being connected to each other by a connecting beam extending parallel to said excitation direction, said frequency adjusting mechanism comprises a frequency adjusting electrode opposing to said connecting beam configured to provide a tensile stress or a compression stress to said at least two beam members by an attraction force or a repulsion force applied between said frequency adjusting electrode and said connecting beam based on an electrostatic force.

25. The resonance based angular velocity sensor of claim 24, further comprising a plurality of frequency adjusting electrodes in a plurality of opposing positions of said connecting beam elongated along the mass portion excitation direction.

26. The resonance based angular velocity sensor of claim 22, further comprising a detector configured to detect an exciting state of said mass portion and to adjust a stress of the mass excitation supporting beam members in such a manner as to maintain an optimum resonance frequency of the mass portion on the basis of the exciting state of said mass portion obtained by said detector.

27. The resonance based angular velocity sensor of claim 26, wherein the exciter is feedback controlled in such a manner that the resonance frequency in said excitation direction becomes an optimum value on the basis of the detected result of said detector.

28. The resonance based angular velocity sensor of claim 22, wherein said frequency adjusting mechanism is configured to adjust the resonance frequency in said mass excitation direction of said mass excitation supporting beam members by any one or both of an electrical adjustment and a mechanical adjustment.

29. The resonance based angular velocity sensor of claim 1, further comprising:

a displacement controller provided on an other side in the displacing direction of the mass portion than the displacement detector, wherein said displacement controller is configured to control the mass portion in such a manner that when said mass portion is displaced due to the Coriolis force and the displacement detector detects the displacement, the displacement of said mass portion is canceled in response to the detection, and said displacement detector is configured to detect the displacing amount of said mass portion on the basis of the control amount required for canceling the displacement of said mass portion.

30. The resonance based angular velocity sensor of claim 1, wherein said mass portion, said pair of mass displacement supporting bases, said at least one mass displacement direction supporting beam, and said mass excitation supporting beam members are formed on a substrate in such a manner as to be in parallel to the plane of the substrate, and the excitation direction of said mass portion and the displacement direction of said mass portion due to the Coriolis force are set in such a manner as to be in parallel to the plane direction of said substrate.

31. The resonance based angular velocity sensor of claim 19, wherein:

members of a set of said plurality of mass excitation supporting beam members are disposed at each end of said pair of mass displacement supporting bases and along the Coriolis force direction, said plurality of mass excitation supporting beam members comprises at least three parallel beam members of substantially the same length, extending in the direction perpendicular to the excitation direction of said pair of mass displacement supporting bases, one of said at least three beam members has a first end closest to said pair of mass displacement supporting bases, said first end being connected thereto in such a manner as to displace along said excitation direction, a remaining of said at least three beam members is disposed either along both longitudinal sides of said one of at least three beam members or on only one longitudinal side of said one of at least three beam members, ends closest to said pair of mass displacement supporting bases of each of said remaining beam members are fixed, and ends of all beam members opposite to said pair of mass displacement supporting bases are connected to each other by a connecting beam extending parallel to said excitation direction.

32. The resonance based angular velocity sensor of claim 31, further comprising:

a plurality of said connecting beams which are isolated from each other and are configured to connect at least three of said beam members.

33. A sensor formed on a substrate, comprising:

a mass portion;

a pair of mass displacement supporting bases configured to support said mass portion therebetween and disposed in an excitation direction of the mass portion parallel to a plane of said substrate;

at least one mass displacement direction supporting beam extending from said respective mass displacement supporting bases to said mass portion and configured to support said mass portion in such a manner as to allow said mass portion to be displaced by a Coriolis force generated in a direction perpendicular to both directions of the excitation direction of the mass portion and a rotational axis direction of a sensor angular velocity;

a plurality of mass excitation supporting beam members configured to support said mass displacement supporting bases and to inhibit said mass displacement supporting bases from displacing due to said Coriolis force while allowing said mass portion to vibrate in said excitation direction;

an exciter configured to excite said mass portion by exciting said mass displacement supporting bases; and a displacement detector configured to detect a displacement of said mass portion caused by said Coriolis force.

34. A sensor as recited in claim 33, wherein:

members of a first set of said plurality of mass excitation supporting beam members are disposed at each end of said pair of mass displacement supporting bases and along the Coriolis force direction, said plurality of mass excitation supporting beam members comprises at least three parallel beam members of substantially the same length, extending in the direction perpendicular to the excitation direction of said pair of mass displacement supporting bases, one of said at least three beam members has a first end closest to said pair of mass displacement supporting bases, said first end being connected thereto in such a manner as to displace along said excitation direction, a remaining of said at least three beam members is disposed either along both longitudinal sides of said one of at least three beam members or on only one longitudinal side of said one of at least three beam members, ends closest to said pair of mass displacement supporting bases of each of said remaining beam members are fixed, and ends of all beam members opposite to said pair of mass displacement supporting bases are connected to each other by a connecting beam extending parallel to said excitation direction.

35. The sensor of claim 34, further comprising:

a plurality of said connecting beams isolated from each other and configured to connect at least three of said parallel beam members and a connection beam; and said connecting beam of each mass excitation supporting beam members is isolated from other connecting beams of all other mass excitation supporting beam members.

* * * * *